US011897793B2

(12) United States Patent
Kim et al.

(10) Patent No.: US 11,897,793 B2
(45) Date of Patent: Feb. 13, 2024

(54) CATALYSTS FOR FENTON SYSTEM CONTAINING METAL OXIDE CONTAINING FUNCTIONAL GROUP ON SURFACE AND FENTON SYSTEM USING THE SAME

(71) Applicant: KOREA INSTITUTE OF SCIENCE AND TECHNOLOGY, Seoul (KR)

(72) Inventors: Jongsik Kim, Seoul (KR); Heon Phil Ha, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 586 days.

(21) Appl. No.: 17/115,468

(22) Filed: Dec. 8, 2020

(65) Prior Publication Data
US 2021/0300801 A1 Sep. 30, 2021

(30) Foreign Application Priority Data

Mar. 25, 2020 (KR) .................. 10-2020-0036303
Mar. 25, 2020 (KR) .................. 10-2020-0036304
(Continued)

(51) Int. Cl.
*C02F 1/461* (2023.01)
*C02F 1/467* (2023.01)
(Continued)

(52) U.S. Cl.
CPC ........ *C02F 1/46109* (2013.01); *C02F 1/4672* (2013.01); *C02F 2001/46142* (2013.01);
(Continued)

(58) Field of Classification Search
CPC .......... C02F 1/4672; C02F 2001/46142; C02F 2305/023; C02F 2305/026
See application file for complete search history.

(56) References Cited

U.S. PATENT DOCUMENTS

2004/0007531 A1   1/2004   Bortun et al.
2020/0190677 A1   6/2020   Kim et al.

FOREIGN PATENT DOCUMENTS

JP   2002233766 A   8/2002
JP   2006102568 A   4/2006
(Continued)

OTHER PUBLICATIONS

Wu et al., "Porous Solid Superacid SO42-/Fe2-xZrxO3 Fenton Catalyst for Highly Effective Oxidation of X-3B under Visible Light," Ind. Eng. Chem. Res. 2013, 52, 16698-16708. (Year: 2013).*

(Continued)

*Primary Examiner* — Catherine S Branch
(74) *Attorney, Agent, or Firm* — RABIN & BERDO, P.C.

(57) ABSTRACT

Provided is a catalyst for a Fenton system, and a method of preparing the same. The catalyst includes one or more species of $d^0$-orbital-based or non-$d^0$-orbital-based catalyst including $NO_3^-/SO_4^{2-}/H_2PO_4^-/HPO_4^{2-}/PO_4^{3-}$ functional groups on the surface thereof. The method includes preparing a $d^0$-orbital-based or non-$d^0$-orbital-based transition metal oxide; and preparing a transition metal oxide catalyst comprising a $NO_3^-$, $SO_4^{2-}$, $H_2PO_4^-$, $HPO_4^{2-}$, or $PO_4^{3-}$ functional group on the surface of the catalyst via nitrification, sulfation, or phosphorylation of the transition metal oxide.

15 Claims, 33 Drawing Sheets

(30) Foreign Application Priority Data

May 14, 2020 (KR) .................. 10-2020-0057943
Jul. 23, 2020 (KR) .................. 10-2020-0091558

(51) Int. Cl.
  C02F 101/10 (2006.01)
  C02F 101/34 (2006.01)
  C02F 101/38 (2006.01)

(52) U.S. Cl.
  CPC .... C02F 2101/10 (2013.01); C02F 2101/345 (2013.01); C02F 2101/38 (2013.01); C02F 2305/023 (2013.01); C02F 2305/026 (2013.01)

(56) References Cited

FOREIGN PATENT DOCUMENTS

| | | |
|---|---|---|
| KR | 19900012674 A | 9/1990 |
| KR | 1020170009566 A | 1/2017 |
| KR | 1020190118059 A | 10/2019 |
| KR | 1020190138129 A | 12/2019 |
| KR | 1020200004163 A | 1/2020 |
| WO | 2004007372 A1 | 1/2004 |
| WO | 2020122326 A1 | 6/2020 |

OTHER PUBLICATIONS

Liu et al., "Degradation and Mineralization of Carbamazepine Using an Electro-Fenton Reaction Catalyzed by Magnetite Nanoparticles Fixed on an Electrocatalytic Carbon Fiber Textile Cathode," Environ. Sci. Technol. 2018, 52, 12667-12674. (Year: 2018).*

Fu et al., "Heterogenous Uptake and Oxidation of SO2 on Iron Oxides," J. Phys. Chem. C 2007, 111, 6077-6085. (Year: 2007).*

Kamila et al, "Generation of Reactive Oxygen Species via Electroprotic Interaction of H2O2 with ZrO2 Gel: Ionic Sponge Effect and pH-Switchable Peroxidase- and Catalase-Like Activity", «ACS Catalysis» 2017, 7, 2935-2947.

Wang, Chen et al, "Characteristics of Some Typical Inorganic Oxyacid Free Radicals", Acta Chim. Sinica 2019, 77, 205-212.

Jongsik Kim et al., "Enhancing the decomposition of refractory contaminants on SO42-functionalized iron oxide to accommodate surface SO4 •—generated via radical transfer from • OH", Applied Catalysis B: Environmental, 252 (2019) 62-76.

Lousada, Claudio M. et al., "Mechanism of H2O2 Decomposition on Transition Metal Oxide Surfaces".

Wang, Qiangwei et al., "Effect of Iron Oxide Promoted Sulfated Zirconia on the Oxidative Efficiency of H2O2/O3 for Acetic Acid Degradation in Strong Acidic Water".

Office action dated Jan. 18, 2022, for the corresponding Japanese Patent Application No. 2020-211724.

L. Sbardella et al., "The impact of wastewater matrix on the degradation of pharmaceutically active compounds by oxidation processes including ultraviolet radiation and sulfate radicals", Journal of Hazardous Materials, Dec. 15, 2019, pp. 1-9, vol. 380, No. 120869.

Extended European Search Report dated Jul. 8, 2021.

* cited by examiner

US 11,897,793 B2

CATALYSTS FOR FENTON SYSTEM CONTAINING METAL OXIDE CONTAINING FUNCTIONAL GROUP ON SURFACE AND FENTON SYSTEM USING THE SAME

CROSS-REFERENCE TO RELATED APPLICATION

This application claims the benefit of Korean Patent Application No. 10-2020-0036303, filed on Mar. 25, 2020, Korean Patent Application No. 10-2020-0036304, filed on Mar. 25, 2020, Korean Patent Application No. 10-2020-0057943, filed on May 14, 2020, and Korean Patent Application No. 10-2020-0091558, filed on Jul. 23, 2020, respectively, in the Korean Intellectual Property Office, the disclosure of which is incorporated herein in its entirety by reference.

BACKGROUND

1. Field

The present invention relates to a catalyst for a Fenton system, the catalyst including one or more species of transition metal oxide grains functionalized with $NO_3^-$, $SO_4^{2-}$, or $H_{3-Z}PO_4^{Z-}$ (where Z=1-3) on the surface thereof for efficient decomposition of a non-degradable organic material, and a Fenton system using the catalyst.

2. Description of the Related Art

As one of the most attractive wastewater treatment technologies in recent years, an advanced oxidation process (AOP) for oxidizing and decomposing non-degradable or toxic organic materials contained in water by generating/increasing the quantity of a radical oxidizer (e.g., ·OH or $SO_4^{·-}$) having a high standard oxidation potential in wastewater has been used. One representative AOP is an electro-Fenton process for oxidizing and decomposing non-degradable organic materials by applying a voltage between a uncoated anode and a cathode coated with a catalyst, as a single catalyst process commercialized in a small scale for sewage/wastewater treatment plants. This provides three major advantages as follows. 1) A sufficient amount of hydrogen peroxide ($H_2O_2$) may be supplied by reduction of oxygen occurring in the cathode ($2H^+ + O_2 + 2e^- \to H_2O_2$), 2) a considerable amount of ·OH may be supplied by heterogeneous catalytic or homogeneous catalytic decomposition of hydrogen peroxide ($M^{\delta+} + H_2O_2 \to M^{(\delta+1)+} + OH^- + \cdot OH$) by metal species having an oxidation number of 2 or less ($M^{\delta+}$, where M is a metal and $\delta \leq 2$) on the surface of a non-$d^0$-orbital-based transition metal oxide catalyst coated on the cathode, and 3) $M^{(\delta+1)+}$ formed as a result of catalytic decomposition of hydrogen peroxide as described above may be reduced to the metal species $M^{\delta+}$ ($e^-$ reduction: $M^{(\delta+1)+} + e^- \to M^{\delta+}$) by sufficient electrons ($e^-$) in a reaction solution and reused for catalytic decomposition of hydrogen peroxide.

It is important that we have found no reports to date on technology of coating a $d^0$-orbital-based transition metal oxide (e.g., $ZrO_2$, $Nb_2O_5$ or $Ta_2O_5$) on a cathode of an electro-Fenton process and using $Zr^{4+}$, $Nb^{5+}$, or $Ta^{5+}$ species contained on the surface thereof as active surface species for catalytic decomposition of hydrogen peroxide. The $Zr^{4+}$, $Nb^{5+}$, and $Ta^{5+}$ species may provide two advantages as described below in catalytic decomposition of hydrogen peroxide over the $M^{\delta+}$ species. That is, 1) Productivity/production rate of ·OH may increase twice based on new catalytic decomposition of hydrogen peroxide ($H_2O_2 \to 2\cdot OH$), and 2) Reduction ($e^-$ reduction) for continuous decomposition of hydrogen peroxide is not required since oxidation states (oxidation numbers) of $Zr^{4+}$, $Nb^{5+}$, and $Ta^{5+}$ are not changed even after catalytic decomposition of hydrogen peroxide.

In the case of the electro-Fenton process in which ·OH is generated by the $M^{\delta+}$ active species (non-$d^0$-orbital-based transition metal oxide) or $Zr^{4+}$, $Nb^{5+}$, or $Ta^{5+}$ active species ($d^0$-orbital-based transition metal oxide), large-scale commercialization of the electro-Fenton process for wastewater treatment is limited due to the following disadvantages despite the above-described advantages. First, a limited amount of transition metal surface species ($M^{\delta+}$, $Zr^{4+}$, $Nb^{5+}$ or $Ta^{5+}$) present on the surface of the catalyst coated on the cathode generates a limited amount of ·OH, resulting in a decrease in non-degradable organic material decomposition rates by ·OH. Second, the electro-Fenton process performed under relatively severe processing conditions causes continuous and serious leaching of metal species present on the surface of the catalyst coated on the cathode, thereby limiting the number of uses of the coated catalyst and causing a decrease in the ability to decompose organic materials. Third, since ·OH applied to the electro-Fenton process has relatively short lifespan, there are problems of low organic material decomposition efficiency and a limited range of pH for efficient production of ·OH.

Another AOP is a non-electro-Fenton process in which radical precursors (e.g., $H_2O_2$, $Na_2S_2O_8$, and $KHSO_5$) supplied to a catalyst coated on a support are converted into radicals such as ·OH and $SO_4^{·-}$ by catalysis, and the converted radicals oxidize and decompose non-degradable organic materials. Specifically, major characteristics of the non-electro-Fenton process are as follows. 1) The radical precursors should be supplied for decomposition of organic materials, 2) ·OH and $SO_4^{·-}$ may be produced by catalytic scission of $H_2O_2/S_2O_8^{2-}/HSO_5^-$ based on heterogeneous catalysis or homogeneous catalysis by metal species having an oxidation number of 2 or less ($M^{\delta+}$, where M is a metal and $\delta \leq 2$) on the surface of the catalyst coated on the support (Reaction Schemes a and θ), and 3) $M^{(\delta+1)+}$ formed by the above-described catalytic scission is reduced to $M^{\delta+}$ by electrons in a reaction solution and may be reused in catalytic scission.

  Reaction Scheme a:

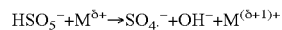  Reaction Scheme b:

Despite the above-described advantages, large-scale commercialization of wastewater treatment using the catalyst generating radicals is limited due to the following disadvantages. First, $Mn^{\delta+}$ species present on the surface of the catalyst coated on the support and having Lewis acid properties may decrease in frequency of radical catalytic scission occurring per unit hour unless the intensity of Lewis acid is not enough to easily adsorb radical precursors ($H_2O_2/S_2O_8^{2-}/HSO_5^-$). This causes generation of a limited amount of ·OH and decreased non-degradable organic material decomposition rates by ·OH although the $M^{(\delta+1)+}$ species generated as a result of radical catalytic scission are continuously recovered to the $M^{\delta+}$ species by electrons ($e^-$). Second, the non-electro-Fenton process performed under relatively severe processing conditions causes continuous and serious leaching of $M^{\delta+}$ species present on the surface of the catalyst coated on the support, thereby limiting the number of uses of the coated catalyst and causing a decrease in the ability to decompose organic materials. Third, since ·OH applied to the non-electro-Fenton process has relatively short lifespan, there are problems of low organic material decomposition efficiency and a limited range of pH for efficient production of ·OH.

SUMMARY

The present invention has been proposed to solve various problems including the above problems, and an object of the present invention is to decompose a non-degradable organic material based on heterogeneous catalysis by distributing —$NO_3·$, $SO_4·^-$, $H_2PO_4·$, $HPO_4·^-$, or $PO_4^{2·-}$ surface species, which have 1) a longer half-life, 2) a wider pH range, and 3) a similar oxidizing power (standard oxidation potential) compared to ·OH, on the surface of a $d^0$-orbital-based or non-$d^0$-orbital-based transition metal oxide catalyst.

Also, another object of the present invention is to provide a catalyst for an electro-Fenton system, an electrode including the same, and an electro-Fenton system using the same, capable of inducing continuous production of ·OH and overcoming disadvantages of conventional electro-Fenton processes such as 1) low non-degradable organic material decomposition rate, 2) serious reaction active site leaching, and 3) limited lifespan of the catalyst.

Also, another object of the present invention is to provide a catalyst for a non-degradable organic material-decomposing system and a non-degradable organic material-decomposing system using the same, capable of overcoming disadvantages of conventional non-electro-Fenton processes such as 1) low non-degradable organic material decomposition rate, 2) low non-degradable organic material decomposition efficiency, 3) serious reaction active site leaching ($M^{\delta+}$ leaching), and 4) limited lifespan of the catalyst.

However, problems to be solved are illustrative and the scope of the present invention is not limited thereby.

Additional aspects will be set forth in part in the description which follows and, in part, will be apparent from the description, or may be learned by practice of the presented embodiments.

According to an aspect of the present invention to achieve the object, provided is a catalyst for an electro-Fenton system, the catalyst including one or more species of $d^0$-orbital-based or non-$d^0$-orbital-based transition metal oxide catalyst grains including a $NO_3^-$, $SO_4^{2-}$, $H_2PO_4^-$, $HPO_4^{2-}$, or $PO_4^{3-}$ functional group on the surface thereof.

According to an embodiment of the present invention, the catalyst grains may have a porous structure.

According to an embodiment of the present invention, the catalyst grains may have a diameter of 0.1 nm to 500 µm.

According to an embodiment of the present invention, a metal of the transition metal oxide catalyst grains may include at least one selected from a 3d-block metal (Sc, Ti, V, Cr, Mn, Fe, Co, Ni, Cu, or Zn), a 4d-block metal (Y, Zr, Nb, Mo, Tc, Ru, Rh, Pd, Ag, or Cd), a 5d-block metal (La, Hf, Ta, W, Re, Os, Ir, Pt, Au, or Hg), and a 6d-block metal (Ac, Rf, Db, Sg, Bh, Hs, Mt, Ds, Rg, Cn) in the periodic table, or any combination thereof.

According to another aspect of the present invention, provided is an electrode for an electro-Fenton system including, the catalyst for an electro-Fenton system; a carrier supporting the catalyst; a substrate coated with the carrier; and a binder interposed between the carrier and the substrate and increasing a coating adhesive strength.

According to an embodiment of the present invention, the carrier may be formed of carbon (C), $Al_2O_3$, MgO, $ZrO_2$, $CeO_2$, $TiO_2$, or $SiO_2$.

According to an embodiment of the present invention, the catalyst may be included in an amount of 0.01 to 50 parts by weight based on 100 parts by weight of the carrier.

According to an embodiment of the present invention, the binder may be an insoluble polymer or an inorganic binder.

According to another aspect of the present invention, provided is an electro-Fenton system including the electrode and an aqueous electrolytic solution.

According to an embodiment of the present invention, the aqueous electrolytic solution may have a pH of 3 to 10, and electro-Fenton reaction may occur by inputting a power of 2 W or less.

According to an embodiment of the present invention, the electro-Fenton reaction may include: (1) production of ·OH species by heterogeneous decomposition of $H_2O_2$; (2) conversion of the $SO_4^{2-}$ functional group into $SO_4·^-$ species by the ·OH species, conversion of the $NO_3^-$ functional group into $NO_3·$ species by the ·OH species, or conversion of the $H_2PO_4^-/HPO_4^{2-}/PO_4^{3-}$ functional groups into $H_2PO_4·/HPO_4·^-/PO_4^{2·-}$ species by the ·OH species; and (3) decomposition of a non-degradable organic material by the $NO_3·$, $SO_4·^-$, $H_2PO_4·$, $HPO_4·^-$, or $PO_4^{2·-}$ species.

According to another aspect of the present invention, provided is a method of preparing a catalyst for an electro-Fenton system including: preparing a $d^0$-orbital-based or non-$d^0$-orbital-based transition metal oxide; and preparing a transition metal oxide catalyst including a $NO_3^-$, $SO_4^{2-}$, $H_2PO_4^-$, $HPO_4^{2-}$, or $PO_4^{3-}$ functional group on the surface of the catalyst via nitrification, sulfation, or phosphorylation of the transition metal oxide.

According to an embodiment of the present invention, the nitrification may be performed by a reaction gas including NO and $O_2$.

According to an embodiment of the present invention, the sulfation may be performed by a reaction gas including $SO_2$ and $O_2$.

According to an embodiment of the present invention, the phosphorylation may be performed by a reaction solution including a phosphorylating precursor.

According to another aspect of the present invention, provided is a catalyst for a non-electro-Fenton system including one or more species of $d^0$-orbital-based or non-$d^0$-orbital-based transition metal oxide catalyst grains including a $NO_3^-$, $SO_4^{2-}$, $H_2PO_4^-$, $HPO_4^{2-}$, or $PO_4^{3-}$ functional group on the surface thereof.

According to an embodiment of the present invention, the catalyst grains may have a porous structure.

According to an embodiment of the present invention, the catalyst grains may have a diameter of 0.1 nm to 500 µm.

According to an embodiment of the present invention, a metal of the transition metal oxide catalyst grains may include at least one selected from a 3d-block metal (Sc, Ti, V, Cr, Mn, Fe, Co, Ni, Cu, or Zn), a 4d-block metal (Y, Zr, Nb, Mo, Tc, Ru, Rh, Pd, Ag, or Cd), a 5d-block metal (La, Hf, Ta, W, Re, Os, Ir, Pt, Au, or Hg), and a 6d-block metal (Ac, Rf, Db, Sg, Bh, Hs, Mt, Ds, Rg, Cn) in the periodic table, or any combination thereof.

According to another aspect of the present invention, provided is a catalyst structure for a non-electro-Fenton system, the catalyst structure including: a catalyst for a non-electro-Fenton system including one or more species of $d^0$-orbital-based or non-$d^0$-orbital-based transition metal oxide catalyst grains including a $NO_3^-$, $SO_4^{2-}$, $H_2PO_4^-$, $HPO_4^{2-}$, or $PO_4^{3-}$ functional group on the surface thereof; a carrier supporting the catalyst; a support coated with the carrier; and a binder interposed between the carrier and the support and increasing a coating adhesive strength.

According to an embodiment of the present invention, the catalyst grains may have a porous structure.

According to an embodiment of the present invention, the catalyst grains may have a diameter of 0.1 nm to 500 μm.

According to an embodiment of the present invention, a metal of the catalyst grains may include at least one selected from a 3d-block metal (Sc, Ti, V, Cr, Mn, Fe, Co, Ni, Cu, or Zn), a 4d-block metal (Y, Zr, Nb, Mo, Tc, Ru, Rh, Pd, Ag, or Cd), a 5d-block metal (La, Hf, Ta, W, Re, Os, Ir, Pt, Au, or Hg), and a 6d-block metal (Ac, Rf, Db, Sg, Bh, Hs, Mt, Ds, Rg, Cn) in the periodic table, or any combination thereof.

According to an embodiment of the present invention, the carrier may be formed of carbon (C), $Al_2O_3$, MgO, $ZrO_2$, $CeO_2$, $TiO_2$, or $SiO_2$.

According to an embodiment of the present invention, the catalyst may be included in an amount of 0.01 to 50 parts by weight based on 100 parts by weight of the carrier.

According to an embodiment of the present invention, the binder may be an insoluble polymer or an inorganic binder.

According to another aspect of the present invention, provided is a non-electro-Fenton system including: the catalyst structure; a hydrogen peroxide supply unit; and an aqueous electrolytic solution.

According to an embodiment of the present invention, the aqueous electrolytic solution may have a pH of 5 to 10, and a non-electro-Fenton reaction may occur by supplying hydrogen peroxide using a hydrogen peroxide supply unit at a rate of $10^{-5}$ mol/L to $10^5$ mol/L.

According to an embodiment of the present invention, the non-electro-Fenton reaction includes: (1) production of ·OH species by heterogeneous decomposition of $H_2O_2$; (2) conversion of the $SO_4^{2-}$ functional group into $SO_4^-$ species by the ·OH species, conversion of the $NO_3^-$ functional group into $NO_3$· species by the ·OH species, or conversion of the $H_2PO_4^-/HPO_4^{2-}/PO_4^{3-}$ functional groups into $H_2PO_4$·/$HPO_4^-/PO_4^{2 \cdot -}$ species by the ·OH species; and (3) decomposition of a non-degradable organic material by the $NO_3$·, $SO_4^-$, $H_2PO_4$·, $HPO_4^-$, or $PO_4^{2 \cdot -}$ species.

According to another aspect of the present invention, provided is a method of preparing a catalyst for a non-electro-Fenton system, the method including: preparing a $d^0$-orbital-based or non-$d^0$-orbital-based transition metal oxide; and preparing a transition metal oxide catalyst including a $NO_3^-$, $SO_4^{2-}$, $H_2PO_4^-$, $HPO_4^{2-}$, or $PO_4^{3-}$ functional group on the surface of the catalyst via nitrification, sulfation, or phosphorylation of the transition metal oxide.

According to an embodiment of the present invention, the nitrification may be performed by a reaction gas including NO and $O_2$.

According to an embodiment of the present invention, the sulfation may be performed by a reaction gas including $SO_2$ and $O_2$.

According to an embodiment of the present invention, the phosphorylation may be performed by a reaction solution including a phosphorylating precursor.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
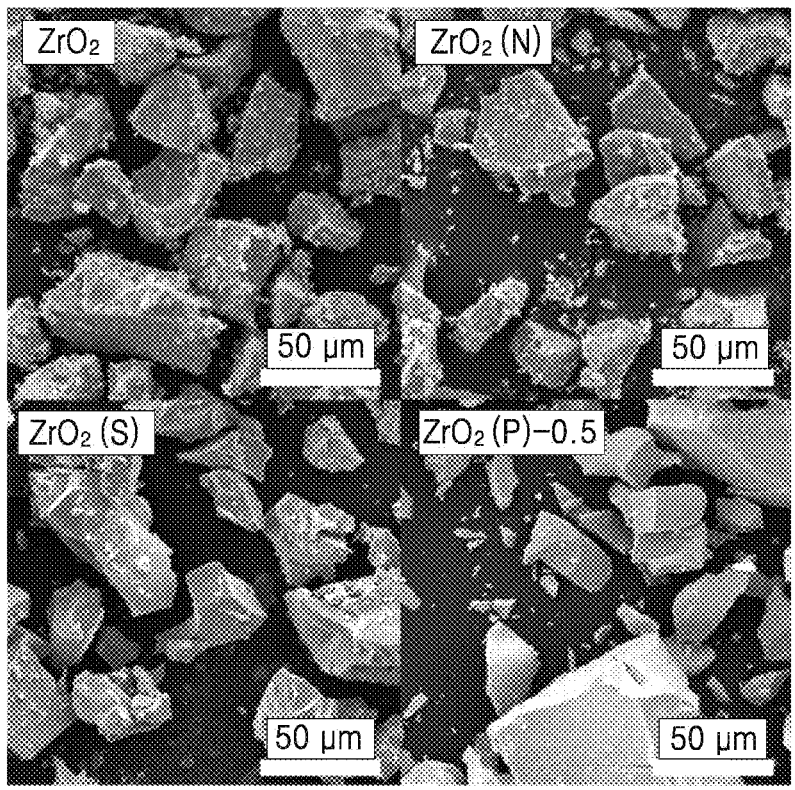
FIGS. 1 to 6 are scanning electron microscope (SEM) images of catalyst grams according to an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views and elements may be exaggerated for the convenience of description.

Hereinafter, embodiments of the present invention will be described in detail with reference to the appended drawings for one of ordinary skill in the art to be able to perform the invention without any difficulty.

Catalyst for Electro-Fenton System

Provided is a catalyst for an electro-Fenton system, the catalyst including one or more species of $d^0$-orbital-based or non-$d^0$-orbital-based transition metal oxide catalyst grains functionalized with $NO_3^-$, $SO_4^{2-}$, $H_2PO_4^-$, $HPO_4^{2-}$ or $PO_4^{3-}$ on the surface thereof. In this regard, the $d^0$-orbital-based transition metal oxide indicates that the d orbital of a transition metal, as a component of the oxide, is not occupied by electrons. For example, $ZrO_2/Nb_2O_5/Ta_2O_5$ respectively include $Zr^{4+}/Nb^{5+}/Ta^{5+}$ whose electronic states are [Kr] $4d^0$ $5s^0$/[Kr] $4d^0$ $5s^0$/[Xe] $4f^{14}$ $5d^0$ $6s^0$. In the case of $Zr^{4+}/Nb^{5+}/Ta^{5+}$ surface species, decomposition of hydrogen peroxide and production of ·OH proceed by $H_2O_2 \rightarrow 2·OH$, but the oxidation numbers thereof are not changed during the decomposition of hydrogen peroxide.

In this regard, the non-$d^0$-orbital-based transition metal oxide indicates that the d orbital of a transition metal, as a component of the oxide, is occupied by electrons. For example, $Fe_3O_4/CoO/NiO$ respectively include $Fe^{2+}/Co^{2+}/Ni^{2+}$ whose electronic states are [Ar] $3d^6$/[Ar] $3d^7$/[Ar] $3d^8$. In the case of $Fe^{2+}/Co^{2+}/Ni^{2+}$ surface species, decomposition of hydrogen peroxide and production of ·OH proceed by $H_2O_2 \rightarrow ·OH + OH^-$, and the oxidation number increases by 1 during the decomposition of the hydrogen peroxide. Thus, the non-$d^0$-orbital-based transition metal oxide may be reduced by electrons (e$^-$) generated during the electro-Fenton process, thereby enabling continuous decomposition of hydrogen peroxide.

A metal of the transition metal oxide catalyst grains functionalized with $NO_3^-$, $SO_4^{2-}$, $H_2PO_4^-$, $HPO_4^{2-}$, or $PO_4^{3-}$ includes at least one selected from a 3d-block metal (Sc, Ti, V, Cr, Mn, Fe, Co, Ni, Cu, or Zn), a 4d-block metal (Y, Zr, Nb, Mo, Tc, Ru, Rh, Pd, Ag, or Cd), a 5d-block metal (La, Hf, Ta, W, Re, Os, Ir, Pt, Au, or Hg), and a 6d-block metal (Ac, Rf, Db, Sg, Bh, Hs, Mt, Ds, Rg, Cn) in the periodic table, or any combination thereof. The d orbital of the transition metal, as a component of the oxide, may or may not be occupied by electrons in accordance with the oxidation number of the transition metal. Thus, the transition metal may form a $d^0$-orbital-based transition metal oxide or non-$d^0$-orbital-based transition metal oxide.

The catalyst for the electro-Fenton system may be prepared using a method used to form particular transition metal oxide grains and commonly available in the art. For example, the transition metal oxide grains included in the catalyst may be synthesized using one or more methods among hydrothermal synthesis, solvothermal synthesis, mechano-chemical method (ball-milling), non-templated or templated method, impregnation method, dip coating, and calcination or thermal decomposition method using M-including complex.

The electro-Fenton system may form $NO_3\cdot$, $SO_4\cdot^-$, $H_2PO_4\cdot$, $HPO_4\cdot^-$, or $PO_4^{2\cdot-}$ surface species by using the $\cdot OH$ species produced by oxidation of $H_2O$ ($H_2O \rightarrow \cdot OH + H^+ + e^-$) in an anode as an activator on $NO_3^-$, $SO_4^{2-}$, $H_2PO_4^-$, $HPO_4^{2-}$, or $PO_4^{3-}$ functional group present in the transition metal oxide grains coated on a cathode. Various types of conductive materials may be used as the anode to promote the oxidation of $H_2O$, for example, graphite may be used as the anode.

In addition, the catalyst for an electro-Fenton system may include active species on the surface of the catalyst, the active species used to decompose hydrogen peroxide formed as a result of reduction of oxygen ($2H^+ + O_2 + 2e^- \rightarrow H_2O_2$) on the cathode. Specifically, catalytic decomposition of hydrogen peroxide ($H_2O_2 \rightarrow 2 \cdot OH$ or $H_2O_2 \rightarrow \cdot OH + OH^-$) is activated by the $d^0$-orbital-based transition metal oxide active site ($Zr^{4+}/Nb^{5+}/Ta^{5+}$) or non-$d^0$-orbital-based transition metal oxide active site ($Fe^{2+}/Co^{2+}/Ni^{2+}$) based on homogeneous catalysis or heterogeneous catalysis. By using $\cdot OH$ species produced as a result of decomposition, the $NO_3^-/SO_4^{2-}/H_2PO_4^-/HPO_4^{2-}/PO_4^{3-}$ functional groups present in the transition metal oxide grains coated on the cathode may be converted into $NO_3\cdot/SO_4\cdot^-/H_2PO_4\cdot/HPO_4\cdot^-/PO_4^{2\cdot-}$ surface species. Thus, a transition metal oxide catalyst, which includes a large quantity of surface active sites and is inexpensive and easily synthesizable, may be used as the catalyst coated on the cathode to promote the catalytic decomposition of hydrogen peroxide.

In addition, the catalyst for an electro-Fenton system may form the $NO_3\cdot/SO_4\cdot^-/H_2PO_4\cdot/HPO_4\cdot^-/PO_4^{2\cdot-}$ surface species via radical transfer of the above-described $\cdot OH$ species to the $NO_3^-/SO_4^{2-}/H_2PO_4^-/HPO_4^{2-}/PO_4^{3-}$ functional groups on the surface of the catalyst and promote decomposition of non-degradable organic materials by using the surface species. Therefore, a transition metal oxide catalyst including a large quantity of $NO_3^-/SO_4^{2-}/H_2PO_4^-/HPO_4^{2-}/PO_4^{3-}$ functional groups on the surface of the transition metal oxide catalyst may be used as the catalyst coated on the cathode.

Performance of the catalyst may be improved by realizing a transition metal oxide catalyst surface capable of maximizing synergistic effects of the active species ($H_2O_2$ activators) and the $NO_3^-/SO_4^{2-}/H_2PO_4^-/HPO_4^{2-}/PO_4^{3-}$ functional groups on the surface of the transition metal oxide catalyst as described above, and adjusting type of the transition metal, structure/stoichiometry of the transition metal oxide, functionalization (nitrification/sulfation/phosphorylation) conditions of the $NO_3^-/SO_4^{2-}/H_2PO_4^-/HPO_4^{2-}/PO_4^{3-}$, and the amount of functional group.

According to an embodiment of the present invention, the nitrification may be performed by a reaction gas including NO and $O_2$. A concentration of NO and $O_2$ may be in the range of 10 ppm to $10^5$ ppm, a flow rate of the reaction gas may be in the range of $10^{-5}$ mL min$^{-1}$ to $10^5$ mL min$^{-1}$, and a pressure may be in the range of $10^{-5}$ bar to $10^5$ bar. In addition, the nitrification may be performed at a temperature of 50° C. to 500° C. for 0.1 hours to 24 hours.

According to an embodiment of the present invention, the sulfation may be performed by a reaction gas including $SO_2$ and $O_2$. A concentration of $SO_2$ and $O_2$ may be in the range of 10 ppm to $10^5$ ppm, a flow rate of the reaction gas may be in the range of $10^{-5}$ mLmin$^{-1}$ to $10^5$ mLmin$^{-1}$, and a pressure may be in the range of $10^{-5}$ bar to $10^5$ bar. In addition, the sulfation may be performed at a temperature of 200° C. to 800° C. for 0.1 hours to 24 hours.

According to an embodiment of the present invention, the phosphorylation may be performed by a reaction solution including a phosphorylating precursor (e.g., phosphoric acid ($H_3PO_4$) or diammonium phosphate (($NH_4$)$_2HPO_4$)). A concentration of the phosphorylating precursor may be in the range of $10^{-6}$ mol L$^{-1}$ to $10^6$ mol L$^{-1}$. The phosphorylating precursor-supporting transition metal oxide may be converted into a transition metal oxide catalyst functionalized by phosphorylation using the reaction gas including $O_2$. A concentration of $O_2$ included in the reaction gas may be in the range of 10 ppm to $5 \times 10^5$ ppm, a flow rate may be in the range of $10^{-5}$ mL min$^{-1}$ to $10^5$ mL and a pressure may be in the range of $10^{-5}$ bar to $10^5$ bar, and the phosphorylation may be performed at a temperature of 100° C. to 800° C. for 0.1 hours to 24 hours.

When the conditions for the nitrification/sulfation/phosphorylation of the transition metal oxide catalyst are less than the above-described ranges, functionalization effects on the catalyst with $NO_3^-/S O_4^{2-}/H_2PO_4^-/HPO_4^{2-}/P O_4^{3-}$ may be insufficient. Also, when the conditions are greater than the above-described ranges, the surface of the transition metal oxide catalyst may be excessively functionalized and thus surface species such as $Zr^{4+}/Nb^{5+}/Ta^{5+}$ or $Fe^{2+}/Co^{2+}/Ni^{2+}$, which promote the activity of the catalytic decomposition of hydrogen peroxide (production of $\cdot OH$) may vanish. Therefore, the nitrification/sulfation/phosphorylation of the catalyst may be performed within the above-described ranges.

In the catalyst for an electro-Fenton system according to an embodiment of the present invention, as a surface area increases, a production rate of $\cdot OH$ species by the surfaces species and a conversion rate of the $NO_3^-/SO_4^{2-}/H_2PO_4^-/HPO_4^{2-}/PO_4^{3-}$ functional groups into the $NO_3\cdot/SO_4\cdot^-/H_2PO_4\cdot/HPO_4\cdot^-/PO_4^{2\cdot-}$ surface species by the $\cdot OH$ species on the surface of the catalyst may increase (Reaction Schemes 1 to 10). As the above-described rates increase, the amounts of the $NO_3\cdot/SO_4\cdot^-/H_2PO_4\cdot/HPO_4\cdot^-/PO_4^{2\cdot-}$ surface species increase in the reaction system, thereby promoting decomposition of harmful materials.

| | |
|---|---|
| $NO_3^- + \cdot OH + H^+ \rightarrow NO_3\cdot + H_2O$ | Reaction Scheme 1: |
| $NO_3^- + \cdot OH \rightarrow NO_3\cdot + OH^-$ | Reaction Scheme 2: |
| $SO_4^{2-} + \cdot OH + H^+ \rightarrow SO_4\cdot^- + H_2O$ | Reaction Scheme 3: |
| $SO_4^{2-} + \cdot OH \rightarrow SO_4\cdot^- + OH^-$ | Reaction Scheme 4: |
| $H_2PO_4^- + \cdot OH + H^+ \rightarrow H_2PO_4\cdot + H_2O$ | Reaction Scheme 5: |
| $H_2PO_4^- + \cdot OH \rightarrow H_2PO_4\cdot + OH^-$ | Reaction Scheme 6: |
| $HPO_4^{2-} + \cdot OH + H^+ \rightarrow HPO_4\cdot^- + H_2O$ | Reaction Scheme 7: |
| $HPO_4^{2-} + \cdot OH \rightarrow HPO_4\cdot^- + OH^-$ | Reaction Scheme 8: |
| $PO_4^{3-} + \cdot OH + H^+ \rightarrow PO_4^{2\cdot-} + H_2O$ | Reaction Scheme 9: |
| $PO_4^{3-} + \cdot OH \rightarrow PO_4^{2\cdot-} + OH^-$ | Reaction Scheme 10: |

According to an embodiment of the present invention, the catalyst grains functionalized with $NO_3^-/SO_4^{2-}/H_2PO_4^-/HPO_4^{2-}/PO_4^{3-}$ may have a porous structure and a diameter of 0.1 nm to 500 μm.

Figure 2:
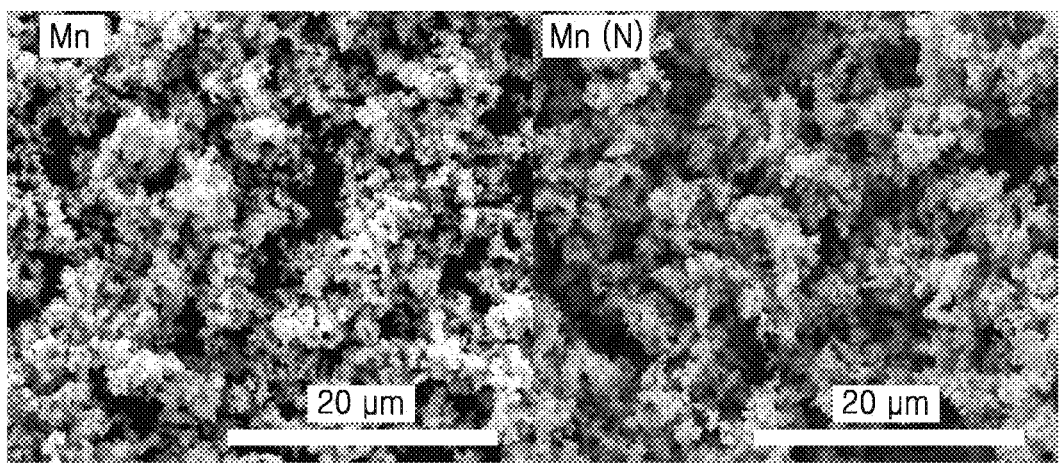
Figure 3:
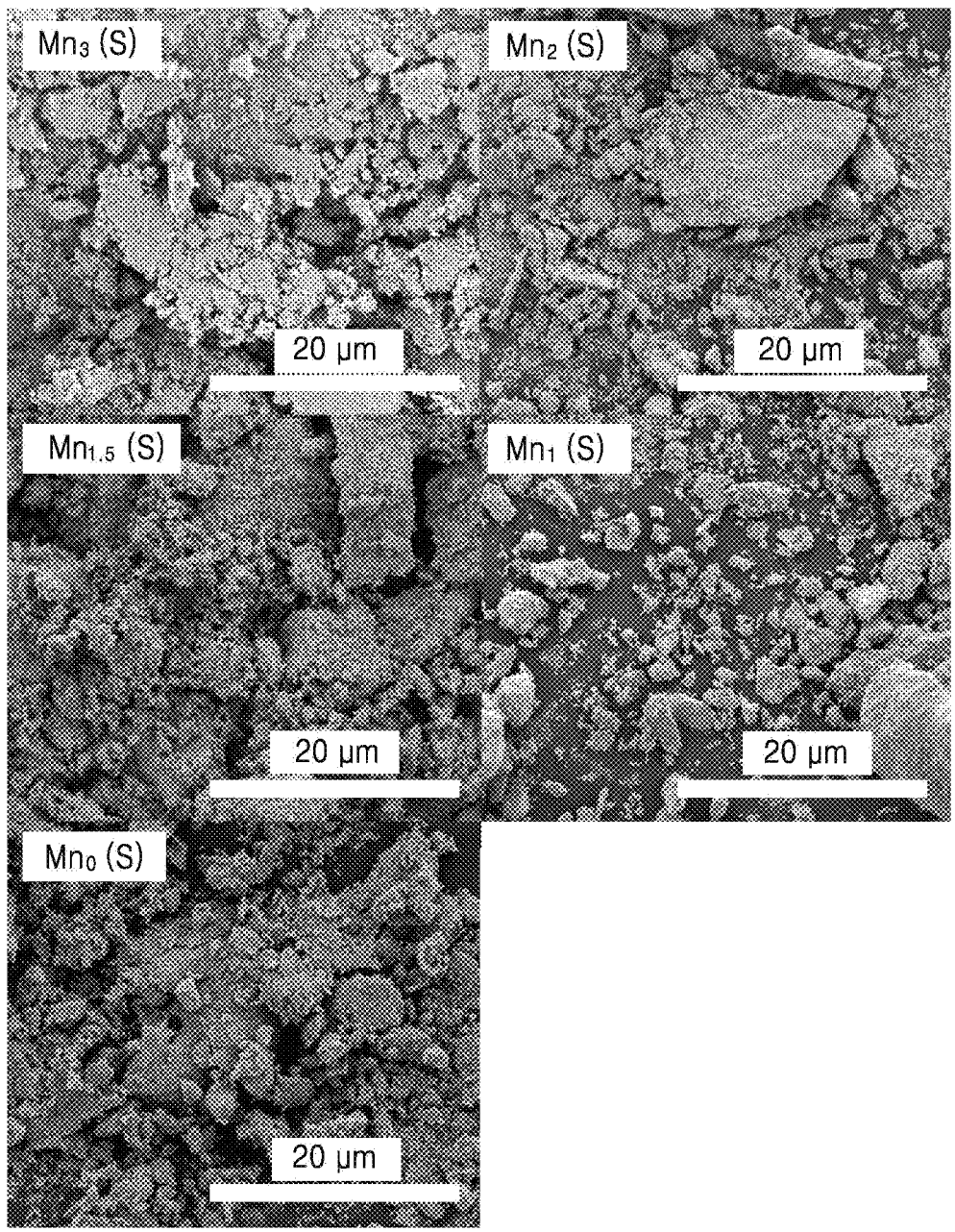

FIG. 1 shows morphology of $ZrO_2$ and $ZrO_2$ ($d^0$ orbital transition metal oxide) catalysts functionalized with $NO_3^-/$ $SO_4^{2-}/H_2PO_4^-/HPO_4^{2-}/PO_4^{3-}$ according to an embodiment of the present invention. FIG. 2 shows morphology of grains of transition metal oxide $MnO_2$ (referred to as Mn) and $NO_3^-$-functionalized $MnO_2$ catalyst (referred to as Mn (N)) according to an embodiment of the present invention. FIG. 3 shows morphology of $SO_4^{2-}$-functionalized $Mn_ZFe_{3-Z}O_4$ catalyst (where Z=3, 2, 1.5, 1, 0; referred to as $Mn_Z$) according to an embodiment of the present invention.

Figure 4:
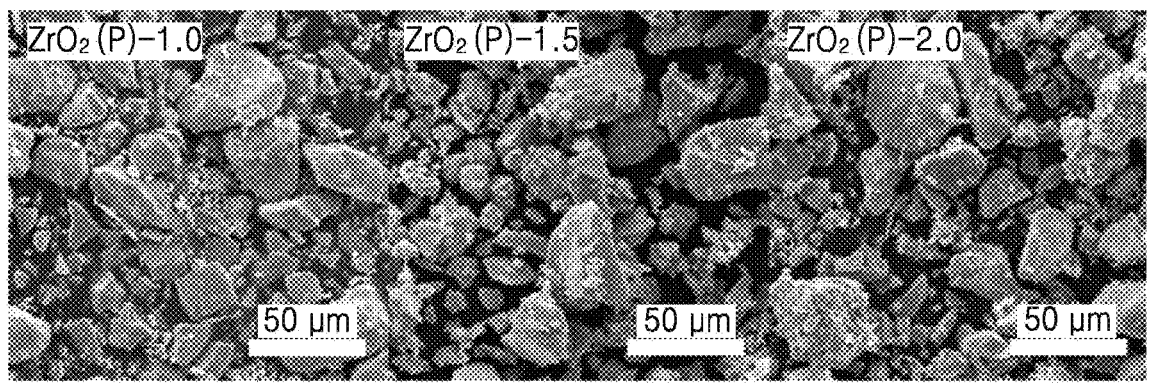
Figure 5:
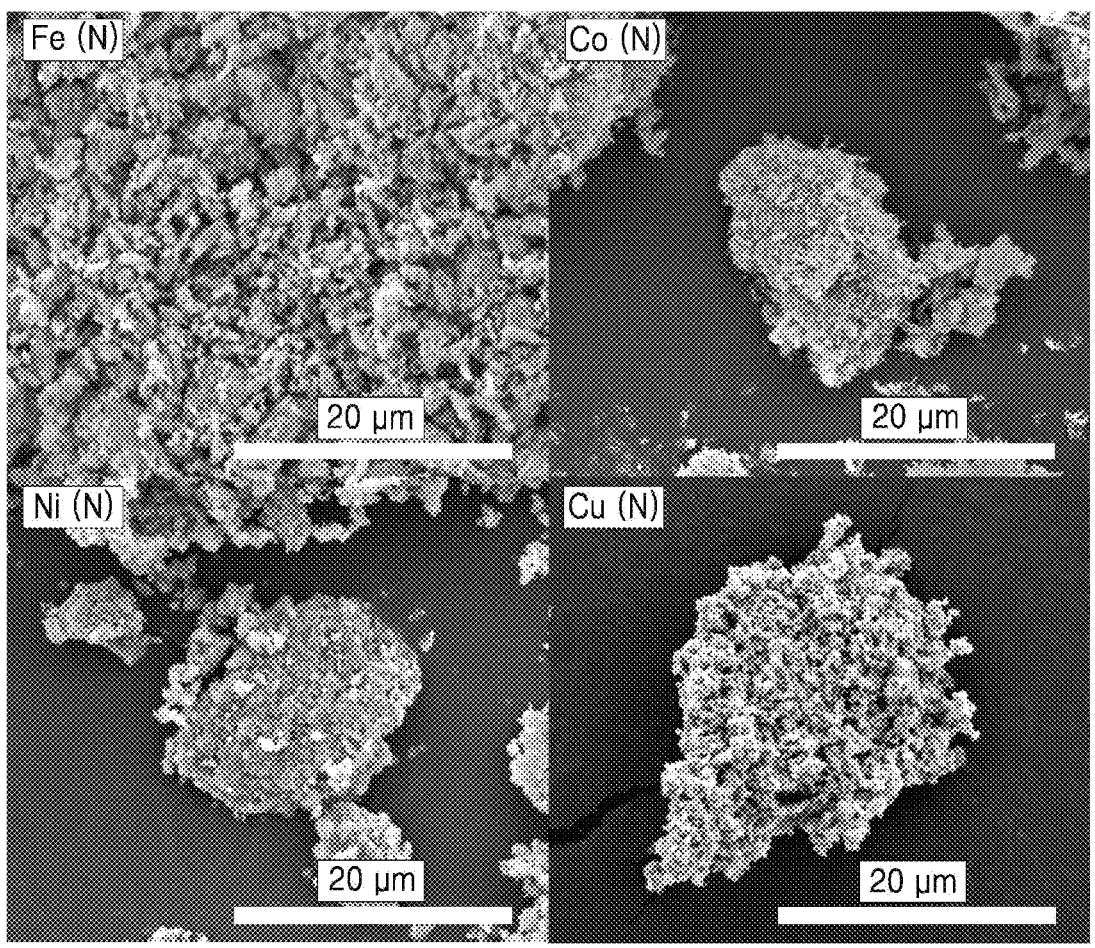
Figure 6:
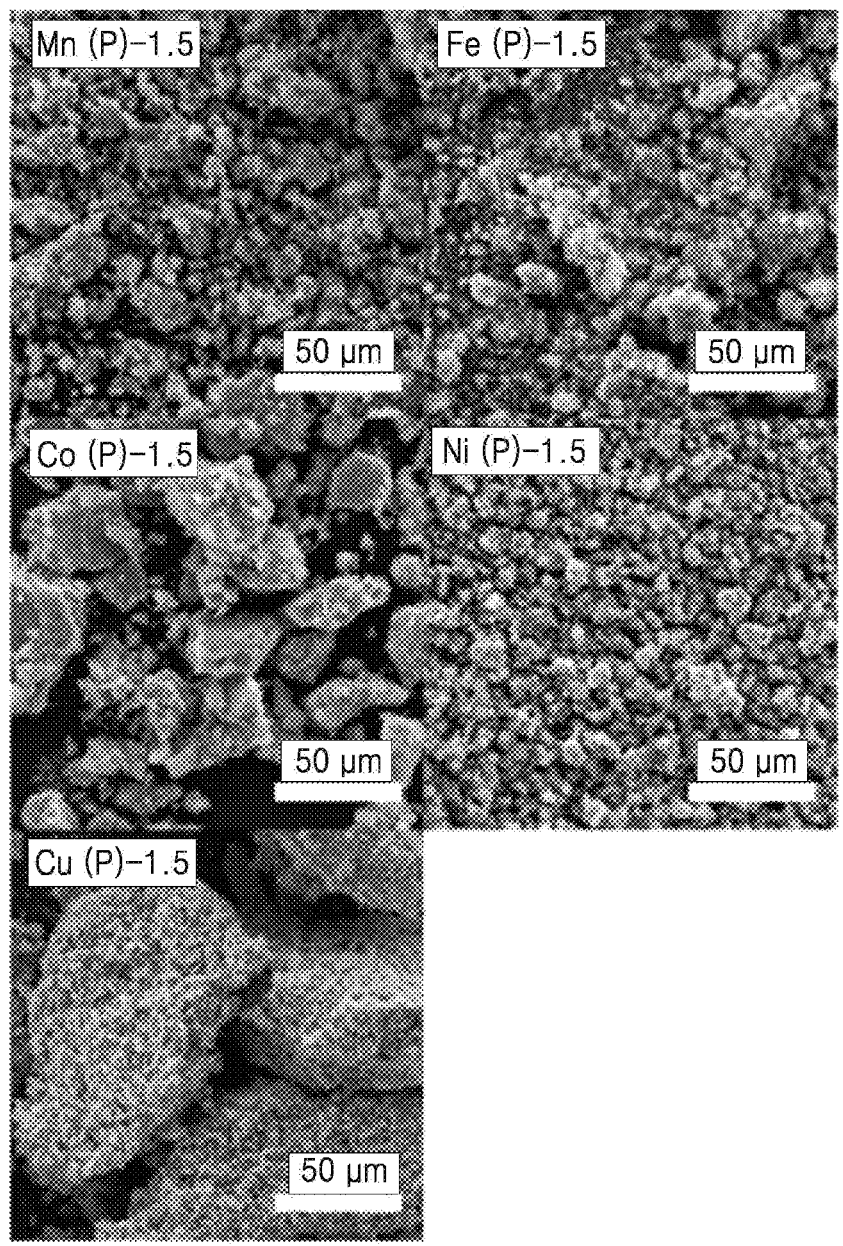

FIG. 4 shows morphology of $ZrO_2$ ($d^0$ orbital transition metal oxide) catalysts functionalized with different amounts of $H_2PO_4^-/HPO_4^{2-}/PO_4^{3-}$ according to an embodiment of the present invention. FIG. 5 shows morphology of Fe, Co, Ni, and Cu metal oxides functionalized with $NO_3^-$ at 100° C. FIG. 6 shows morphology of manganese (Mn), iron (Fe), cobalt (Co), nickel (Ni), and copper (Cu) oxides (non-$d^0$ orbital transition metal oxide) catalysts functionalized with the same amount of $H_2PO_4^-/HPO_4^{2-}/PO_4^{3-}$ according to an embodiment of the present invention.

As shown in FIGS. 1 to 6, when the catalyst grains have 1) a small diameter or 2) a rough surface with pores or protrusions, a surface area increases, and thus a catalytic decomposition rate of hydrogen peroxide increases, so that a production rate of ·OH species and conversion rates of $NO_3^-/SO_4^{2-}/H_2PO_4^-/HPO_4^{2-}/PO_4^{3-}$ functional groups into $NO_3\cdot/SO_4.^-/H_2PO_4\cdot/HPO_4.^-/PO_4^{2\cdot-}$ surface species on the surface of the catalyst by the ·OH species may increase.

In addition, when the catalyst grains have the two characteristics described above, they may be coated on the cathode with a higher intensity. This indicates that a leaching phenomenon caused by a vortex of an aqueous electrolytic solution in which electro-Fenton reaction is performed and external electric power is reduced, thereby increasing lifespan of an electrode. When the catalyst is leached from the electrode, ·OH production or decomposition of non-degradable organic materials by $NO_3\cdot/SO_4.^-/H_2PO_4\cdot/HPO_4.^-/PO_4^{2\cdot-}$ may be performed by the leached catalyst species based on homogeneous catalysis. In this case, the non-degradable organic material decomposition efficiency decreases and the number of use of the electro-Fenton catalyst is limited.

That is, as the leaching phenomenon decreases, ·OH production or decomposition of non-degradable organic materials by $NO_3\cdot/SO_4.^-/H_2PO_4\cdot/HPO_4.^-/PO_4^{2\cdot-}$ are performed based on heterogeneous catalysis by the catalyst grains coated on the cathode, performance of the catalyst may be maintained even after multiple uses in the electro-Fenton reaction. Therefore, the catalyst grains according to an embodiment of the present invention may have rough surface characteristics with pores not to be leached from the electrode.

Catalyst for Non-Electro-Fenton System

According to an embodiment of the present invention, a catalyst for a non-electro-Fenton system may include one or more species of $d^0$-orbital-based or non-$d^0$-orbital-based transition metal oxide catalyst grains including $NO_3^-$, $SO_4^{2-}$, $H_2PO_4^-$, $HPO_4^{2-}$, or $PO_4^{3-}$ functional groups. Specifically, the transition metal oxide catalyst grains of the present invention may include crystal structures of all metal oxides existing in a stable state in a metal-oxygen phase equilibrium, wherein an oxidation number of metal species M varies from 1 to 4. For example, the transition metal oxide catalyst grains may include $Mn_2O_3(Mn^{3+})$, $Mn_3O_4(Mn^{2+}$ and $Mn^{3+})$, $Co_3O_4(Co^{2+}$ and $Co^{3+})$, $Fe_2O_3(Fe^{3+})$, NiO ($Ni^{2+}$), CuO($Cu^{2+}$), $Cu_2O(Cu^+)$, or the like.

More specifically, the transition metal contained in the transition metal oxide catalyst grains may be a transition metal of period 4 to period 6. According to an embodiment of the present invention, the transition metal may include at least one selected from a 3d-block metal (Sc, Ti, V, Cr, Mn, Fe, Co, Ni, Cu, or Zn), a 4d-block metal (Y, Zr, Nb, Mo, Tc, Ru, Rh, Pd, Ag, or Cd), a 5d-block metal (La, Hf, Ta, W, Re, Os, Ir, Pt, Au, or Hg), and a 6d-block metal (Ac, Rf, Db, Sg, Bh, Hs, Mt, Ds, Rg, Cn) in the periodic table, or any combination thereof.

According to an embodiment of the present invention, the catalyst for a non-electro-Fenton system may be prepared using a method used to form particular transition metal oxide grains and commonly available in the art. For example, the transition metal oxide grains included in the catalyst may be synthesized using one or more methods among hydrothermal synthesis, solvothermal synthesis, mechano-chemical method (ball-milling), non-templated or templated method, impregnation method, dip coating, and calcination or thermal decomposition method using M-including complex.

According to an embodiment of the present invention, the catalyst supplied to the non-electro-Fenton system may be coated on a support to efficiently use $M^{\delta+}$ active sites and $NO_3^-$, $SO_4^{2-}$, $H_2PO_4^-$, $HPO_4^{2-}$, or $PO_4^{3-}$ functional groups present on the surface of the catalyst. That is, a support capable of promoting catalytic decomposition of hydrogen peroxide (catalytic $H_2O_2$ scission) and radical transfer of ·OH⇒$NO_3\cdot$, ·OH⇒$SO_4.^-$, ·OH⇒$H_2PO_4\cdot$, ·OH⇒$HPO_4^{*-}$, or ·OH⇒$PO_4^{2\cdot-}$ and having chemical resistance to radicals and hydrogen peroxide may be used. The support may be formed of a carbonaceous material such as graphite, carbon felt, or glassy carbon fiber or a metallic material such as stainless steel or titanium.

According to an embodiment of the present invention, the catalyst for a non-electro-Fenton system may include $M^{\delta+}$ (δ≤2) active species used to decompose the supplied hydrogen peroxide on the surface of the catalyst. Specifically, catalytic decomposition of hydrogen peroxide ($H_2O_2$→·OH+$OH^-$) is activated using the $M^{\delta+}$ active sites based on homogeneous catalysis or heterogeneous catalysis and $NO_3^-$, $SO_4^{2-}$, $H_2PO_4^-$, $HPO_4^{2-}$, or $PO_4^{3-}$ functional group present in the transition metal oxide catalyst grains coated on the support may be converted into $NO_3\cdot$, $SO_4.^-$, $H_2PO_4\cdot$, $HPO_4.^-$, or $PO_4^{2\cdot-}$ surface species using the ·OH species produced as a result of the reaction. Therefore, a transition metal oxide, which includes a large quantity of $M^{\delta+}$ active site and is inexpensive and easily synthesizable, may be used as the catalyst coated on the support to promote the catalytic decomposition of hydrogen peroxide.

In addition, the catalyst for a non-electro-Fenton system may form the $NO_3\cdot$, $SO_4.^-$, $H_2PO_4\cdot$, $HPO_4.^-$, or $PO_4^{2\cdot-}$ surface species (·OH⇒$NO_3\cdot$, ·OH⇒$SO_4.^-$, ·OH⇒$H_2PO_4\cdot$, ·OH⇒$HPO_4^{*-}$, or ·OH⇒$PO_4^{2\cdot-}$) based on radical transfer of the above-described ·OH species to the $NO_3^-$, $SO_4^{2-}$, $H_2PO_4^-$, $HPO_4^{2-}$, or $PO_4^{3-}$ functional group on the surface of the catalyst and promote decomposition of non-degradable organic materials by using the same. Therefore, a transition metal oxide catalyst including a large quantity of $NO_3^-$, $SO_4.^-$, $H_2PO_4^-$, $HPO_4^-$, or $PO_4^{2-}$ functional groups on the surface thereof may be used.

As described above, performance of the catalyst may be improved by maximizing the $M^{\delta+}$ and $NO_3^-$, $SO_4^{2-}$, $H_2PO_4^-$, $HPO_4^{2-}$, or $PO_4^{3-}$ functional group on the surface of the transition metal oxide catalyst and adjusting functionalization (nitrification/sulfation/phosphorylation) conditions of $NO_3^-$, $SO_4^{2-}$, $H_2PO_4^-$, $HPO_4^{2-}$, or $PO_4^{3-}$ on the surface of the transition metal catalyst.

According to an embodiment of the present invention, the nitrification may be performed by a reaction gas including NO and $O_2$. A concentration of NO and $O_2$ may be in the range of 10 ppm to $10^5$ ppm, a flow rate of the reaction gas may be in the range of $10^{-5}$ mL min$^{-1}$ to $10^5$ mL min$^{-1}$, and a pressure may be in the range of $10^{-5}$ bar to $10^5$ bar. In addition, the nitrification may be performed at a temperature of 50° C. to 500° C. for 0.1 hours to 24 hours.

According to an embodiment of the present invention, the sulfation may be performed by a reaction gas including $SO_2$ and $O_2$. A concentration of $SO_2$ and $O_2$ may be in the range of 10 ppm to $10^5$ ppm, a flow rate of the reaction gas may be in the range of $10^{-5}$ mLmin$^{-1}$ to $10^5$ mLmin$^{-1}$, and a pressure may be in the range of $10^{-5}$ bar to $10^5$ bar. In addition, the sulfation may be performed at a temperature of 200° C. to 800° C. for 0.1 hours to 24 hours.

According to an embodiment of the present invention, the phosphorylation may be performed by a reaction solution including a phosphorylating precursor (e.g., phosphoric acid ($H_3PO_4$) or diammonium phosphate (($NH_4)_2HPO_4$)). A concentration of the phosphorylating precursor may be in the range of $10^{-6}$ mol L$^{-1}$ to $10^6$ mol L$^{-1}$. The phosphorylating precursor-supporting transition metal oxide may be converted into a transition metal oxide catalyst functionalized by phosphorylation using the reaction gas including $O_2$. A concentration of $O_2$ included in the reaction gas may be in the range of 10 ppm to $5 \times 10^5$ ppm, a flow rate may be in the range of $10^{-5}$ mL min$^{-1}$ to $10^5$ mL and a pressure may be in the range of $10^{-5}$ bar to $10^5$ bar, and the phosphorylation may be performed at a temperature of 100° C. to 800° C. for 0.1 hours to 24 hours.

When the conditions for the nitrification/sulfation/phosphorylation of the transition metal oxide catalyst are less than the above-described ranges, functionalization effects on the catalyst with $NO_3^-/SO_4^{2-}/H_2PO_4^-/HPO_4^{2-}/PO_4^{3-}$ may be insufficient. Also, when the conditions are greater than the above-described ranges, the surface of the transition metal oxide catalyst may be excessively functionalized and thus surface species such as $Zr^{4+}/Nb^{5+}/Ta^{5+}$ or $Fe^{2+}/Co^{2+}/Ni^{2+}$, which promote the activity of the catalytic decomposition of hydrogen peroxide (production of ·OH) may vanish. Therefore, the nitrification/sulfation/phosphorylation of the catalyst may be performed within the above-described ranges.

In the catalyst for a non-electro-Fenton system according to the present invention, as a surface area increases, a production rate of ·OH by the $M^{\delta+}$ species and a conversion rate of $NO_3^-$, $SO_4^{2-}$, $H_2PO_4^-$, $HPO_4^{2-}$, or $PO_4^{3-}$ functional groups into $NO_3$·, $SO_4^{-}$·, $H_2PO_4$·, $HPO_4^{-}$·, or $PO_4^{2-}$· surface species by the ·OH species on the surface of the catalyst may increase. Representatively, Reaction Schemes c and d show conversion of the $NO_3^-$ functional groups. As the above-described reaction rate increases, the amounts of the amount of $NO_3$· surface species increases in the reaction system, thereby promoting decomposition of harmful materials.

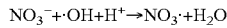 Reaction Scheme c:

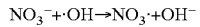 Reaction Scheme d:

According to an embodiment of the present invention, the transition metal oxide catalyst grains functionalized with $NO_3^-$, $SO_4^{2-}$, $H_2PO_4^-$, $HPO_4^{2-}$, or $PO_4^{3-}$ may have a porous structure and a diameter of 0.1 nm to 500 µm.

When the catalyst grains of the transition metal oxide have 1) a small diameter or 2) a rough surface with pores or protrusions, a surface area increases, and thus a catalytic decomposition rate of hydrogen peroxide increases, so that a production rate of ·OH species and conversion rates of $NO_3^-$, $SO_4^{2-}$, $H_2PO_4^-$, $HPO_4^{2-}$, or $PO_4^{3-}$ functional groups into $NO_3$·, $SO_4^{-}$·, $H_2PO_4$·, $HPO_4^{-}$·, or $PO_4^{2-}$· surface species on the surface by the ·OH species may increase.

In addition, when the transition metal oxide catalyst grains have the above two characteristics, they may be coated on the support with a higher intensity. This indicates that a leaching phenomenon of the catalyst, which is caused by a vortex of an aqueous solution in which decomposition of non-degradable organic materials is performed, is reduced, thereby increasing lifespan of the support coated with the catalyst. When the catalyst is leached from the support, ·OH production or decomposition of non-degradable organic materials by $NO_3$· may be performed by the leached catalyst species based on homogeneous catalysis. In this case, non-degradable organic materials decomposition efficiency decreases and the number of use of the catalyst coated on the support is limited.

That is, as the leaching phenomenon decreases, ·OH production or decomposition of non-degradable organic materials by $NO_3$· are performed based on heterogeneous catalysis by the transition metal oxide grains coated on the support, and thus performance of the catalyst may be maintained even after multiple uses. Therefore, the transition metal oxide catalyst grains according to an embodiment of the present invention may have rough surface characteristics with pores to inhibit the leaching phenomenon from the support.

Electrode for Electro-Fenton System

Hereinafter, an electrode including the catalyst for an electro-Fenton system will be described.

An electrode for an electro-Fenton system according to an embodiment of the present invention is an electrode for an electro-Fenton system including the catalyst for an electro-Fenton system. The electrode includes a carrier supporting the catalyst for an electro-Fenton system, a substrate on which the catalyst-supporting carrier is formed, and a binder interposed between the carrier and the substrate and increasing a coating adhesive strength.

The catalyst for an electro-Fenton system includes a transition metal oxide functionalized with $NO_3^-/SO_4^{2-}/H_2PO_4^-/HPO_4^{2-}/PO_4^{3-}$ as described above. The catalyst may be directly coated on the substrate or supported by the carrier for stably and efficiently constructing an electrode. In this regard, the carrier may be formed on at least one surface of the substrate, preferably, on both surfaces of the substrate. The substrate may be formed of a conductive material commonly used in electrochemical reaction. For example, graphite or a metal such as copper and aluminum may be used.

In addition, according to an embodiment of the present invention, the carrier may be formed of carbon (C), $Al_2O_3$, MgO, $ZrO_2$, $CeO_2$, $TiO_2$, or $SiO_2$ and may include 0.01 to 50 parts by weight of the catalyst for an electro-Fenton system based on 100 parts by weight of the carrier.

The catalyst-supporting carrier may be coated on the substrate using an impregnation method. In this case, the amount of the coated catalyst may be adjusted for increasing efficiency of ·OH production or non-degradable organic material decomposition by $NO_3$·/$SO_4^-$·/$H_2PO_4$·/$HPO_4^-$·/$PO_4^{2-}$· and smooth transfer of the ·OH to the $NO_3^-/SO_4^{2-}/H_2PO_4^-/HPO_4^{2-}/PO_4^{3-}$ functional groups on the surface of the catalyst.

When the catalyst is coated on the substrate, the adhesive strength between the catalyst and the substrate may be increased using the binder. In this case, the binder may be an insoluble polymer or an inorganic binder, preferably, polyvinylidene fluoride (PVDF). The binder may increase the coating adhesive strength between the catalyst-supporting carrier and the substrate. When the binder has insolubility, the binder is not dissolved in an aqueous solution even after repeated electro-Fenton reaction, thereby preventing the leaching phenomenon of the catalyst. That is, lifespan characteristics of the electrode for the electro-Fenton system may be improved by inhibiting leaching of the catalyst. The inorganic binder may include at least one of $SiO_2$, $LiO_2$, $K_2O$, $ZrO_2$, $Al_2O_3$, and $Na_2SiO_3$.

Electro-Fenton System

Figure 7:
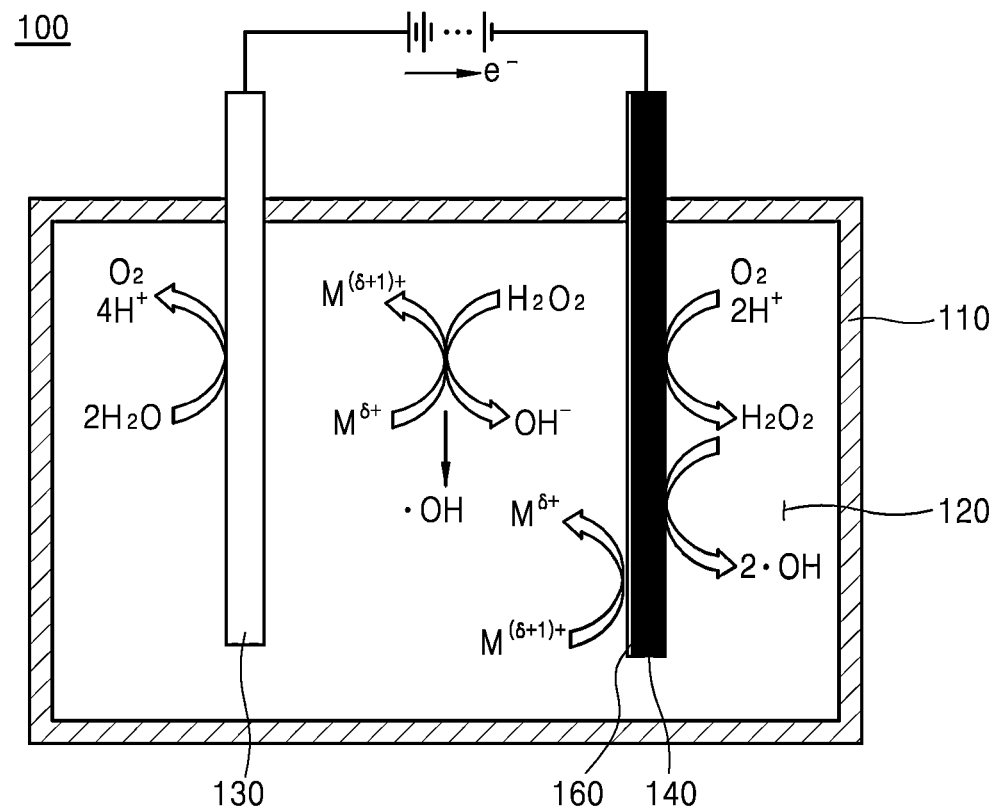
FIGS. 7 and 8 are schematic diagrams of electro-Fenton systems including a catalyst according to an embodiment of the present invention.
Figure 8:
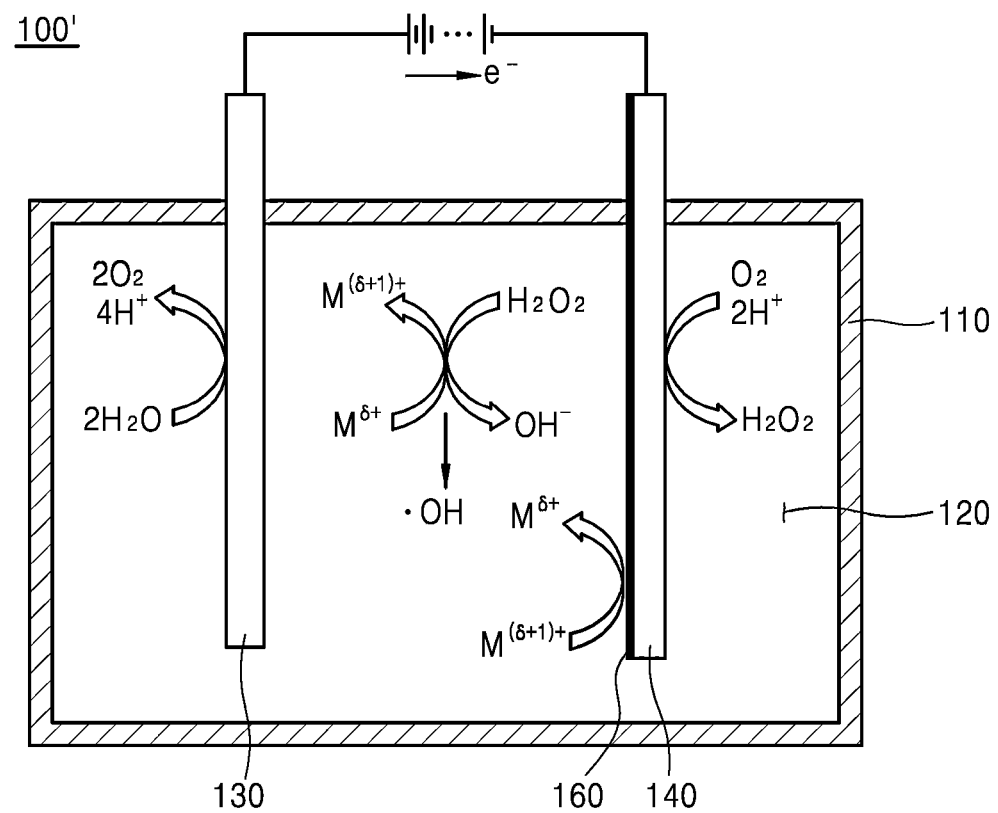

FIGS. 7 and 8 are schematic diagrams of electro-Fenton systems 100 and 100' including a catalyst 160 according to an embodiment of the present invention.

Referring to FIG. 7, an electro-Fenton system 100 may include an electrolytic bath 110, an aqueous electrolytic solution 120, a first electrode (anode) 130, and a second electrode (cathode) 140 coated with a catalyst 160. The first electrode 130 may be connected to the second electrode 140 by a power source. By using the anode 130 that is not coated with grains of the catalyst 160 suggested in an embodiment of the present invention, sufficient ·OH species are generated by $H_2O$ oxidation. Also, by using the cathode 140 coated with grains of the catalyst 160 suggested in the present invention, immediate catalytic decomposition of hydrogen peroxide is realized on the surface of the cathode 140 by $M^{\delta+}$ species (e.g., $Fe^{2+}/Co^{2+}/Ni^{2+}$) or $Zr^{4+}/Nb^{5+}/Ta^{5+}$ species included on the surface transition metal oxide catalyst. Thus, a production rate of ·OH species further increases by catalytic decomposition of hydrogen peroxide based on heterogeneous catalysis under specific reaction conditions.

Referring to FIG. 8, the electro-Fenton system 100' may include an electrolytic bath 110, an aqueous electrolytic solution 120, a first electrode (anode) 130, and a second electrode (cathode) 140 coated with a catalyst 160. The first electrode 130 may be connected to the second electrode 140 by a power source. By using the anode 130 that is not coated with the catalyst 160 including $(M_A)_Z(M_B)_{3-Z}O_4$ grains suggested in an embodiment of the present invention, sufficient ·OH species are generated by $H_2O$ oxidation. Also, by using the cathode 140 coated with the catalyst 160 including $(M_A)_Z(M_B)_{3-Z}O_4$ grains suggested in the present invention, immediate catalytic decomposition of hydrogen peroxide is realized on the surface of the cathode 140 by $M^{\delta+}$ species included on the surface of the transition metal oxide catalyst. Thus, a production rate of ·OH species further increases by catalytic decomposition of hydrogen peroxide based on heterogeneous catalysis under specific reaction conditions.

It is important that as the production rate of the ·OH species produced by the above-described $H_2O$ oxidation and catalytic decomposition of hydrogen peroxide increases, 1) transfer speed of ·OH species to $NO_3^-/SO_4^{2-}/H_2PO_4^-/HPO_4^{2-}/PO_4^{3-}$ functional groups present on the surface of the catalyst 160 coated on the cathode 140 increases, 2) formation rate of $NO_3·/SO_4·^-/H_2PO_4·/HPO_4·^-/PO_4^{2·-}$ species on the surface of the catalyst increases by radical transfer reaction between ·OH and $NO_3^-/SO_4^{2-}/H_2PO_4^-/HPO_4^{2-}/PO_4^{3-}$, and 3) ultimately, highly-efficient decomposition of organic materials by $NO_3·/SO_4·^-/H_2PO_4·/HPO_4·^-/PO_4^{2·-}$ species based on heterogeneous catalysis is possible.

The first electrode 130 and the second electrode 140 may be formed of a conductive material. For example, graphite may be used. The catalyst 160 may be coated on at least one surface of the second electrode 140 and may be a catalyst including transition metal oxide grains functionalized with $NO_3^-/SO_4^{2-}/H_2PO_4^-/HPO_4^{2-}/PO_4^{3-}$ according to the above-described embodiments of the present invention.

The aqueous electrolytic solution 120 is an aqueous solution used in electro-Fenton reaction and may include one of $Na_2SO_4$, $NaNO_3$, $NH_4F$, KF, KCl, KBr, KI, NaF, NaCl, NaBr, NaI, or any combination thereof having a concentration of $10^4$ mol/L to 10 mol/L.

Hereinafter, a process of decomposing an organic material will be described based on catalytic reaction occurring in the electro-Fenton systems 100 and 100'. Reactions occurring in the electro-Fenton systems 100 and 100' are expressed by Reaction Schemes 11 to 31 below.

$2H_2O \rightarrow O_2 + 4H^+ + 4e^-$  Reaction Scheme 11:

$O_2 + 2H^+ + 2e^- \rightarrow H_2O_2$  Reaction Scheme 12:

$M^{(\delta+1)+} + e^- \rightarrow M^{\delta+}$  Reaction Scheme 13:

$M^{\delta+} + H_2O_2 \rightarrow M^{(\delta+1)+} + OH^- + ·OH$  Reaction Scheme 14:

$H_2O \rightarrow ·OH + H^+ + e^-$  Reaction Scheme 15:

$H_2O_2 \rightarrow ·OH + ·OH$  Reaction Scheme 16:

$NO_3^- + ·OH + H^+ \rightarrow NO_3· + H_2O$  Reaction Scheme 17:

$NO_3^- + ·OH \rightarrow NO_3· + OH^-$  Reaction Scheme 18:

$SO_4^{2-} + ·OH + H^+ \rightarrow SO_4·^- + H_2O$  Reaction Scheme 19:

$SO_4^{2-} + ·OH \rightarrow SO_4·^- + OH^-$  Reaction Scheme 20:

$H_2PO_4^- + ·OH + H^+ \rightarrow H_2PO_4· + H_2O$  Reaction Scheme 21:

$H_2PO_4^- + ·OH \rightarrow H_2PO_4· + OH^-$  Reaction Scheme 22:

$HPO_4^{2-} + ·OH + H^+ \rightarrow HPO_4·^- + H_2O$  Reaction Scheme 23:

$HPO_4^{2-} + ·OH \rightarrow HPO_4·^- + OH^-$  Reaction Scheme 24:

$PO_4^{3-} + ·OH + H^+ \rightarrow PO_4^{2·-} + H_2O$  Reaction Scheme 25:

$PO_4^{3-} + ·OH \rightarrow PO_4^{2·-} + OH^-$  Reaction Scheme 26:

$NO_3· + e^- \rightarrow NO_3^-$  Reaction Scheme 27:

$SO_4·^- + e^- \rightarrow SO_4^{2-}$  Reaction Scheme 28:

$H_2PO_4· + e^- \rightarrow H_2PO_4^-$  Reaction Scheme 29:

$HPO_4·^- + e^- \rightarrow HPO_4^{2-}$  Reaction Scheme 30:

$PO_4^{2·-} + e^- \rightarrow PO_4^{3-}$  Reaction Scheme 31:

First, water is decomposed into oxygen ($O_2$) and hydrogen ions ($H^+$) on the anode 130 by oxidation caused by an external power source (Reaction Scheme 11). Then, the produced oxygen ($O_2$) and hydrogen ions ($H^+$) are reduced on the second electrode 140 to form hydrogen peroxide ($H_2O_2$) (Reaction Scheme 12).

In an embodiment of the present invention, the formed hydrogen peroxide reacts with metal species $M^{\delta+}$ included in non-$d^0$-orbital-based transition metal oxide grains and having an oxidation number of 2 or less to form metal species $M^{(\delta+1)+}$ having an oxidation number of $\delta+1$ and ·OH (Reaction Scheme 14). The metal species $M^{(\delta+1)+}$ having an oxidation number of $\delta+1$ is reduced by electrons ($e^-$) back to the metal species $M^{\delta+}$ having an oxidation number of 2 or less (Reaction Scheme 13). This may solve a conventional problem in recovering the metal species $M^{\delta+}$ having an oxidation number of 2 or less from the metal species $M^{(\delta+1)+}$ having an oxidation number of $\delta+1$ that is formed by reaction between the metal species $M^{\delta+}$ having an oxidation number of 2 or less and hydrogen peroxide ($H_2O_2$), and hydrogen peroxide ($H_2O_2$) may be continuously supplied by supplying oxygen ($O_2$) via electrolysis of water. In addition, ·OH may also be continuously supplied via oxidation of $H_2O$ in the first electrode 130 (Reaction Scheme 15).

In addition, according to an embodiment of the present invention, the formed hydrogen peroxide reacts with metal species (e.g., $Zr^{4+}/Nb^{5+}/Ta^{5+}$) included in the $d^0$-orbital-based transition metal oxide grains to produce ·OH (Reaction Scheme 16). Since the oxidation number of the metal species (e.g., $Zr^{4+}/Nb^{5+}/Ta^{5+}$) included in the $d^0$-orbital-based transition metal oxide grains is not changed unlike the metal species (e.g., $Fe^{2+}/Co^{2+}/Ni^{2+}$) included in the non-$d^0$-orbital-based transition metal oxide, hydrogen peroxide ($H_2O_2$) may be continuously decomposed.

That is, the production rate of ·OH is increased by $H_2O$ oxidation occurring in the first electrode 130 and catalytic decomposition of hydrogen peroxide occurring in the second electrode 140, and the produced ·OH interacts with $NO_3^-/SO_4^{2-}/H_2PO_4^-/HPO_4^{2-}/PO_4^{3-}$ functional groups on the surface of the catalyst 1600 coated on the second electrode 140 to form $NO_3\cdot/SO_4\cdot^-/H_2PO_4\cdot/HPO_4\cdot^-/PO_4^{2\cdot-}$ surface species (Reaction Schemes 17 to 26). As the amount of the $NO_3^-/SO_4^{2-}/H_2PO_4^-/HPO_4^{2-}/PO_4^{3-}$ functional groups on the surface of the coated catalyst 160 increases, the production rate of the $NO_3\cdot/SO_4\cdot^-/H_2PO_4\cdot/HPO_4\cdot^-/PO_4^{2\cdot-}$ surface species increases, resulting in enhancement of performance of organic material decomposition by the $NO_3\cdot/SO_4\cdot^-/H_2PO_4\cdot/HPO_4\cdot^-/PO_4^{2\cdot-}$ surface species. Residual $NO_3\cdot/SO_4\cdot^-/H_2PO_4\cdot/HPO_4\cdot^-/PO_4^{2\cdot-}$ surface species that have not been used in decomposition of the organic material are reduced back to the $NO_3^-/SO_4^{2-}/H_2PO_4^-/HPO_4^{2-}/PO_4^{3-}$ functional groups by electrons ($e^-$) (Reaction Schemes 27 to 31) to be continuously used to form $NO_3\cdot/SO_4\cdot^-/H_2PO_4\cdot/HPO_4\cdot^-/PO_4^{2\cdot-}$ surface species later.

The $NO_3\cdot/SO_4\cdot^-/H_2PO_4\cdot/HPO_4\cdot^-/PO_4^{2\cdot-}$ formed by the above-described reaction may decompose non-degradable or toxic organic materials. The organic material may be phenol-based toxic, carcinogenic, and mutagenic materials. Specifically, the organic material may be a monocyclic, polycyclic, or aromatic material having a structure, in which at least one carbon atom is substituted with oxygen (O), nitrogen (N), or sulfur (S), as a backbone and including various functional groups such as alkane, alkene, alkyne, amine, amide, nitro, alcohol, ether, halide, thiol, aldehyde, ketone, ester, or carboxylic acid group or derivatives thereof.

Meanwhile, according to an embodiment of the present invention, the aqueous electrolytic solution 120 in which reaction of the catalyst occurs may have a pH of 3 to 10, and the electro-Fenton reaction may be performed at a power of 2 W or less.

Formation of $NO_3\cdot/SO_4\cdot^-/H_2PO_4\cdot/HPO_4\cdot^-/PO_4^{2\cdot-}$ are formed on the surface of the catalyst coated on the second electrode 140 in the aqueous electrolytic solution 120 of the electro-Fenton reaction, and decomposition of organic materials is performed by $NO_3\cdot/SO_4\cdot^-/H_2PO_4\cdot/HPO_4\cdot^-/PO_4^{2\cdot-}$. In this regard, when the pH of the aqueous electrolytic solution 120 is in an acidic level (pH<3) or an alkaline level (pH>10) or when the external power exceeds 2 W, the transition metal oxide grains or the $NO_3^-/SO_4^{2-}/H_2PO_4^-/HPO_4^{2-}/PO_4^{3-}$ functional groups may be leached from the catalyst 160 coated on the second electrode 140. The leached homogeneous metal ions and the $NO_3^-/SO_4^{2-}/H_2PO_4^-/HPO_4^{2-}/PO_4^{3-}$ functional groups may change the pH of the aqueous electrolytic solution and may serve as major activators of production of ·OH and $NO_3\cdot/SO_4\cdot^-/H_2PO_4\cdot/HPO_4\cdot^-/PO_4^{2\cdot-}$. This leaching phenomenon decreases organic material decomposition efficiency and durability of the electro-Fenton system when the electro-Fenton reaction is performed for a long time. Therefore, for highly-efficient and continuous decomposition of organic materials, the aqueous electrolytic solution 120 may have a pH of 3 to 10 and a power of 2 W or less may be input to the electro-Fenton system, more preferably, the aqueous electrolytic solution 120 may have a pH of 7 and a power of 0.04 W or less may be input thereto.

Catalyst Structure for Non-Electro-Fenton System and Non-Electro-Fenton System

Hereinafter, a catalyst structure including a catalyst for a non-electro-Fenton system and a non-electro-Fenton system using the same will be described.

According to an embodiment of the present invention, a catalyst structure for a non-electro-Fenton system may include a catalyst for a non-electro-Fenton system, a carrier supporting the catalyst, a support coated with the catalyst-supporting carrier, and a binder for increasing a coating adhesive strength between the carrier and the support.

The catalyst for a non-electro-Fenton system includes transition metal oxide grains functionalized with $NO_3^-$, $SO_4^{2-}$, $H_2PO_4^-$, $HPO_4^{2-}$, or $PO_4^{3-}$ as described above. The catalyst may be directly coated on the support, but may be supported by the carrier for more stable and efficient configuration of the support. In this case, the carrier may be coated on at least one surface of the support, preferably, on both surfaces of the support. The support may be formed of a material commonly used in decomposition of non-degradable organic materials or having chemical resistance to radicals or hydrogen peroxides, e.g., a carbonaceous material such as graphite, carbon felt, or glassy carbon fiber or a metallic material such as stainless steel or titanium. Preferably, graphite may be used.

In addition, according to an embodiment of the present invention, the carrier may be formed of carbon (C), $Al_2O_3$, MgO, $ZrO_2$, $CeO_2$, $TiO_2$, or $SiO_2$ and may include 0.01 to 50 parts by weight of the catalyst for a non-electro-Fenton system based on 100 parts by weight of the carrier.

The catalyst-supporting carrier may be coated on the support using an impregnation method. In this regard, the amount of the coated catalyst may be adjusted to increase efficiency of ·OH production or non-degradable organic material decomposition by $NO_3\cdot$, $SO_4\cdot^-$, $H_2PO_4\cdot$, $HPO_4\cdot^-$, or $PO_4^{2\cdot-}$ and smooth transfer of the ·OH to the $NO_3^-$, $SO_4^{2-}$, $H_2PO_4^-$, $HPO_4^{2-}$, or $PO_4^{3-}$ functional groups on the surface of the catalyst.

When the catalyst is coated on the support, the adhesive strength between the catalyst and the support may be increased using the binder. In this case, the binder may be an insoluble polymer or an inorganic binder, preferably, polyvinylidene fluoride (PVDF). The binder may increase the coating adhesive strength between the catalyst-supporting carrier and the support. When the binder has insolubility, the binder is not dissolved in an aqueous solution even after repeated decomposition of non-degradable organic materials, thereby preventing the leaching phenomenon of the catalyst. That is, lifespan characteristics of the support for the non-electro-Fenton system may be improved by inhibiting leaching of the catalyst. The inorganic binder may include at least one of $SiO_2$, $LiO_2$, $K_2O$, $ZrO_2$, $Al_2O_3$, and $Na_2SiO_3$.

Figure 42:
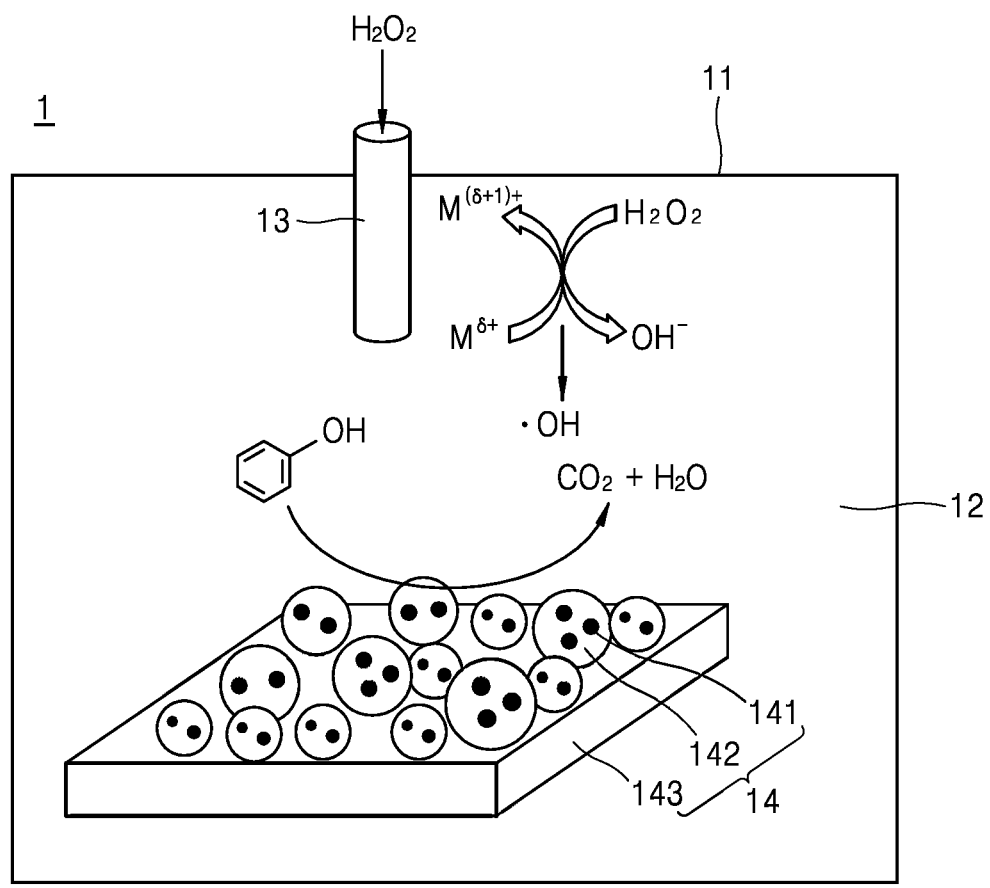
FIG. 42 is a schematic diagram illustrating a non-electro-Fenton system including a catalyst according to an embodiment of the present invention.

FIG. 42 is a schematic diagram of a non-electro-Fenton system including a catalyst according to an embodiment of the present invention.

Referring to FIG. 42, a non-electro-Fenton system 1 may include an electrolytic bath 11, an aqueous electrolytic solution 12, a hydrogen peroxide supply unit 13, and a catalyst structure 14. The catalyst structure 14 has a structure in which transition metal oxide catalyst grains 141 are coated on a support 143 in a state of being supported by a carrier 142. $M^{\delta+}$ species included on the surface of the catalyst including the transition metal oxide grains suggested in the present invention induce catalytic scission of $H_2O_2$ based on heterogeneous catalysis, thereby generating ·OH species. It is important that as the production rate of ·OH species produced by the catalytic scission of $H_2O_2$ increases, 1) transfer speed of ·OH species to $NO_3^-$ functional groups present on the surface of the catalyst coated on the support increases, 2) formation rate of $NO_3·$, $SO_4·^-$, $H_2PO_4·$, $HPO_4·^-$, or $PO_4^{2·-}$ species on the surface of the catalyst increases by radical transfer reaction between ·OH and $NO_3^-$, $SO_4^{2-}$, $H_2PO_4^-$, $HPO_4^{2-}$, or $PO_4^{3-}$, or 3) ultimately, highly-efficient decomposition of organic materials by $NO_3·$, $SO_4·^-$, $H_2PO_4·$, $HPO_4·^-$, or $PO_4^{2·-}$ species based on heterogeneous catalysis is possible.

The support may be formed of a carbonaceous material such as graphite, carbon felt, or glassy carbon fiber or a metallic material such as stainless steel or titanium. For example, graphite may be used. At least one surface of the support may be coated with the catalyst which may be a catalyst including manganese oxide grains functionalized with the above-described $NO_3^-$, $SO_4^{2-}$, $H_2PO_4^-$, $HPO_4^{2-}$, or $PO_4^{3-}$ according to an embodiment of the present invention.

The aqueous electrolytic solution is an aqueous solution used in non-electro-Fenton reaction and may include one of $Na_2SO_4$, $NaNO_3$, $NH_4F$, KF, KCl, KBr, KI, NaF, NaCl, NaBr, NaI, or any combination thereof having a concentration of $10^4$ mol/L to 10 mol/L.

Hereinafter, a process of decomposing an organic material will be described based on catalytic reaction occurring in the non-electro-Fenton system using $NO_3^-$ functional group by way of example. Reactions occurring in the non-electro-Fenton reaction are expressed by Reaction Schemes e to i below.

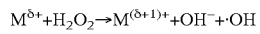  Reaction Scheme e:

$M^{\delta+} + H_2O_2 \rightarrow M^{(\delta+1)+} + OH^- + ·OH$

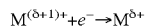  Reaction Scheme f:

$M^{(\delta+1)+} + e^- \rightarrow M^{\delta+}$

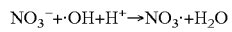  Reaction Scheme g:

$NO_3^- + ·OH + H^+ \rightarrow NO_3· + H_2O$

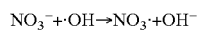  Reaction Scheme h:

$NO_3^- + ·OH \rightarrow NO_3· + OH^-$

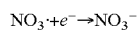  Reaction Scheme i:

$NO_3· + e^- \rightarrow NO_3^-$

First, hydrogen peroxide supplied by a hydrogen peroxide ($H_2O_2$) supply unit reacts with metal species $M^{\delta+}$ having an oxidation number of 2 or less included in transition metal oxide grains to form metal species $M^{(\delta+1)+}$ having an oxidation number of $\delta+1$ and ·OH. The metal species $M^{(\delta+1)+}$ having an oxidation number of $\delta+1$ is reduced by electrons ($e^-$) present in the aqueous solution back to the metal species $M^{\delta+}$ having an oxidation number of 2 or less. Subsequently, the produced ·OH interacts with the $NO_3^-$ functional group on the surface of the catalyst coated on the support to form $NO_3·$ surface species. As the amount of the $NO_3^-$ functional group on the surface of the coated catalyst increases, the production rate of the $NO_3·$ surface species increases, resulting in enhancement of performance of the organic material decomposition by $NO_3·$ surface species. Residual $NO_3·$ surface species that have not been used in decomposition of organic materials are reduced back to the $NO_3^-$ functional groups by electrons ($e^-$) and may be continuously used to form $NO_3·$ surface species later.

The $NO_3·$ formed by the above-described reaction may decompose non-degradable or toxic organic materials. The organic material may be phenol-based toxic, carcinogenic, and mutagenic materials. Specifically, the organic material may be a monocyclic, polycyclic, or aromatic material having a structure, in which at least one carbon atom is substituted with oxygen (O), nitrogen (N), or sulfur (S), as a backbone and including various functional groups such as alkane, alkene, alkyne, amine, amide, nitro, alcohol, ether, halide, thiol, aldehyde, ketone, ester, or carboxylic acid group or derivatives thereof.

Meanwhile, according to an embodiment of the present invention, an amount of $H_2O_2$ supplied by the hydrogen peroxide supply unit may be in the range of $10^{-5}$ mol/L to $10^5$ mol/L, and the aqueous solution may have a pH of 5 to 10.

In an embodiment of the present invention, $NO_3·$ formation occurs on the surface of the catalyst coated on the support in the aqueous electrolytic solution and decomposition of the organic material is performed by $NO_3·$ in the non-electro-Fenton reaction. In this regard, when the pH of the aqueous electrolytic solution is in an acidic level (pH<5) or an alkaline level (pH>10) or when the amount of $H_2O_2$ is less than $10^{-5}$ mol/L or more than $10^5$ mol/L, the transition metal oxide catalyst grains or $NO_3^-$ functional group may be leached from the catalyst coated on the support. The leached homogeneous metal ions species $M^{\delta+}$ having an oxidation number of 2 or less and $NO_3^-$ functional group may change the pH of the aqueous electrolytic solution and may serve as major activators of production of ·OH and $NO_3·$. This leaching phenomenon decreases organic material decomposition efficiency and durability of the non-electro-Fenton system when the non-electro-Fenton reaction is performed for a long time. Therefore, for highly-efficient and continuous decomposition of organic materials, the aqueous electrolytic solution may have a pH of 5 to 10 and $10^{-5}$ mol/L to $10^5$ mol/L of $H_2O_2$ may be supplied to the non-electro-Fenton system, more preferably, the aqueous electrolytic solution may have a pH of 7 to 10 and 10 mmol/L to 500 mmol/L of $H_2O_2$ may be supplied thereto.

Hereinafter, the present invention will be described in more detail with reference to the following examples. However, these examples are made only for illustrative purposes, and the present invention is not be construed as being limited to those examples.

EXAMPLES

Examples 1 to 3: Preparation of $ZrO_2$, $ZrO_2$ (N), and $ZrO_2$ (S) Catalysts

Porous and crystalline $ZrO_2$ catalysts were prepared by hydrothermal synthesis. Specifically, 20 mmol of $ZrOCl_2.8H_2O$ and 40 mmol of oxalic acid ($C_2H_2O_4.8H_2O$) were dissolved in 100 mL of distilled water, and the solution was stirred at 50° C. for 60 minutes, followed by drying and calcination at 400° C. for 2 hours. A catalyst prepared in Example 1 is referred to as $ZrO_2$. The $ZrO_2$ catalyst of Example 1 was placed in a reactor and exposed to nitrogen monoxide (NO) and oxygen ($O_2$) diluted with $N_2$ by simultaneously supplying them at a flow rate of 500 mL $min^{-1}$ at ambient atmospheric pressure at 100° C. for 60 minutes, and then cooled to room temperature in a $N_2$ atmosphere. In the exposure process, an amount of nitrogen monoxide was 5000 ppm and a volume of oxygen was 3 vol %. Under the conditions, a $NO^{3-}$-functionalized catalyst according to Example 2 was prepared. Hereinafter, the catalyst of Example 2 is referred to as $ZrO_2$ (N). The $ZrO_2$ catalyst of Example 1 was placed in a reactor and exposed to sulfur dioxide ($SO_2$) and oxygen ($O_2$) diluted with $N_2$ by simultaneously supplying them at a flow rate of 500 mL min$^{-1}$ at ambient atmospheric pressure at 400° C. for 60 minutes, and then cooled to room temperature in a $N_2$ atmosphere. In the exposure process, an amount of sulfur dioxide was 5000 ppm and a volume of oxygen was 3 vol %. Under the conditions, a $SO_4^{2-}$-functionalized catalyst according to Example 3 was prepared. Hereinafter, the catalyst of Example 3 is referred to as $ZrO_2$ (S).

Examples 4 to 7: Preparation $ZrO_2$ (P)-0.5, $ZrO_2$ (P)-1.5, and $ZrO_2$ (P)-2.0 Catalysts 1 g of the $ZrO_2$ catalyst of Example 1 was added to 100 mL of an aqueous solution in which a phosphorylating precursor (85 wt %, $H_3PO_4$) shown in Table 1 below was dissolved, and the solution was stirred/dried at 25° C. for 24 hours, followed by calcination at 350° C. for 3 hours. In the $ZrO_2$ catalysts including different amounts of the phosphorylating precursor, distribution of $H_2PO_4^-$, $HPO_4^{2-}$, and $PO_4^{3-}$ ions immobilized on the catalyst surface after calcination may vary. The catalysts prepared as described above according to Examples 4 to 7 are respectively referred to as $ZrO_2$ (P)—Y (where Y is content (wt %) of P contained in the catalyst).

TABLE 1

|  | Example 4 | Example 5 | Example 6 | Example 7 |
|---|---|---|---|---|
| Catalyst | $ZrO_2$ (P)-0.5 | $ZrO_2$ (P)-1.0 | $ZrO_2$ (P)-1.5 | $ZrO_2$ (P)-2.0 |
| 85 wt % $H_3PO_4$(g) | 0.037 | 0.056 | 0.074 | 0.093 |

Examples 8 to 19: Preparation of Non-d$^0$-Orbital-Based Transition Metal Oxide Catalysts Porous and crystalline transition metal oxide catalysts were prepared by templated synthesis. Manganese oxide was prepared by hydrothermal synthesis. Specifically, 200 mL of an aqueous solution including 20 mmol of $MnSO_4·H_2O$ and 20 mmol of $KMnO_4$ was stirred for 30 minutes at 25° C. and exposed to hydrothermal reaction conditions in an autoclave reactor at 160° C. for 6 hours to obtain a solid. The obtained solid was filtered/washed with distilled water and ethanol and dried at 70° C. and then further dried at 100° C. for 1 hour. Hereinafter, a manganese oxide ($MnO_2$) catalyst prepared in Example 8 is referred to as Mn catalyst.

The Mn catalyst prepared in Example 8 was exposed to an atmosphere including 5000 ppm of NO and 3 vol % of $O_2$ diluted with $N_2$ at a flow rate of 500 mL min$^{-1}$ at 150° C. for 1 hour, and then cooled to room temperature in a $N_2$ atmosphere. A $NO_3^-$-functionalized manganese oxide catalyst prepared under the conditions of Example 9 is referred to as Mn (N).

The Mn catalyst prepared in Example 8 was exposed to an atmosphere including 5000 ppm of NO and 3 vol % of $O_2$ diluted with $N_2$ at a flow rate of 500 mL min$^{-1}$ at 100° C. for 1 hour, and then cooled to room temperature in a $N_2$ atmosphere. A catalyst prepared under the conditions of Example 10 is referred to as Mn (N').

In addition, 100 mL of an aqueous solution including 20 mmol of oxalic acid ($C_2H_2O_4·2H_2O$) and 20 mmol of a metal precursor ($FeSO_4·7H_2O$ for Fe; $CoSO_4·7H_2O$ for Co; $NiSO_4·7H_2O$ for Ni; and $CuSO_4·5H_2O$ for Cu) was stirred for 30 minutes at 50° C. The resultant was filtered/washed using distilled water and ethanol and dried at 70° C., followed by calcination at 300° C. for 1 hour to prepare transition metal oxides (Hereinafter, the prepared materials are referred to as Fe, Co, Ni, and Cu catalysts, respectively).

The prepared Fe, Co, Ni, or Cu catalyst was exposed to an atmosphere including 5000 ppm of NO and 3 vol % of $O_2$ diluted with $N_2$ at a flow rate of 500 mL min$^{-1}$ at 100° C. for 1 hour, and then cooled to room temperature in a $N_2$ atmosphere. The catalysts prepared under the conditions according to Examples 11 to 14 are referred to as Fe(N'), Co(N'), Ni(N'), and Cu(N'), respectively.

Figure 9:
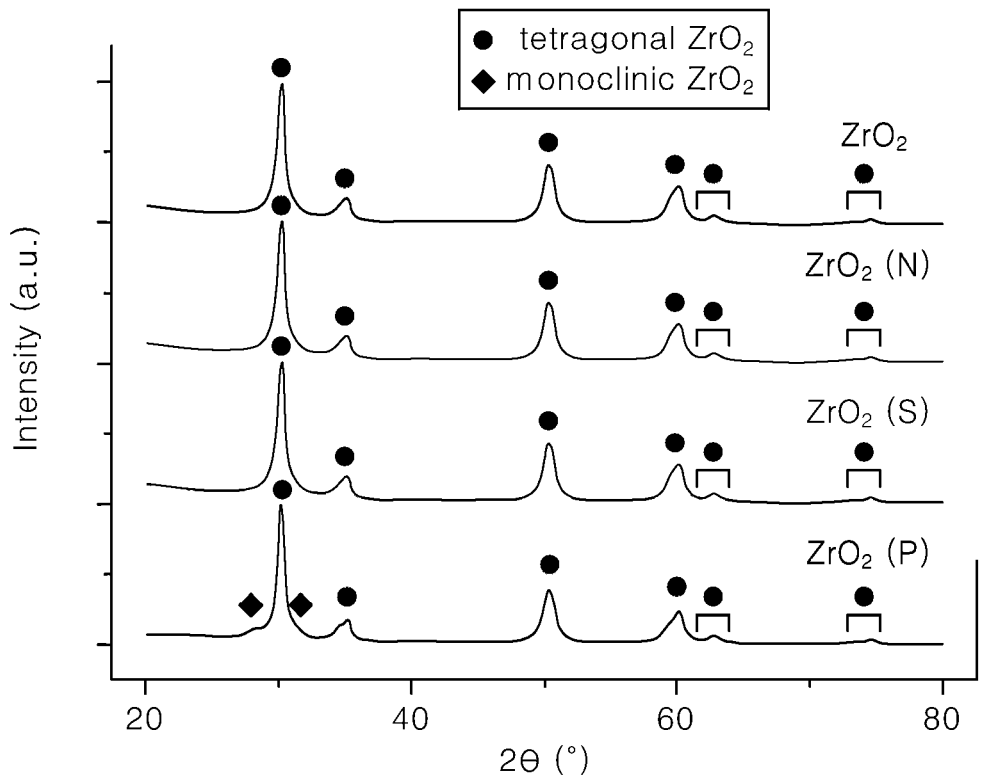
FIGS. 9 to 11 are graphs illustrating X-diffraction diffraction (XRD) patterns of catalysts according to an embodiment of the present invention.
Figure 10:
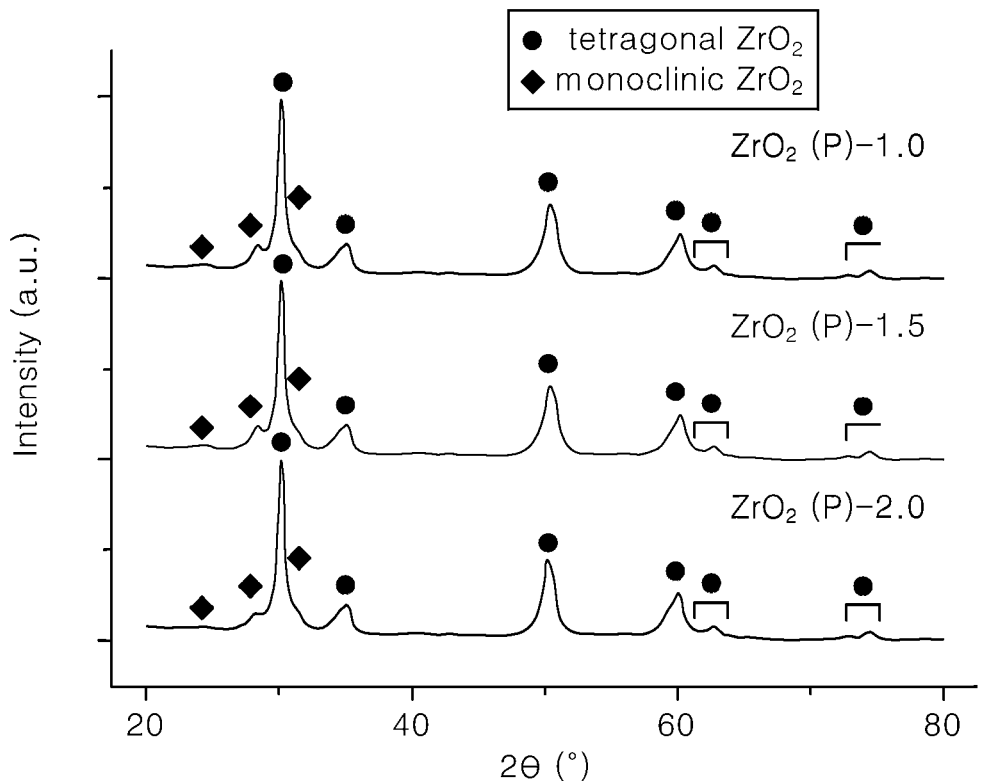
Figure 11:
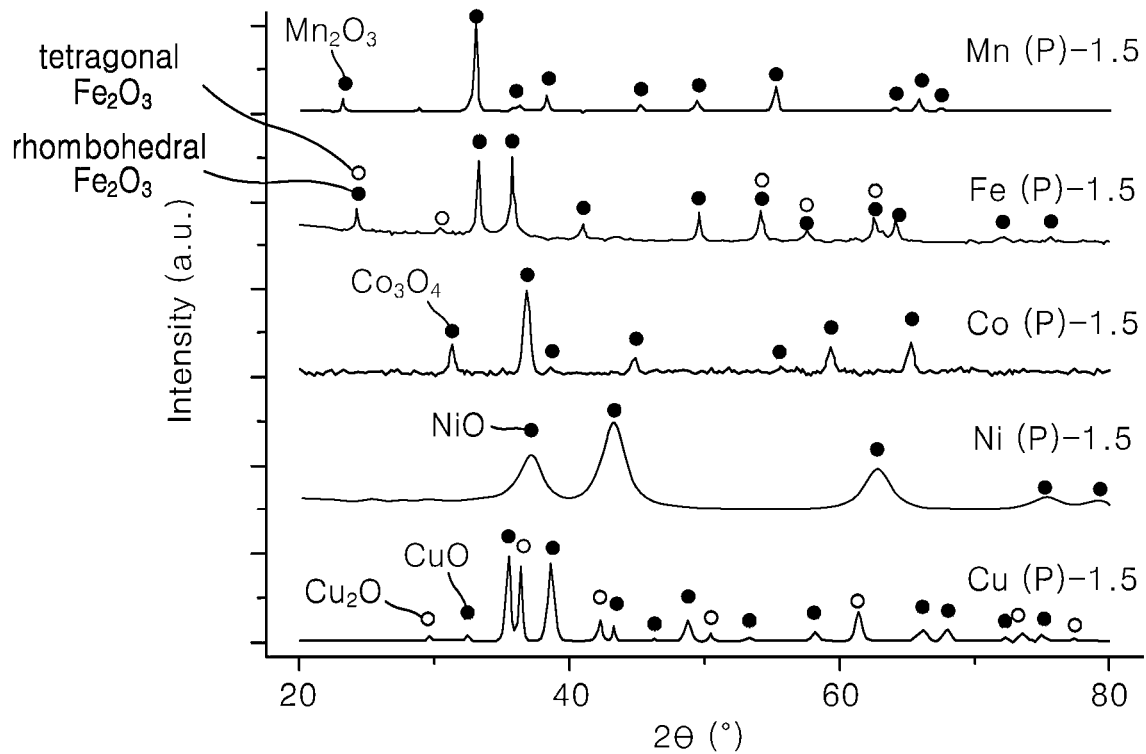

1 g of the prepared Mn, Fe, Co, Ni, or Cu catalyst was added to 100 mL of an aqueous solution in which 0.087 g of a phosphorylating precursor (98.5 wt % $(NR_4)_2HPO_4$) was dissolved and the solution was stirred and dried at 25° C. for 24 hours, followed by calcination at 350° C. for 3 hours. In the transition metal oxide catalysts including the same amount of the phosphorylating precursor (i.e., Mn, Fe, Co, and Ni), distribution of $H_2PO_4^-$, $HPO_4^{2-}$, and $PO_4^{3-}$ ions immobilized on the catalyst surface may be changed after calcination. The catalysts prepared as described above according to Examples 15 to 19 are respectively referred to as Mn (P)-1.5, Fe (P)-1.5, Co (P)-1.5, Ni (P)-1.5, and Cu (P)-1.5 (where 1.5 refers to the content (wt %) of P contained in the catalyst). The catalysts prepared according to Examples 1 to 7 and Examples 15 to 19 were analyzed using an X-ray diffractometer (XRD), and XRD patterns obtained therefrom are shown in FIGS. 9 to 11. Referring to FIG. 5, it is confirmed that the catalysts according to Examples 1 to 3 have a tetragonal $ZrO_2$ crystal phase. Referring to FIGS. 9 and 10, it is confirmed that the catalysts of Examples 4 to 7 have tetragonal $ZrO_2$ and monoclinic $ZrO_2$ crystal phases. It is confirmed that crystal phases of the $NO^{3-}/SO_4^{2-}$-functionalized catalysts of Examples 2 and 3 are the same as those of Example 1. Since surface functionalization of the catalyst of Example 1 by $NO^{3-}/SO_4^{2-}$ does not create a new Zr-based bulk phase, it is confirmed that the surface functionalization does not affect the bulk phase. On the contrary, it is confirmed that the catalysts according to Examples 4 to 7 further have a monoclinic $ZrO_2$ crystal phase in addition to a tetragonal $ZrO_2$ crystal phase of Example 1. This indicates that surface functionalization of the catalyst of Example 1 by $H_2PO_4^-/HPO_4^{2-}/PO_4^{3-}$ using $H_3PO_4$ in the aqueous solution affects bulk phase of the catalyst of Example 1, and a part of tetragonal $ZrO_2$ crystal phase having meta-stability is converted into a monoclinic $ZrO_2$ under aqueous solution conditions. Referring to FIG. 11, it is confirmed that the catalysts of Examples 15 to 19 have a cubic $Mn_2O_3$ phase, a rhombohedral/tetragonal $Fe_2O_3$ phase, a cubic $Co_3O_4$ phase, a cubic NiO phase, and a monoclinic CuO phase/cubic $Cu_2O$ phase, respectively. Since surface functionalization of the transition metal oxide by $H_2PO_4^-/HPO_4^{2-}/PO_4^{3-}$ does not create a new bulk phase including $H_2PO_4^-/HPO_4^{2-}/PO_4^{3-}$, it is confirmed that the surface functionalization does not affect the bulk phase.

In order to observe physical properties of the catalyst that is not functionalized and the catalysts functionalized with $NO_3^-/SO_4^{2-}/H_2PO_4^-/HPO_4^{2-}/PO_4^{3-}$ according to Examples 2 to 4, various analysis methods were used, and the analysis results are shown in Table 2 below. The catalyst of Examples 1 to 4 shows porous morphology which is proved by BET surface area values ($S_{BET}$) and BJH pore volume values ($V_{BJH}$) of the catalysts.

TABLE 2

|  | Example 1 | Example 2 | Example 3 | Example 4 |
|---|---|---|---|---|
| Catalyst | $ZrO_2$ | $ZrO_2$ (N) | $ZrO_2$ (S) | $ZrO_2$ (P)-0.5[f] |
| $S_{BET}$[a] ($m^2\ g_{CAT}^{-1}$) | 117.3 | 105.8 | 93.9 | 77.2 |
| $V_{BJH}$[b] ($cm^3\ g_{CAT}^{-1}$) | 0.08 | 0.03 | 0.05 | 0.03 |
| N/Zr, S/Zr, or P/Zr bulk[c] | — | 0.01 (≤±0.01) | 0.02 (≤±0.01) | 0.02 (≤±0.01) |
| surface[d] | — | 0.1 (≤±0.01) | 0.1 (≤±0.01) | 0.09 (±0.01) |
| $-Q_{ST}$[e] ($kJ\ mol_{CO}^{-1}$) | 48.2 (±9.9) | 43.2 (±9.5) | 37.4 (±1.3) | 31.2 (±1.2) |
| $N_{CO}$[e] ($\mu mol_{CO}\ g_{CAT}^{-1}$) | 9.1 (±0.4) | 5.8 (±0.9) | 3.7 (±0.6) | 3.4 (±0.4) |

([a] via BET. [b] via BJH. [c] via XRF. [d] via XPS. [e] via CO isotherm. [f] P content of 0.5 wt %.)

in addition, as a result of quantitative analysis of the catalysts of Examples 2 to 4 using XRF and XPS, it is confirmed that similar amounts of N, S and P are included in the bulk and on the surface (N/Zr, S/Zr and P/Zr molar ratio). For analysis of metal active species ($H_2O_2$ activator) on the surface of the catalysts of Examples 2 to 4, CO adsorption isotherms of the catalysts were obtained at −20° C., 0° C., and 20° C. After Toth fitting, binding energies ($-Q_{ST}$) between the metal surface species and CO when the same moles of CO are adsorbed were calculated using the Clausius-Clapeyron equation and are shown in Table 2. In comparison with the non-functionalized $ZrO_2$ catalyst of Example 1, it was confirmed that $NO_3^-/SO_4^{2-}/H_2PO_4^-/HPO_4^{2-}/PO_4^{3-}$-functionalized catalysts of Examples 2 to 4 had lower binding force with CO. This indicates that introduction of the $NO_3^-/SO_4^{2-}/H_2PO_4^-/HPO_4^{2-}/PO_4^{3-}$ functional groups onto the surface of the $ZrO_2$ catalyst weakens the binding force between the metal active species and ·OH, thereby facilitating leaching of ·OH that is a rate-determining step of decomposition of $H_2O_2$ catalyst. Importantly, it was confirmed that the $H_2PO_4^-/HPO_4^{2-}/PO_4^{3-}$-functionalized catalyst of Example 4 had the smallest binding force between the metal surface species and CO. This indicates that introduction of the $H_2PO_4^-/HPO_4^{2-}/PO_4^{3-}$ functional groups onto the surface of the $ZrO_2$ catalyst significantly weakens the binding force between the metal active species and ·OH, thereby more easily facilitating leaching of ·OH that is a rate-determining step of decomposition of $H_2O_2$ catalyst. Also, this indicates that introduction of the $H_2PO_4^-/HPO_4^{2-}/PO_4^{3-}$ functional groups onto the surface of the $ZrO_2$ catalyst increases efficiency of catalytic decomposition of hydrogen peroxide, thereby increasing productivity of ·OH compared to other catalysts.

In order to observe physical properties of the catalysts functionalized with different amounts of $H_2PO_4^-/HPO_4^{2-}/PO_4^{3-}$ according to Examples 5 to 7, the catalysts were analyzed using various methods, and the results are shown in Table 3. The catalysts of Examples 5 to 7 show various morphology which is proved by BET surface area values ($S_{BET}$) and BJH pore volume values ($V_{BJH}$) of the catalyst. Also, as a result of quantitative analysis of the catalysts of Examples 2 to 4 using XRF, it is confirmed that various amounts of P are included in the bulk (P/Zr molar ratio).

TABLE 3

|  | Example 5 | Example 6 | Example 7 |
|---|---|---|---|
| catalyst | $ZrO_2$ (P)-1.0[d] | $ZrO_2$ (P)-1.5[e] | $ZrO_2$ (P)-2.0[f] |
| $S_{BET}$[a] ($m^2\ g_{CAT}^{-1}$) | 46.7 | 18.1 | 19.7 |
| $V_{BJH}$[b] ($cm^3\ g_{CAT}^{-1}$) | 0.02 | 0.02 | 0.01 |
| P/Zr[c] (bulk) | 0.04 (±0.01) | 0.05 (±0.01) | 0.06 (±0.01) |

([a] via BET. [b] via BJH. [c] via XRF. [d] P content of 1.0 wt %. [e] P content of 1.5 wt %. [f] P content of 2.0 wt %.)

Figure 12:
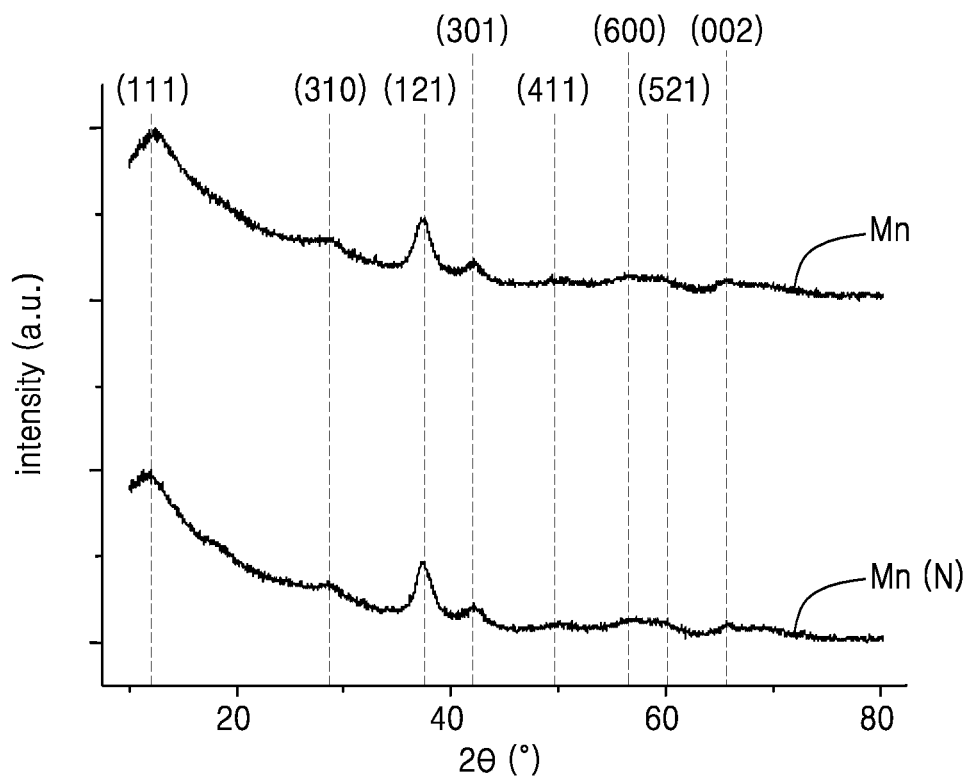
FIG. 12 is a graph illustrating XRD patterns of transition metal oxide grains according to an embodiment of the present invention.
Figure 13:
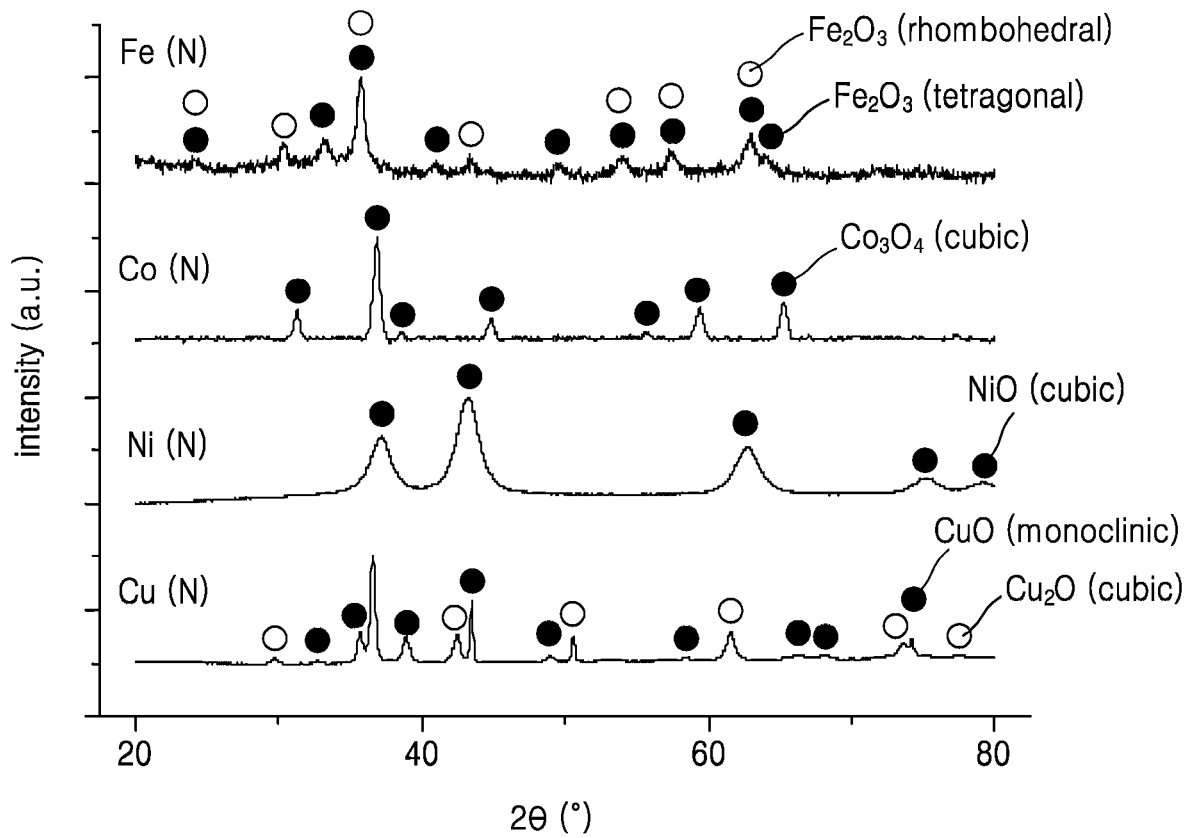
FIG. 13 is a graph illustrating XRD patterns of transition metal oxide grains functionalized with $NO_3^-$ according to an embodiment of the present invention.

The catalysts prepared according to Examples 8, 9, and 11 to 14 were analyzed using an X-ray diffractometer (XRD), and XRD patterns obtained therefrom are shown in FIGS. 12 and 13.

It is confirmed that the Mn and Mn(N) catalysts of Examples 8 and 9 have a tetragonal α-$MnO_2$ phase referring to FIG. 12, and the Fe(N'), Co(N'), Ni(N') and Cu(N') catalysts of Examples 11 to 14 have a rhombohedral/tetragonal $Fe_2O_3$ phase, a cubic $Co_3O_4$ phase, a cubic NiO phase, and a monoclinic CuO/cubic $Cu_2O$ phase referring to FIG. 13. Since surface functionalization of the transition metal oxide by $NO_3^-$ does not create a new $NO_3$-containing bulk phase, it is confirmed that the surface functionalization does not affect the bulk phase of the catalyst. In addition, all catalysts exhibit porous morphology which is proved by BET surface area values (10-160 $m^2\ g_{CAT}^{-1}$) of the catalysts.

Figure 14A:
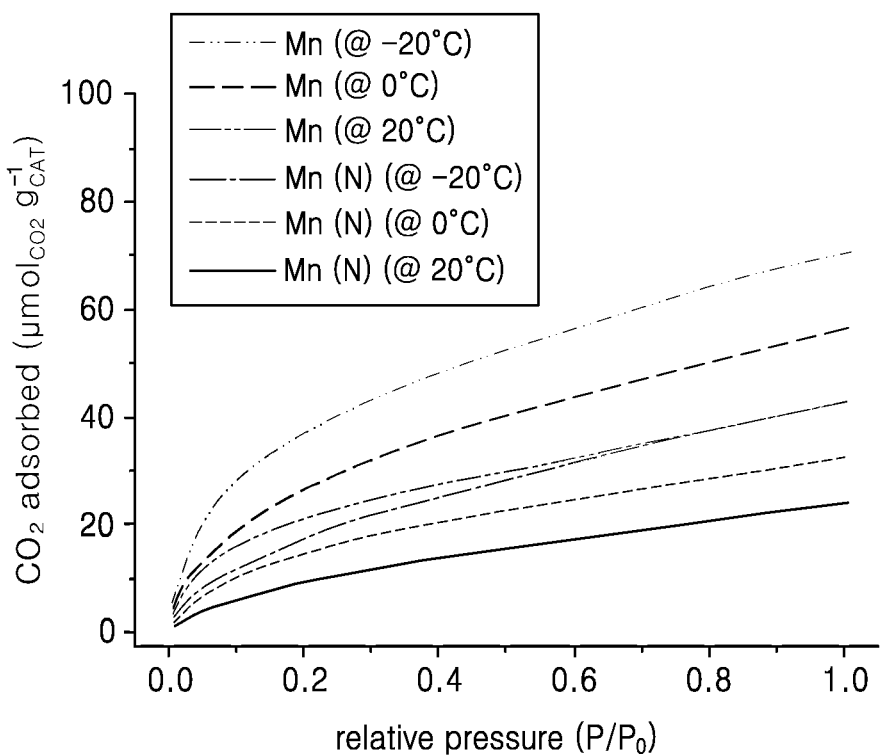
FIG. 14A is a graph illustrating $CO_2$ adsorption isotherms of transition metal oxide grains according to an embodiment of the present invention.
Figure 14B:
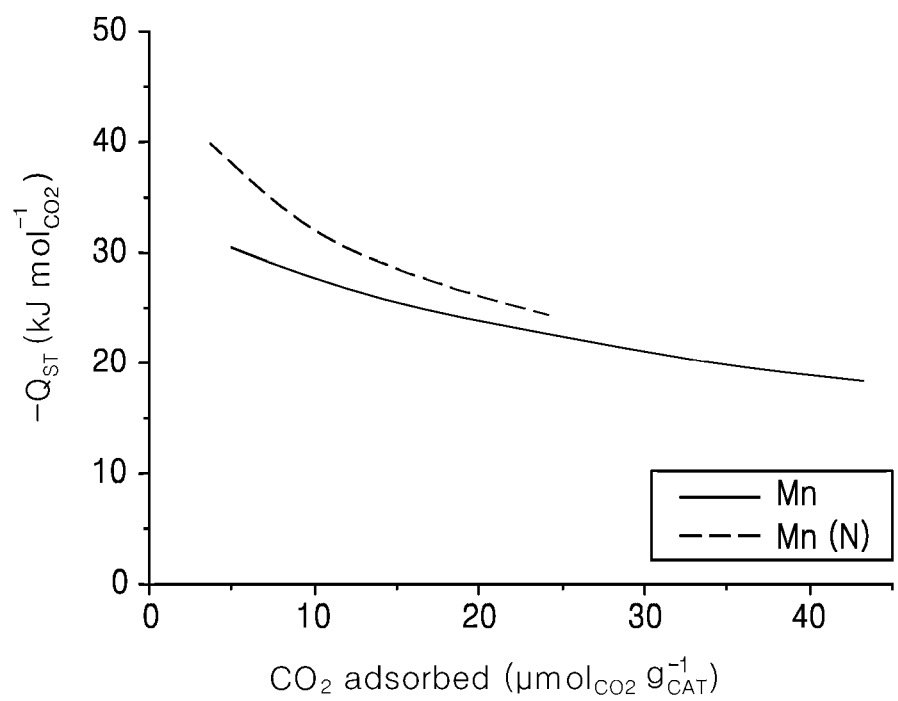
FIG. 14B is a graph illustrating binding energies ($-Q_{ST}$) between $CO_2$ and metal species ($M^{\delta+}$)

In order to observe changes in physical properties of manganese oxide catalysts by surface functionalization by $NO_3^-$, the catalysts of Examples 8 and 9 were analyzed using various methods. For quantitative analysis of CO-accessible $Mn^{\delta+}$ surface species ($N_{CO}$) having Lewis acid properties, the catalysts of Examples 8 and 9 were analyzed using CO-pulsed chemisorption, and it was confirmed that the catalysts of Examples 8 and 9 had similar $N_{CO}$ values (~0.5 $\mu mol_{CO}\ g_{CAT}^{-1}$). As described above, when the $Mn^{\delta+}$ species included on the surfaces of the catalysts have similar Lewis acid intensities, adsorption and interaction between $Mn^{\delta+}$ and $H_2O_2$ may be similar. That is, when the $Mn^{\delta+}$ species included on the surfaces of the Mn and Mn (N) catalysts of Examples 8 and 9 have similar Lewis acid intensities, the similar $N_{co}$ values indicate similar efficiencies of catalytic decomposition of hydrogen peroxide (*OH productivity). For further analysis of $Mn^{\delta+}$ surface species of the catalysts of Examples 8 and 9, $CO_2$ adsorption isotherms of the Mn and Mn (N) catalysts were obtained at −20° C., 0° C., and 20° C. After Toth fitting, binding energies ($-Q_{ST}$) between the $Mn^{\delta+}$ surface species and $CO_2$ in the case that the same moles of $CO_2$ are adsorbed were calculated, using the Clausius-Clapeyron equation and are shown in FIG. 14b. It was confirmed that the Mn (N) catalyst of Example 9 exhibited a higher $-Q_{ST}$ value than that of the Mn catalyst of Example 8. This indicates that the $Mn^{\delta+}$ surface species included in the Mn (N) catalyst of Example 9 provide a stronger Lewis acid intensity than that of the $Mn^{\delta+}$ surface species included in the Mn catalyst of Example 8, as being more preferable for adsorption $H_2O_2$ onto $Mn^{\delta+}$ and interaction therebetween, and may provide increased efficiency of catalytic decomposition of hydrogen peroxide (*OH productivity).

Figure 15:
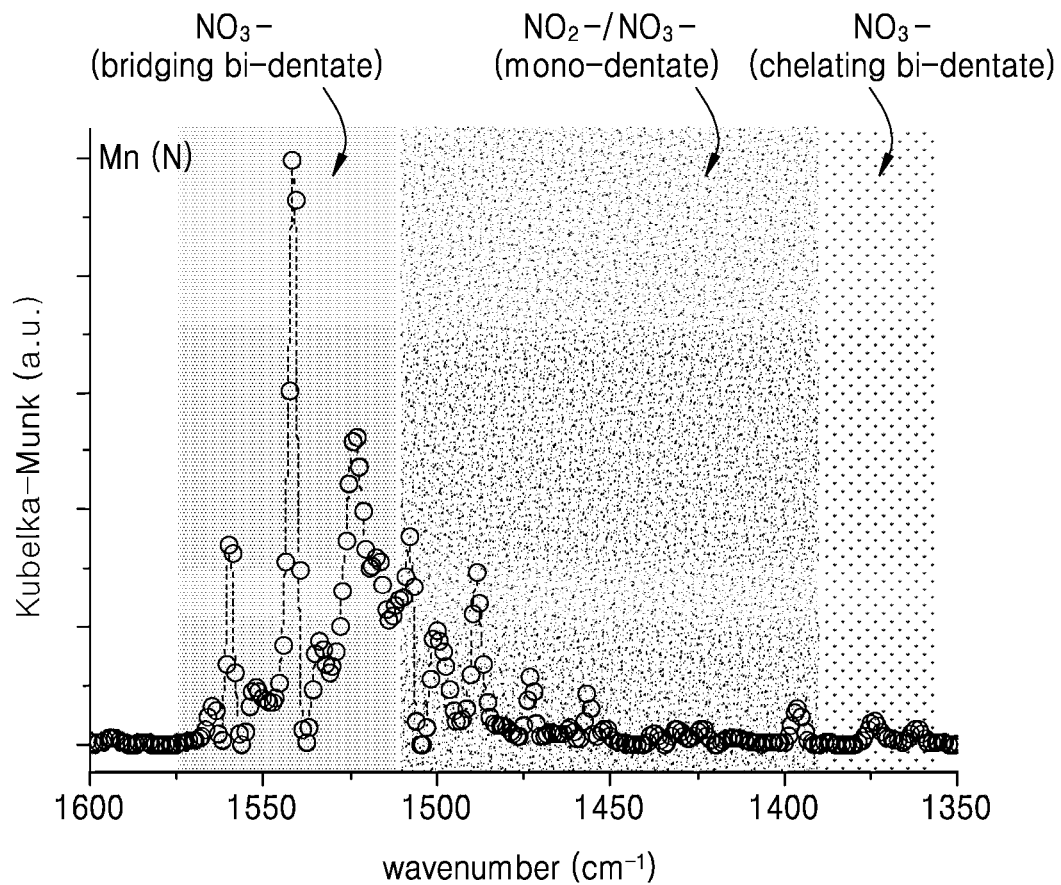
FIG. 15 is a graph illustrating in situ diffuse reflectance infrared Fourier transform (DRIFT) spectroscopy results of transition metal oxide grains according to an embodiment of the present invention.

For further surface analysis of the Mn (N) catalyst of Example 9, in situ diffuse reflectance infrared Fourier transform (DRIFT) spectroscopy was used and in order to realize an atmosphere similar to nitrification conditions used to prepare the catalyst of Example 2, the surface of the Mn catalyst of Example 8 was saturated with $NO/O_2$ at 150° C. and the results are shown in FIG. 15. It was confirmed that the $NO_3^-$ or $NO_2^-$ functional group was coordinated in a mono-dentate or bi-dentate form on the surface of the Mn (N) catalyst of Example 9. This indicates that the $NO_3$· surface species may be formed from the $NO_3^-$ functional groups included on the surface of the Mn (N) catalyst via radical transfer of the ·OH.

Figure 16A:
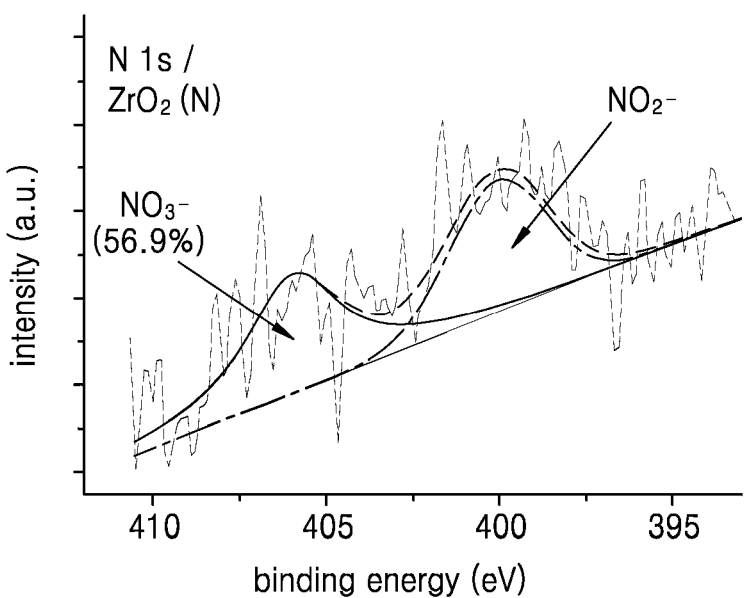
FIG. 16A is a graph illustrating XPS results of catalysts according to an embodiment of the present invention at N 1s region.
Figure 16B:
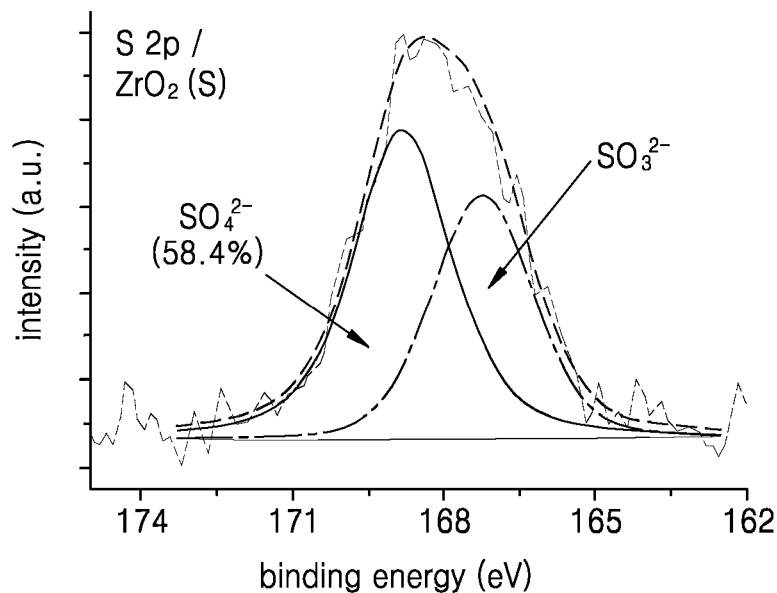
FIG. 16B is a graph illustrating XPS results of catalysts according to an embodiment of the present invention at S 2p region.
Figure 16C:
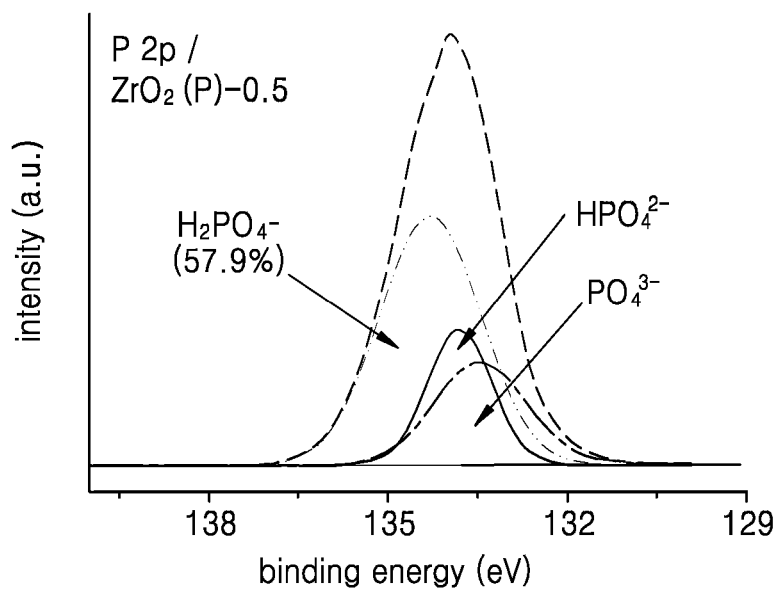
FIG. 16C is a graph illustrating XPS results of catalysts according to an embodiment of the present invention at P 2p region.

FIGS. 16a to 16c show graphs illustrating XPS results of the $NO_3^-/SO_4^{2-}/H_2PO_4^-/HPO_4^{2-}/PO_4^{3-}$-functionalized catalysts of Examples 2 to 4 according to the present invention (N 1s in Example 2; S 2p in Example 3; and P 2p in Example 4). In the cases of Examples 2 to 4, it was confirmed that similar amounts of $NO_3^-/SO_4^{2-}/H_2PO_4^-$ functional groups were contained on the surfaces. Since the catalysts of Examples 2 to 4 include similar amounts of N/S/P in bulk and similar amounts of $NO_3^-/SO_4^{2-}/H_2PO_4^-$ functional groups on the surface, non-degradable organic material decomposition efficiencies may be scientifically compared when the catalysts are used in the same amount.

Meanwhile, $NO_2^-$ and $SO_3^{2-}$ functional groups, which have significantly shorter lifespans and lower oxidizing power than $NO_3^-$ and $SO_4^{2-}$ functional groups, are not effective on increasing rates of decomposing non-degradable organic material.

Examples 20 to 23: Preparation of Mn(S), Co(S), Ni(S) and Cu(S) Catalysts

Porous and crystalline manganese oxide, cobalt oxide, nickel oxide, and copper oxide were prepared by templated synthesis. Specifically, 100 mL of an aqueous solution including 20 mmol of oxalic acid ($C_2H_2O_4\cdot 2H_2O$) and 20 mmol of $MnSO_4H_2O/CoSO_4\cdot 7H_2O/NiSO_4\cdot 7H_2O/CuSO_4\cdot 5H_2O$ was stirred for 30 minutes at 50° C. The resultant was filtered/washed with distilled water and ethanol and dried at 70° C., followed by calcination at 300° C. for 1 hour to prepare manganese oxide, cobalt oxide, nickel oxide, and copper oxide. The prepared metal oxide was exposed to an atmosphere including 500 ppm of $SO_2$ and 3 vol % of $O_2$ diluted with $N_2$ at a flow rate of 500 mL min$^{-1}$ at 500° C. for 45 minutes, and then cooled to room temperature in a $N_2$ atmosphere. A $SO_4^{2-}$-functionalized catalysts prepared under the conditions are referred to as Example 20 (Mn(S)), Example 21 (Co(S)), Example 22 (Ni(S)) and Example 23 (Cu(S)), respectively.

Figure 17:
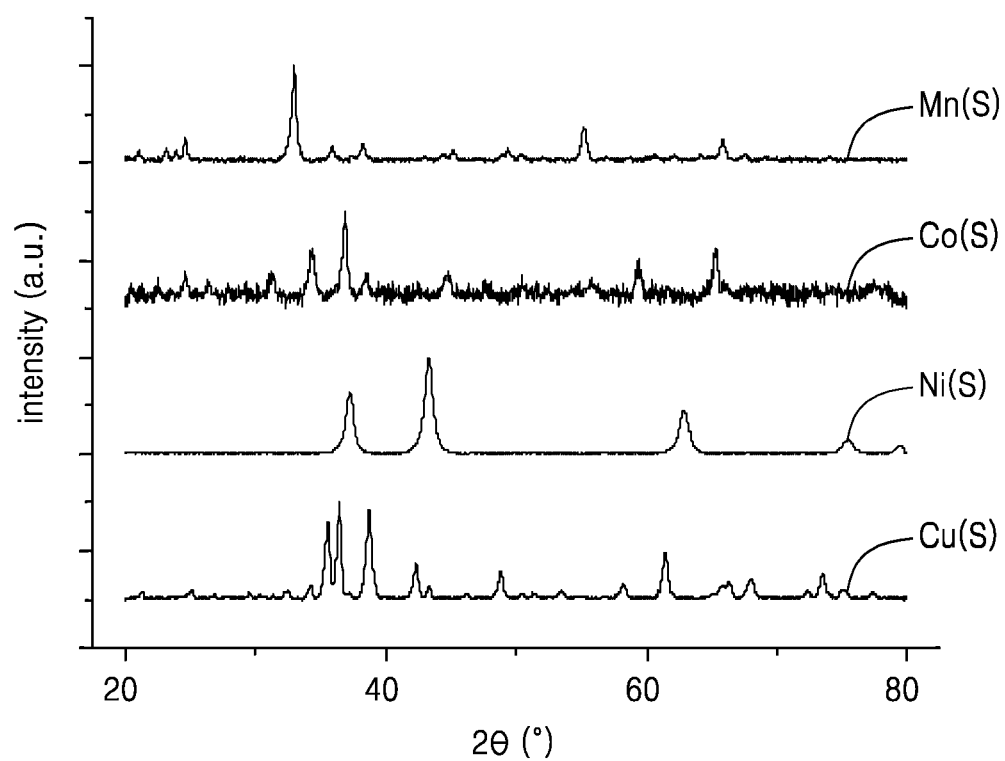
FIG. 17 is a graph illustrating XRD patterns of $SO_4^{2-}$-functionalized transition metal oxide grains according to an embodiment of the present invention.

The catalysts prepared in Examples 20 to 23 were analyzed using an X-ray diffractometer (XRD), and XRD patterns obtained therefrom are shown in FIG. 17. Referring to FIG. 17, it was confirmed that the catalysts of Examples 20 to 23 include metal sulfides ($MnSO_4$, $CoSO_4$, or $CuSO_4$) modified, by $SO_4^{2-}$, from oxides of the used metal precursors ($Mn_2O_3$, $Mn_3O_4$, $Co_3O_4$, NiO, CuO, or $Cu_2O$) or the metal oxides. All catalysts exhibit porous morphology which is proved by BET surface area values (10-130 $m^2\ g_{CAT}^{-1}$) of the catalysts.

Examples 24 to 28: Preparation of Mn$_Z$ Catalysts (where Z=3, 2, 1.5, 1, 0)

As shown in Table 4, porous and crystalline Mn$_Z$ catalysts were prepared by solvothermal synthesis. Specifically, 177.6 g of an ethylene glycol solution including (Z×10) mmol of $MnCl_2\cdot 4H_2O$, ((3−Z)×10) mmol of $FeCl_3\cdot 6H_2O$, 3.6 g of $NaNO_3$, and 1 g of polyethylene glycol was stirred for 30 minutes at 25° C. and exposed to solvothermal reaction conditions in an autoclave reactor at 200° C. for 12 hours to obtain a solid. The obtained solid was filtered/washed with distilled water and ethanol and dried at 70° C. and then further dried at 100° C. for 1 hour to prepare Mn$_Z$ catalysts. Hereinafter, the M$_Z$ catalysts are referred to as catalysts of Examples 24 to 28. Hereinafter, $Mn_3O_4$, $Mn_2Fe_1O_4$, $Mn_{1.5}Fe_{1.5}O_4$, $Mn_1Fe_2O_4$, and $Fe_3O_4$ catalysts according to Examples 24 to 28 are referred to as $Mn_3$, $Mn_2$, $Mn_{1.5}$, $Mn_1$, and $Mn_0$, respectively, according to molar ratio of manganese.

TABLE 4

| | | Example 24 | Example 25 | Example 26 | Example 27 | Example 28 |
|---|---|---|---|---|---|---|
| Precursor | $MnCl_2\cdot 4H_2O$ (mmol) | 30 | 20 | 15 | 10 | 0 |
| | $FeCl_3\cdot 6H_2O$ (mmol) | 0 | 10 | 15 | 20 | 30 |
| Product | | $Mn_3$ ($Mn_3O_4$) | $Mn_2$ ($Mn_2Fe_1O_4$) | $Mn_{1.5}$ ($Mn_{1.5}Fe_{1.5}O_4$) | $Mn_1$ ($Mn_1Fe_2O_4$) | $Mn_0$ ($Fe_3O_4$) |

Examples 29 to 33: Preparation of Mn$_Z$(S) Catalysts (where Z=3, 2, 1.5, 1, 0)

The Mn$_Z$ catalysts prepared in Examples 24 to 28 were exposed to an atmosphere including 500 ppm of $SO_2$ and 3 vol % of $O_2$ diluted with $N_2$ at a flow rate of 500 mL min$^{-1}$ at 500° C. for 1 hour, and then cooled to room temperature in a $N_2$ atmosphere. The Mn$_Z$(S) catalysts prepared under the above conditions are referred to as catalysts of Examples 29 to 33. The catalysts according to Examples 29 to 33 are referred to Mn$_3$ (S), Mn$_2$ (S), Mn$_{1.5}$ (S), Mn$_1$ (S), and Mn$_0$ (S), respectively, according to molar ratio of manganese.

Figure 18A:
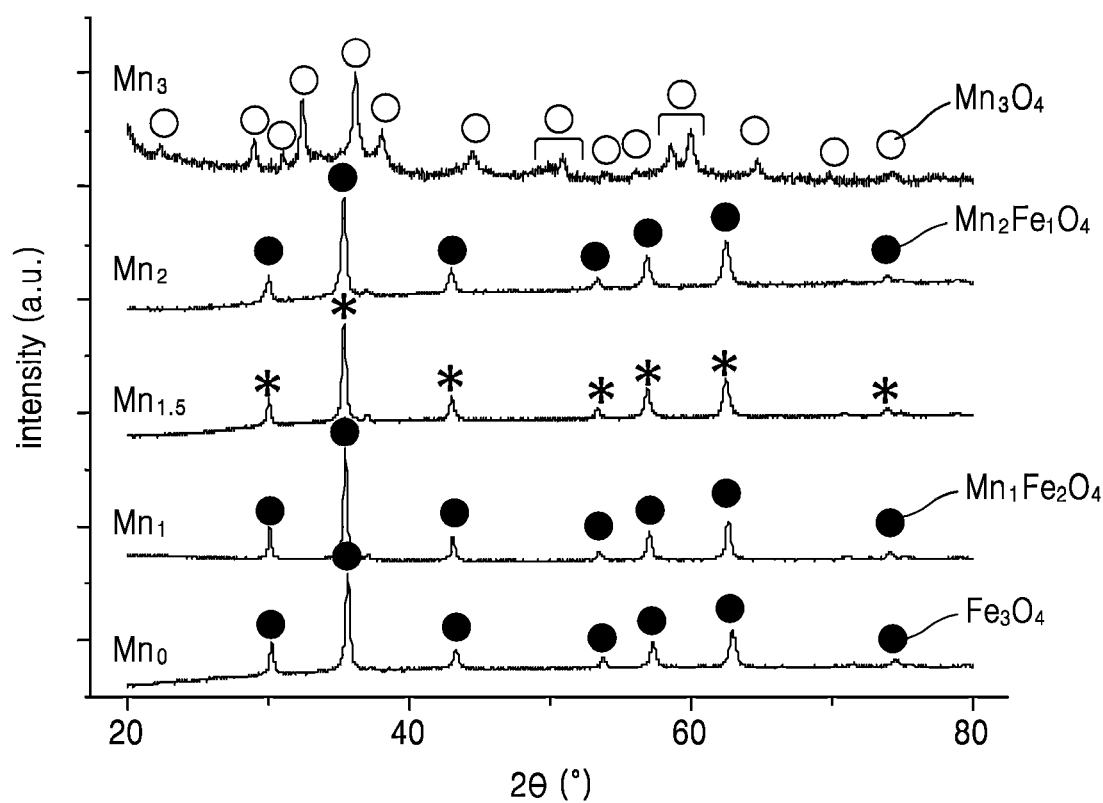
FIGS. 18A and 18B show graphs illustrating XRD patterns of catalysts according to an embodiment of the present invention.
Figure 18B:
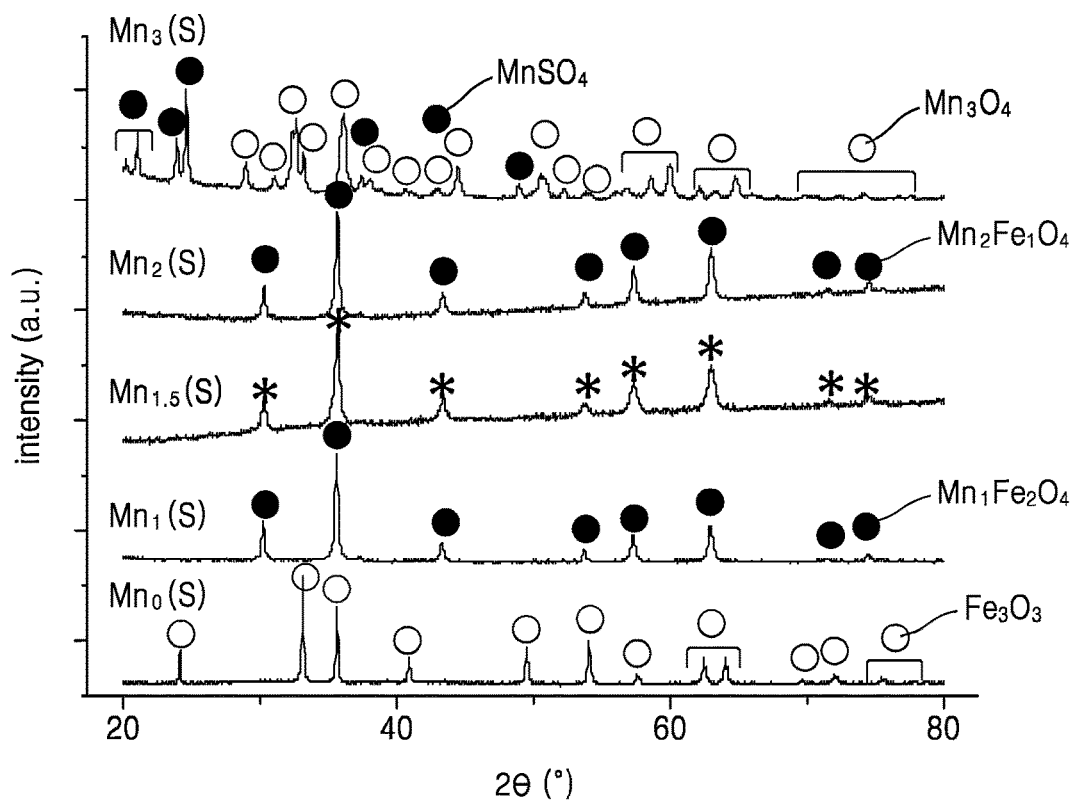

The catalysts prepared in Examples 24 to 33 were analyzed using an X-ray diffractometer (XRD), and XRD patterns obtained therefrom are shown in FIGS. 18a and 18b. Referring to FIGS. 18a and 18b, it was confirmed that the catalyst of Example 24 has a normal spinel-type tetragonal $Mn_3O_4$ phase, the catalyst of Example 25 has a partially normal spinel-type cubic $Mn_2Fe_1O_4$ phase, the catalyst of Example 27 has a partially inverse spinel-type cubic $Mn_1Fe_2O_4$ phase, and the catalyst of Example 28 has an inverse spinel-type cubic $Fe_3O_4$ phase. On the contrary, the catalyst of Example 26 has a random spinel-type cubic phase (marked by *) that has not been reported. However, the catalyst of Example 26 has a crystal phase similar to those of Examples 25 and 27 as described above but positions of the diffractions (2 theta) are located between positions of the diffractions (2 theta) of Examples 25 and 27, and thus it can be seen that they were synthesized to have desirable crystal phases.

It is confirmed that the crystal phases of the $SO_4^{2-}$-functionalized catalysts of Examples 30 to 32 are identical to those of the Examples 25 to 27. Since surface functionalization of the catalysts of Examples 29 to 31 by $SO_4^{2-}$ does not create a new bulk phase such as $MnSO_4$ and $Fe_2(SO_4)$, it is confirmed that the surface functionalization does not affect the bulk phase. On the contrary, it is confirmed that the catalyst according to Example 29 has an orthorhombic $MnSO_4$ phase that has not been observed in Example 24, and this indicates the surface functionalization of the catalyst by $SO_4^{2-}$ partially changes the crystal phase of $Mn_3O_4$ into $MnSO_4$. Also, in the case of Example 33, due to a high temperature (500° C.) for surface functionalization of the catalyst by $SO_4^{2-}$ of Example 29, the metastable cubic $Fe_3O_4$ phase was converted into the rhombohedral $Fe_2O_3$ phase. However, since a new bulk phase such as $Fe_2(SO_4)$ was not creased in the case of Example 33, it is confirmed that surface functionalization of the catalyst by $SO_4^{2-}$ catalyst does not affect the bulk phase.

In order to observe physical properties of the $SO_4^{2-}$-functionalized catalysts ($Mn_z(S)$) of Examples 29 to 33, the catalysts were analyzed using various methods. The $Mn_z(S)$ catalysts exhibit porous morphology which is proved by BET surface area values (5-25 $m^2$ $g_{CAT}^{-1}$) of the catalysts. In addition, it is confirmed that the $Mn_z(S)$ catalysts have stoichiometrically defined metal (Mn+Fe)/oxygen (O) ratios (molar basis) based on quantitative analysis results using XRF as shown in Table 5. The $Mn_3$ (S) of Example 29 has a higher sulfur (S)/metal (Mn+Fe) ratio (molar basis) than those of the catalysts of Examples 30 to 33 (Table 5). This is consistent with the result that a new bulk phase $MnSO_4$ is additionally generated by $SO_4^{2-}$ functionalization of the $Mn_3$ catalyst of Example 24 described above.

Figure 20:
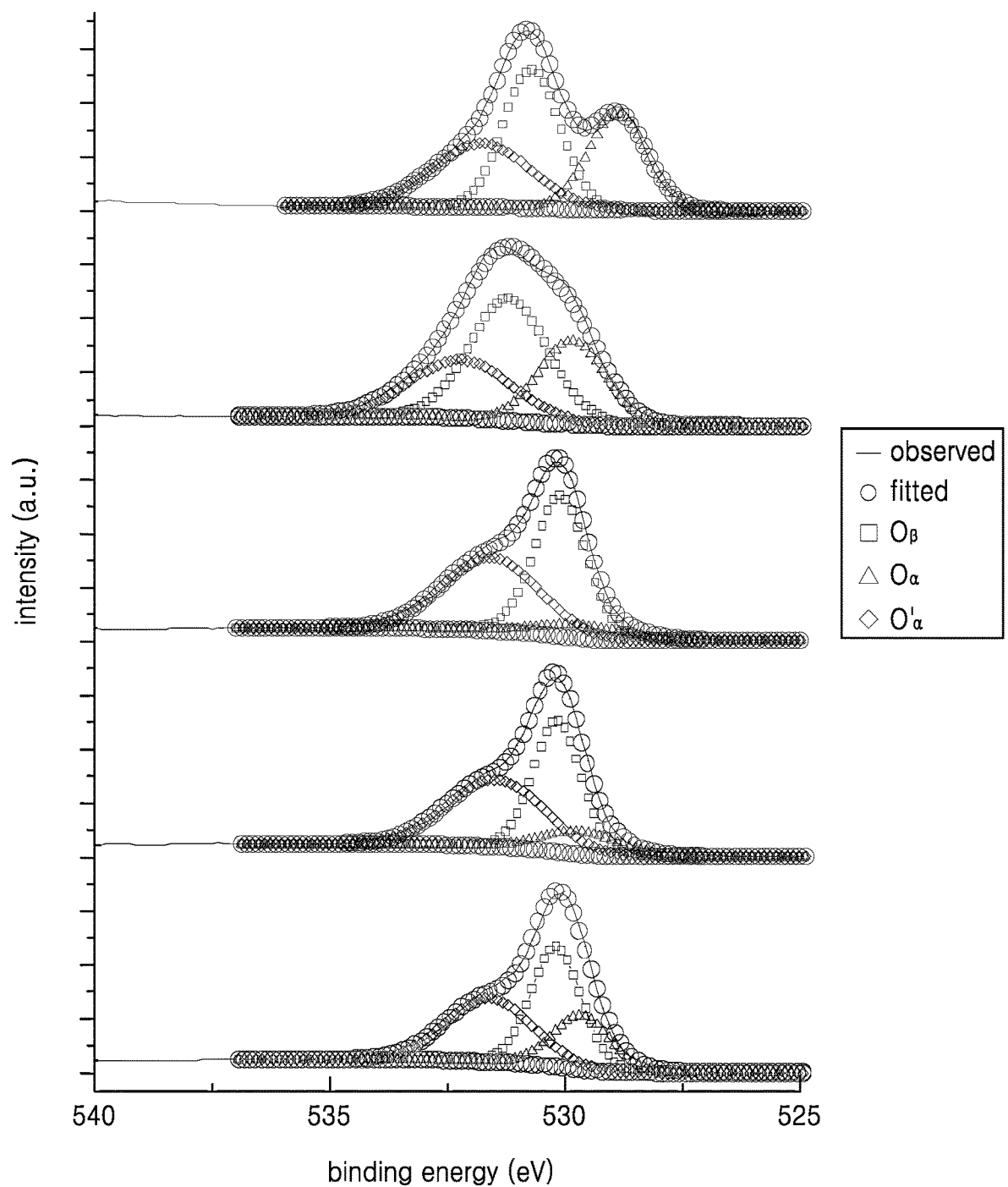
FIG. 20 is a graph illustrating XPS results of catalysts according to an embodiment of the present invention at O 1 s region.

FIG. 20 is a graph illustrating X-ray photoelectron spectroscopy (XPS) results of the $SO_4^{2-}$-functionalized $Mn_3$ (S), $Mn_2$ (S), $Mn_{1.5}$ (S), $Mn_1$ (S) and $Mn_0$ (S) catalysts of Examples 29 to 33 according to an embodiment of the present invention at O 1s region. All catalysts include $O_\beta$ (lattice O), $O_\alpha$ (chemically-susceptible O) and $O_\alpha'$ (O of chemisorbed $H_2O$) surface species. The $Mn_{1.5}$ (S) catalyst of Example 31 has the largest amount of $O_\alpha$ surface species indicating that the most sufficient electrons (e⁻) are present on the surface of the catalyst. This indicates that reduction of the $M^{(\delta+1)+}$ surface species formed as a result of catalytic decomposition of hydrogen peroxide back to the $M^{\delta+}$ surface species occurs the most vigorously in the $Mn_{1.5}$ (S) of Example 31, and the productivity of ·OH per unit hour is maximized in the $Mn_{1.5}$ (S) of Example 31.

Figure 21:
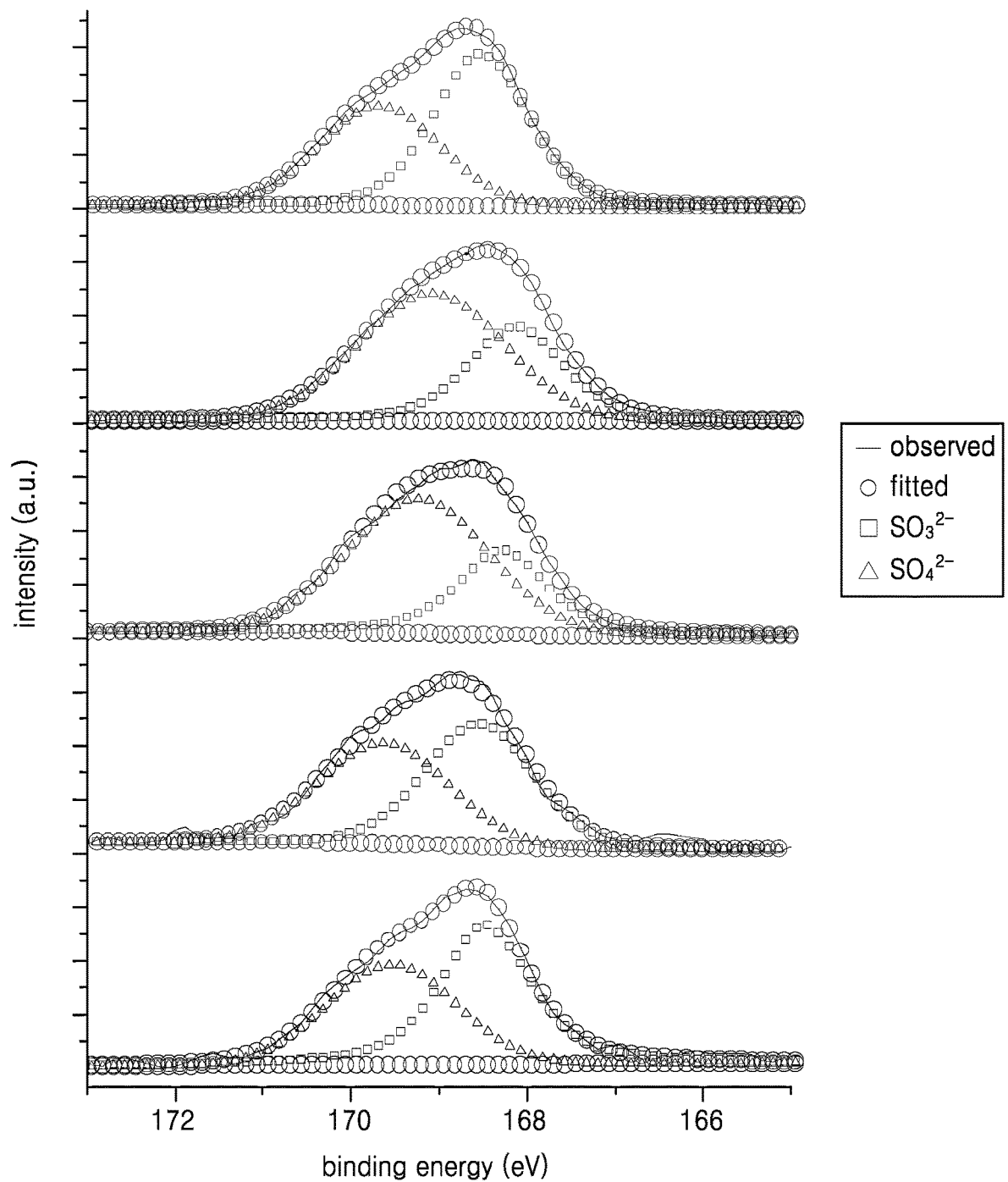
FIG. 21 is a graph illustrating XPS results of catalysts according to an embodiment of the present invention at S 2p region.

FIG. 21 is a graph illustrating XPS results of $SO_4^{2-}$-functionalized $Mn_3$ (S), $Mn_2$ (S), $Mn_{1.5}$ (S), $Mn_1$ (S) and $Mn_0$ (S) catalysts of Examples 29 to 33 according to an embodiment of the present invention at S 2p region. All catalysts include $SO_3^{2-}$ and $SO_4^{2-}$ surface species. It was confirmed that the $Mn_{1.5}$ (S) of Example 31 had the largest amount of $SO_4^{2-}$ surface species. This indicates that the $Mn_{1.5}$ (S) catalyst of Example 31 has the highest possibility of conversion of the largest amount of $SO_4^{2-}$ surface species to the largest amount of $SO_4^-$ surface species per unit hour by radical transfer of the sufficient ·OH nearby when compared to the other catalysts. Importantly, all of the above-described analysis results indicate that the $Mn_{1.5}$ (S) catalyst of Example 31 had the highest non-degradable organic material decomposition efficiency.

TABLE 5

| | Example 29 $Mn_3$ (S) | Example 30 $Mn_2$ (S) | Example 31 $Mn_{1.5}$ (S) | Example 32 $Mn_1$ (S) | Example 33 $Mn_0$ (S) |
|---|---|---|---|---|---|
| Metal (Mn + Fe)/ Oxygen (O) | 0.79(±0.09) | 0.77(±0.05) | 0.78(±0.03) | 0.79(±0.02) | 0.78(±0.02) |
| Sulfur (S)/ Metal (Mn + Fe) | 0.22(±0.03) | 0.04(<±0.01) | 0.02(<±0.01) | 0.01(<±0.01) | 0.01(<±0.01) |

For quantitative analysis of CO-accessible $Mn^{\delta+}$ surface species ($N_{CO}$) having Lewis acid properties, the catalysts of Examples 29 to 33 were analyzed by CO-pulsed chemisorption. The $Mn_3$ (S) and $Mn_0$ (S) catalysts of Examples 29 and 33 provided higher $N_{CO}$ values than the other catalysts (≥~0.27 $\mu mol_{CO}$ $g_{CAT}^{-1}$ for $Mn_3$ (S) and $Mn_0$ (S); ≤~0.15 $\mu mol_{CO}$ $g_{CAT}^{-1}$ for $Mn_2$ (S), $Mn_{1.5}$ (S), and $Mn_1$ (S)). This indicates that the $Mn_3$ (S) and $Mn_0$ (S) catalysts of Examples 29 and 33 increase efficiency of catalytic decomposition of hydrogen peroxide, thereby increasing ·OH productivity when compared with the other catalysts.

Figure 19A:
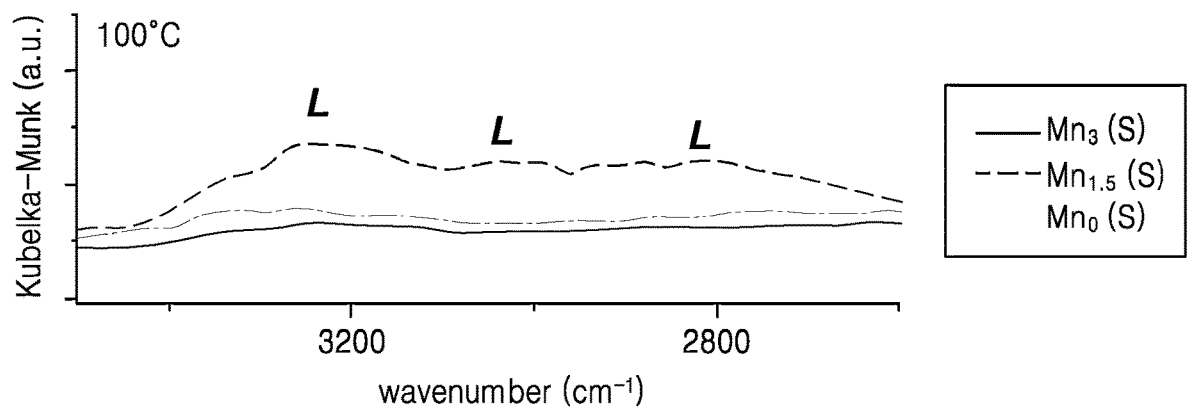
FIG. 19A to 19C show graphs illustrating in situ diffuse reflectance infrared Fourier transform (DRIFT) spectroscopy results of catalysts according to an embodiment of the present invention.
Figure 19B:
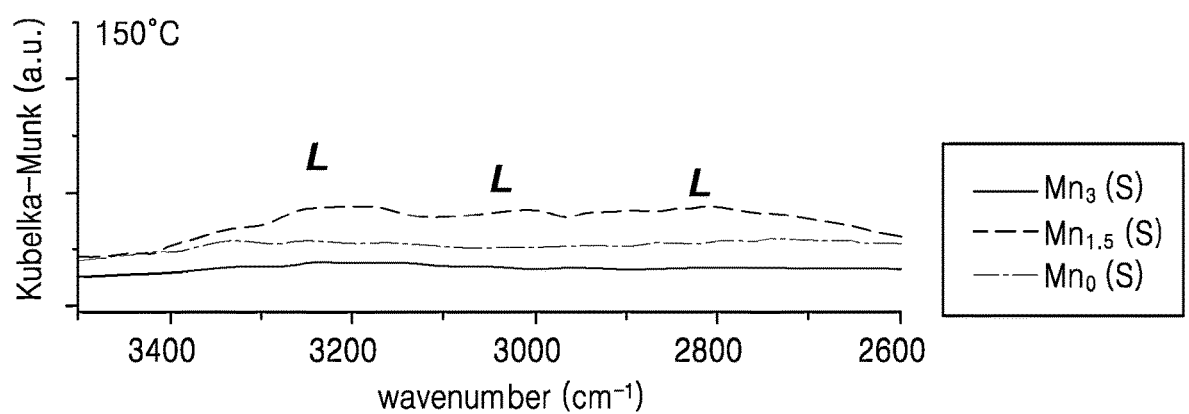
Figure 19C:
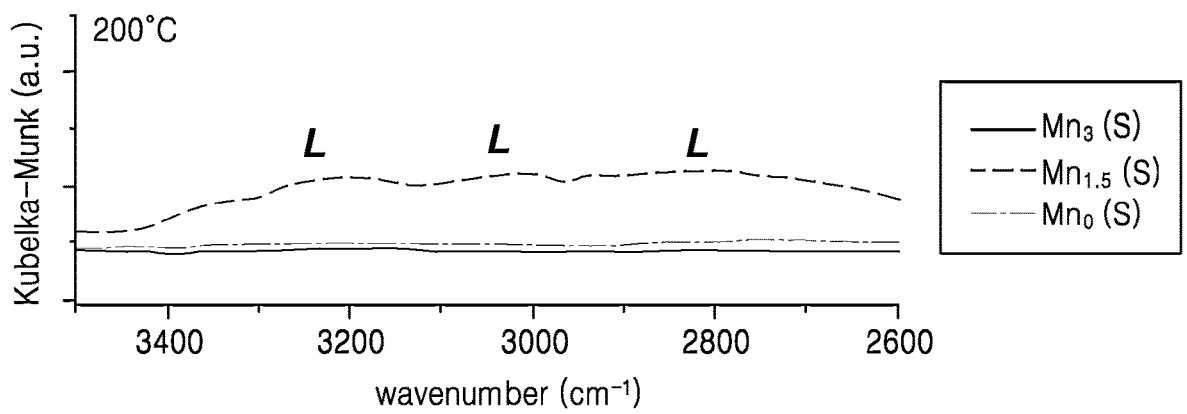

FIGS. 19a to 19c show graphs illustrating background-subtracted, in situ diffuse reflectance infrared Fourier transform (DRIFT) spectroscopy results of the surfaces of the $SO_4^{2-}$-functionalized $Mn_3$ (S), $Mn_{1.5}$ (S) and $Mn_0$ (S) catalysts according to Examples 29, 31, and 33 of the present invention, the catalysts saturated with $NH_3$ at a temperature of 100° C. to 200° C. On the contrary to the CO-pulsed chemisorption results, it was confirmed that widths of lower portions of peaks indicating $NH_3$-accessible $Mn^{\delta+}$ surface species having Lewis acid properties increase in the order of $Mn_3$ (S)→$Mn_0$ (S)→$Mn_{1.5}$ (S) at temperature of 100° C. to 200° C. Also, in the $Mn_{1.5}$ (S) catalyst of Example 31, the greatest width of the lower portion of the L peak was maintained although the temperature increases from 100° C. to 200° C. Since the $Mn_{1.5}$ (S) catalyst of Example 31 has greater Lewis acid intensity than those of the $Mn_3$ (S) and $Mn_0$ (S) catalysts, adsorption between the reactants, $H_2O_2$ and $M^{\delta+}$ surface species, may be facilitated and thus catalytic decomposition of hydrogen peroxide may be the most efficiently performed. Therefore, the ·OH productivity of the $Mn_{1.5}$ (S) catalyst was higher than those of the $Mn_3$ (S) and $Mn_0$ (S) catalysts.

Hereinafter, performance of Fenton systems using the catalysts of the above-described examples will be described.

Experimental Example 1: Hydrogen Peroxide ($H_2O_2$) Decomposition Test

A reaction test is performed using the catalysts of Examples 1 to 4, a graphite electrode, hydrogen peroxide ($H_2O_2$) as a ·OH precursor, and a $Na_2SO_4$ aqueous electrolytic solution in the absence of electricity. When the catalysts are coated on the electrode, poly(vinylidene fluoride) (PVDF) was used as a binder. 0.2 g of the catalyst was used and 100 mL of an aqueous solution in which 0.2 mol of $Na_2SO_4$ was dissolved was used as a reaction solution. The reaction test was performed at 25° C. at a pH of 7. An amount of $H_2O_2$ used in the reaction was 0.12 mmol which was observed after 8 hours of reaction in the absence of phenol under the electro-Fenton reaction conditions of Experimental Example 2 below. A slope of a pseudo-$1^{st}$-order kinetic fitting graph ($-\ln(C_{H2O2}/C_{H2O2,0})$ VS. time) obtained based on a conversion rate of $H_2O_2$ in the test is equal to a $H_2O_2$ decomposition rate constant ($k_{APP}$, $min^{-1}$).

Figure 22:
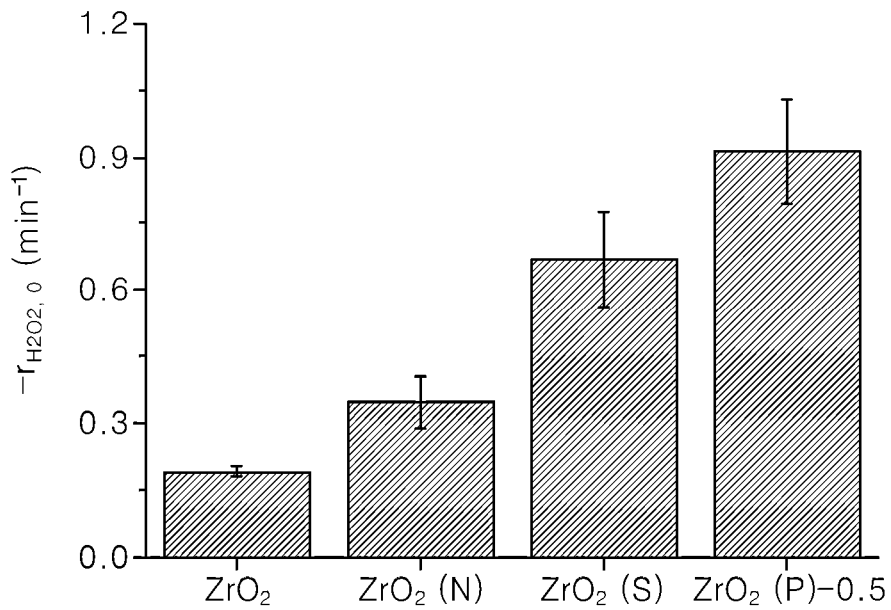
FIG. 22 is a graph illustrating hydrogen peroxide ($H_2O_2$) decomposition test results using catalysts according to an embodiment of the present invention.

An initial $H_2O_2$ decomposition rate ($-r_{H2O2,0}$, $min^{-1}$) was calculated by multiplying $k_{APP}$ of each catalyst by $N_{H2O2,0}$, and dividing the result value by $N_{CO}$ value (number of moles of Lewis acid per gram of the above-described CO-accessible catalyst; shown in Table 2) contained in the amount (0.2 g) of the used catalyst and is shown in FIG. 22. As predicted in the analysis of physical properties of the catalysts of Examples 1 to 4, it was confirmed that the $ZrO_2$ (N), $ZrO_2$ (S), and $ZrO_2$ (P)-0.5 catalysts including the $NO_3^-$/$SO_4^{2-}$/$H_2PO_4^-$/$HPO_4^{2-}$/$PO_4^{3-}$ functional groups on the surface had increased $-r_{H2O2,0}$ values compared to the $ZrO_2$ catalyst not including the functional groups. This results indicate that the catalysts including the functional groups on the surfaces have improved ability to decompose non-degradable organic materials compared to the catalyst not including the functional groups. In addition, as predicted in the analysis of physical properties of the catalysts of Examples 2 to 4, it was confirmed that the $ZrO_2$ (P)-0.5 catalyst including the $H_2PO_4^-$/$HPO_4^{2-}$/$PO_4^{3-}$ functional groups of Example 4 had an increased $-r_{H2O2,0}$ value compared to the $NO_3^-$/$SO_4^{2-}$-functionalized $ZrO_2$ (N) catalyst (Example 2) and $ZrO_2$ (S) catalyst (Example 3). This result indicates that the $H_2PO_4^-$/$HPO_4^{2-}$/$PO_4^{3-}$ functional groups may more efficiently improve the ability to decompose non-degradable organic materials than the $NO_3^-$/$SO_4^{2-}$ functional groups. Also, this result indicates that it is important to select type/stoichiometry/structure of the metal included in the $NO_3^-$/$SO_4^{2-}$/$H_2PO_4^-$/$HPO_4^{2-}$/$PO_4^{3-}$-functionalized $d^0$-orbital-based transition metal oxide and functionalization conditions thereof to improve the ability to decompose non-degradable organic materials.

A reaction test was performed using the catalysts of Examples 8 and 9 and hydrogen peroxide ($H_2O_2$) dissolved in an aqueous solution as a non-degradable organic material. 0.2 g of the catalyst was used and 100 mL of an aqueous solution was used as a reaction solution, and the reaction test was performed at 25° C. at a pH of 7 using 30 mmol of $H_2O_2$. A slope of a pseudo-$1^{st}$-order kinetic fitting graph ($-\ln(C_{H2O2}/C_{H2O2,0})$ VS. time) obtained based on a conversion rate of $H_2O_2$ in which measurement values (autolysis of $H_2O_2$ and adsorption of $H_2O_2$ by catalyst) of the test were corrected is equal to a $H_2O_2$ decomposition rate constant ($k_{APP}$, $min^{-1}$). An initial $H_2O_2$ decomposition rate ($-r_{H2O2,0}$, $min^{-1}$) was calculated by multiplying $k_{APP}$ of each catalyst by $N_{H2O2,0}$, and dividing the result value by the amount (0.2 g) of the catalyst and shown in FIG. 23. As predicted in the analysis of physical properties of the catalysts of Examples 8 and 9, the Mn (N) catalyst of Example 9 showed an increased $-r_{H2O2,0}$ value compared to the Mn catalyst. This result indicates that the $NO_3^-$-functionalized Mn (N) catalyst may exhibit increased efficiency of catalytic decomposition of hydrogen peroxide (·OH productivity) when compared with the non-functionalized Mn catalyst.

A reaction test was performed using the catalysts of Examples 29 to 33, a graphite electrode, hydrogen peroxide ($H_2O_2$) as a non-degradable organic material, and a $Na_2SO_4$ aqueous electrolytic solution in the absence of electricity. When the catalysts were coated on the electrode, poly(vinylidene fluoride) (PVDF) was used as a binder. 0.2 g of the catalyst was used and 100 mL of an aqueous solution in which 0.2 mol of $Na_2SO_4$ was dissolved was used as a reaction solution. The reaction test was performed at 25° C. at a pH of 7. An amount of $H_2O_2$ used in the reaction was an amount observed after 8 hours of reaction in the absence of phenol under the electro-Fenton reaction conditions of Experimental Example 25 below ($N_{H2O2,0}$: 0.13 $mmol_{H2O2}$ for $Mn_3$ (S); 0.18 $mmol_{H2O2}$ for $Mn_2$ (S); 0.26 $mmol_{H2O2}$ for $Mn_{1.5}$ (S); 0.22 $mmol_{H2O2}$ for $Mn_1$ (S); and 0.23 $mmol_{H2O2}$ for $Mn_0$ (S)). A slope of a pseudo-$1^{st}$-order kinetic fitting graph ($-\ln(C_{H2O2}/C_{H2O2,0})$ VS. time) obtained based on a conversion rate of $H_2O_2$ in which measurement values of the test were corrected is equal to a $H_2O_2$ decomposition rate constant ($k_{APP}$, $min^{-1}$).

Figure 24:
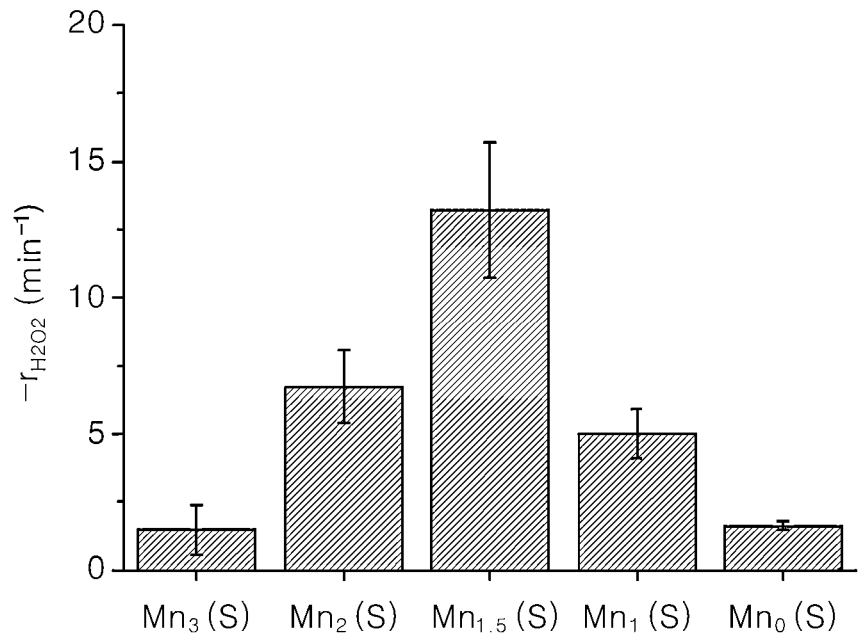
FIG. 24 is a graph illustrating phenol decomposition test results by electro-Fenton reaction using catalysts according to an embodiment of the present invention.

An initial $H_2O_2$ decomposition rate ($-r_{H2O2,0}$, $min^{-1}$) was calculated by multiplying $k_{APP}$ of each catalyst by $N_{H2O2,0}$, and dividing the result value by $N_{co}$ value (number of moles of Lewis acid per gram of the above-described CO-accessible catalyst) included in the amount (0.2 g) of the catalyst and shown in FIG. 24. As predicted in the analysis of physical properties of the catalysts of Examples 29 to 33, the $Mn_{1.5}$ (S) catalyst of Example 31 exhibited a higher $-r_{H2O2,0}$ value than the other catalysts ($Mn_3$ (S), $Mn_2$ (S), $Mn_1$ (S), and $Mn_0$ (S)). This result indicates that the $Mn_{1.5}$ (S) catalyst may have improved ability to decompose non-degradable organic materials compared with the other catalysts. In addition, this result indicates that it is important to select types and stoichiometry Z of $M_A/M_B$ included in the $SO_4^{2-}$-functionalized $(M_A)_Z(M_B)_{3-Z}O_4$ for continuous improvement of the ability to decompose non-degradable organic materials.

Experimental Example 2: Phenol Decomposition Test (1) Electro-Fenton Reaction

Figure 25:
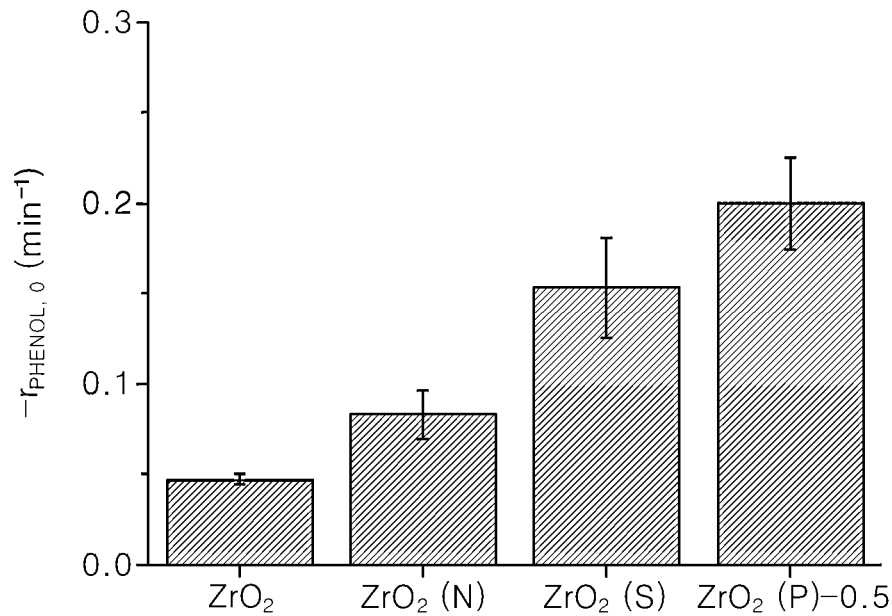
FIG. 25 is a graph illustrating aniline decomposition test results by electro-Fenton reaction using catalysts according to an embodiment of the present invention.
Figure 26A:
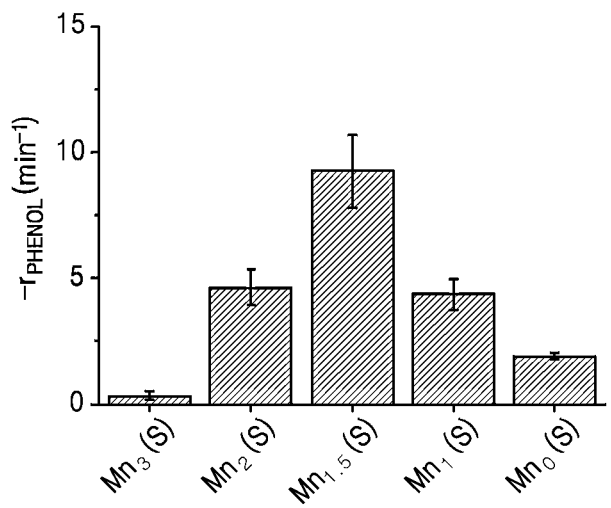
FIGS. 26A and 26B show graphs illustrating phenol decomposition test results by electro-Fenton reaction using catalysts according to an embodiment of the present invention.
Figure 26B:
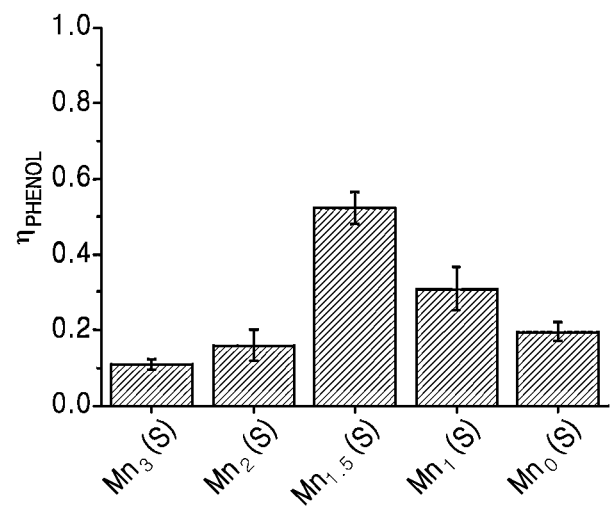

An electro-Fenton reaction test was performed using the catalysts according to Examples 1 to 4 and Examples 29 to 33, a graphite electrode, phenol ($C_6H_5OH$) as an organic material, and a $Na_2SO_4$ aqueous electrolytic solution. When the catalysts were coated on the electrode, poly(vinylidene fluoride) (PVDF) was used as a binder. 0.2 g of the catalyst was used and 100 mL of an aqueous solution in which 0.1 mmol of phenol ($N_{PHENOL,0}$) and 0.2 mol of $Na_2SO_4$ were dissolved was used as a reaction solution. The electro-Fenton reaction test was performed at 25° C. at a pH of 7 with a power of 0.04 W. A slope of a pseudo-$1^{st}$-order kinetic fitting graph ($-\ln(C_{PHENOL}/C_{PHENOL,0})$ VS. time) obtained based on a conversion rate of phenol in the test is equal to a phenol decomposition rate constant ($k_{APP}$, $min^{-1}$). An initial phenol decomposition rate ($-r_{PHENOL,0}$, $min^{-1}$) was calculated by multiplying $k_{APP}$ of each catalyst by $N_{PHENOL,0}$ (0.1 mmol) and dividing the result value by $N_{CO}$ value (number of moles of Lewis acid per gram of the above-described CO-accessible catalyst; shown in Table 2) contained in the amount (0.2 g) of the catalyst and shown in FIGS. 25 and 26. As predicted in the analysis of physical properties of the catalysts of Examples 1 to 4, it was confirmed that the $ZrO_2$ (N), $ZrO_2$ (S), and $ZrO_2$ (P)-0.5 catalysts including the $NO_3^-$/$SO_4^{2-}$/$H_2PO_4^-$/$HPO_4^{2-}$/$PO_4^{3-}$ functional groups on the surface had increased $-r_{PHENOL,0}$ values compared to the $ZrO_2$ catalyst not including the functional groups. Also, as predicted in the analysis of physical properties of the catalysts of Examples 2 to 4, it was confirmed that the $ZrO_2$ (P)-0.5 catalyst including the $H_2PO_4^-$/$HPO_4^{2-}$/$PO_4^{3-}$ functional groups of Example 4 had increased $-r_{PHENOL,0}$ values compared to the $NO_3^-$/$SO_4^{2-}$-functionalized $ZrO_2$ (N) catalyst (Example 2) and $ZrO_2$ (S) catalyst (Example 3). This result indicates that the $H_2PO_4^-$/$HPO_4^{2-}$/$PO_4^{3-}$ functional groups may more efficiently improve the ability to decompose non-degradable organic materials than the $NO_3^-$/$SO_4^{2-}$ functional groups. Also, it was confirmed the amount of Zr leached from the catalyst during the phenol decomposition reaction is negligible. This result indicates that it is important to select type/stoichiometry/structure of the metal included in the $NO_3^-$/$SO_4^{2-}$/$H_2PO_4^-$/$HPO_4^{2-}$/$PO_4^{3-}$-functionalized $d^0$-orbital-based transition metal oxide and functionalization conditions thereof to continuously improve the ability to decompose non-degradable organic materials.

As predicted in the analysis of physical properties of the catalysts of Examples 29 to 33, it was confirmed that the $Mn_{1.5}$ (S) catalyst of Example 31 had higher $-r_{PHENOL,0}$ and $\eta_{PHENOL}$ values than those of the other catalysts ($Mn_3$ (S), $Mn_2$ (S), $Mn_1$ (S) and $Mn_0$ (S)). In addition, amounts of Mn and Fe leached from the catalysts during the phenol decomposition reaction were quantified and shown in Table 6. As shown in Table 6, it was confirmed that less amounts of Mn and Fe were leached from the $Mn_{1.5}$ (S) catalyst of Example 31 when compared to the other catalysts ($Mn_3$ (S), $Mn_2$ (S), $Mn_1$ (S) and $Mn_0$ (S)). This results indicate that it is important to select the types and stoichiometry Z of $M_A/M_B$ included in the $SO_4^{2-}$-functionalized $(M_A)_Z(M_B)_{3-Z}O_4$ for continuous improvement of the ability to decompose non-degradable organic materials.

TABLE 6

|  | Example 29 $Mn_3$ (S) | Example 30 $Mn_2$ (S) | Example 31 $Mn_{1.5}$ (S) | Example 32 $Mn_1$ (S) | Example 33 $Mn_0$ (S) |
| --- | --- | --- | --- | --- | --- |
| Mn (mol. %) | 0.18 (<±0.01) | 0.60 (±0.01) | 0.03 (±0.01) | 0.01 (<±0.01) | — |
| Fe (mol. %) | — | 0.01 (<±0.01) | 0.03 (±0.01) | 0.07 (<±0.01) | 0.06 (<±0.01) |

(2) Non-Electro-Fenton Reaction

Figure 23:
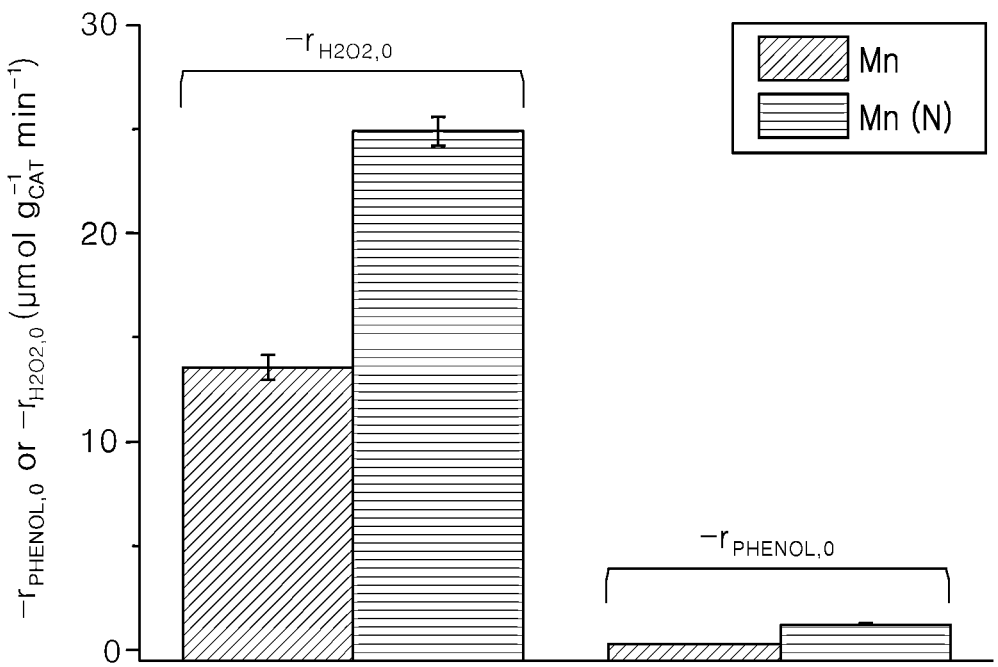
FIG. 23 is a graph illustrating test results of decomposing hydrogen peroxide ($H_2O_2$) and phenol using transition metal oxide grains according to an embodiment of the present invention.
Figure 43:
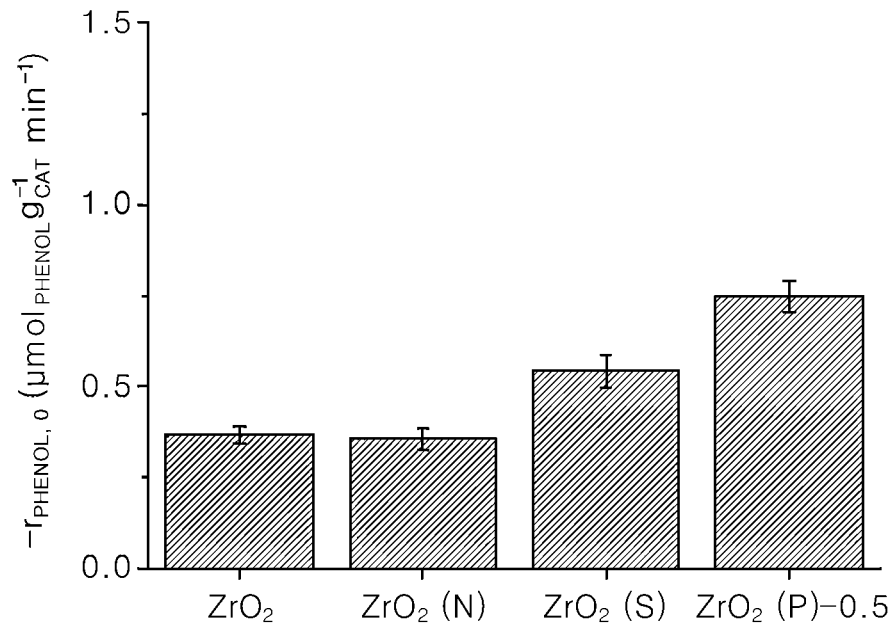
FIG. 43 is a graph illustrating phenol decomposition test results using catalysts according to an embodiment of the present invention.

A reaction test is performed using the catalysts of Examples 1 to 4, 8, and 9, and hydrogen peroxide ($H_2O_2$) dissolved in an aqueous solution as an organic material, and phenol ($C_6H_5OH$) as a non-degradable organic material. 0.2 g of the catalyst was used and 100 mL of an aqueous solution was used as a reaction solution, and the reaction test was performed at 25° C. at a pH of 7 using 30 mmol of $H_2O_2$ and 0.1 mmol of phenol. A slope of a pseudo-$1^{st}$-order kinetic fitting graph ($-\ln(C_{PHENOL}/C_{PHENOL,0})$ VS. time) obtained based on a conversion rate of phenol in the test is equal to a phenol decomposition rate constant ($k_{APP}$, $min^{-1}$). An initial phenol decomposition rate ($-r_{PHENOL,0}$) was calculated by multiplying $k_{APP}$ of each catalyst by $N_{PHENOL,0}$ (0.1 mmol), and dividing the result value by the amount (0.2 g) of the catalyst and shown in FIGS. 43 and 23. Referring to FIG. 43, it was confirmed that the $ZrO_2$ (S) and $ZrO_2$ (P)-0.5 catalysts of Examples 3 and 4 higher $-r_{PHENOL,0}$ values than the $ZrO_2$ and $ZrO_2$ (N) catalysts of Examples 1 and 2. This result indicate that the $ZrO_2$ (S) and $ZrO_2$ (P)-0.5 catalysts including the $SO_4^{2-}/H_2PO_4^-/HPO_4^{2-}/PO_4^{3-}$ functional groups may exhibit improved ability to decompose the non-degradable organic material compared to the $ZrO_2$ catalyst not including the functional groups and the $ZrO_2$ (N) catalyst including the $NO_3^-$ functional group on the surface under electro-Fenton conditions (using $H_2O_2$). Referring to FIG. 23, it was confirmed that the Mn (N) catalyst of Example 9 catalyst had a higher $-r_{PHENOL,0}$ value than the Mn catalyst of Example 8. This result indicates that the $NO_3^-$-functionalized Mn (N) catalyst had improved ability to decompose the non-degradable organic material compared with the non-functionalized Mn catalyst.

Experimental Example 3: Phenol Decomposition Test Using Scavenging Agent

Figure 27:
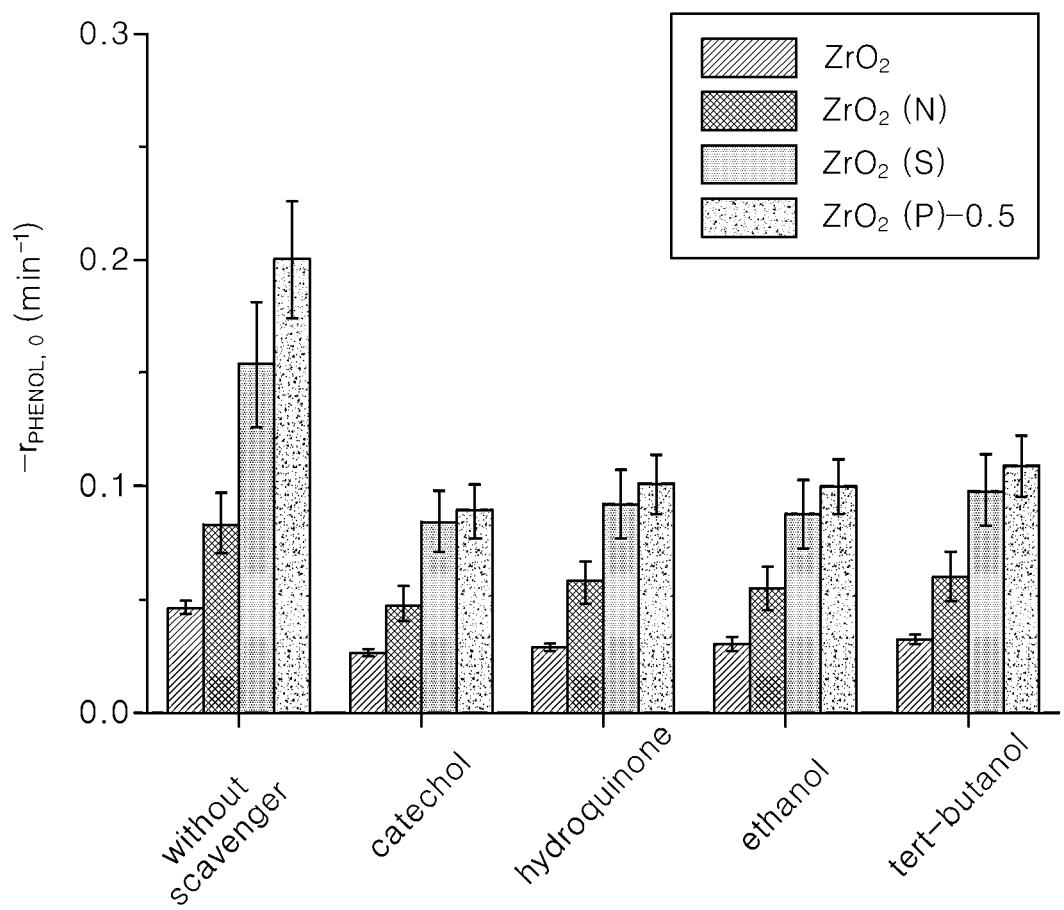
FIG. 27 is a graph illustrating phenol decomposition test results by electro-Fenton reaction using catalysts according to an embodiment of the present invention.
Figure 28:
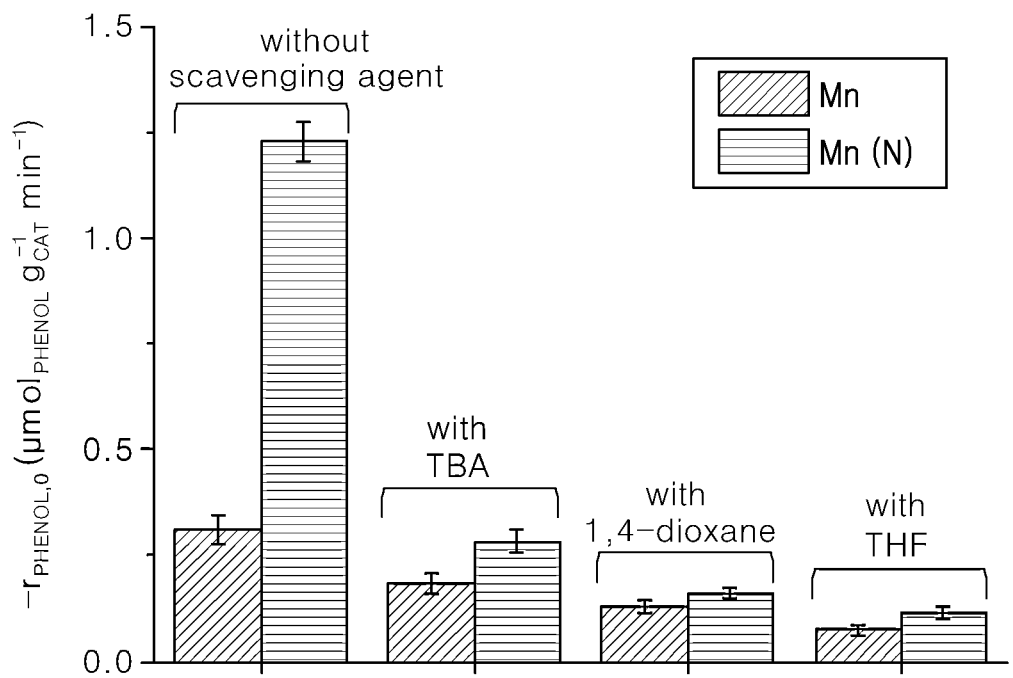
FIG. 28 is a graph illustrating phenol decomposition test rests using transition metal oxide grains according to an embodiment of the present invention in the presence of a scavenging agent of radicals (·OH or NO$_3$·)
Figure 29:
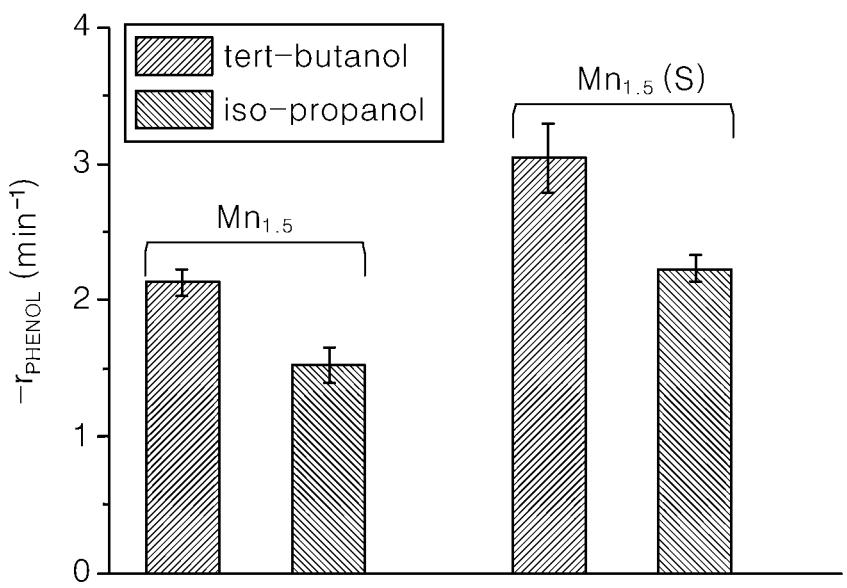
FIG. 29 is a graph illustrating phenol decomposition test results by electro-Fenton reaction using catalysts according to an embodiment of the present invention.

The reaction was performed under the same conditions as those of Experimental Example 2 using the catalysts of Examples 1 to 4, Examples 8 and 9, Example 26 ($Mn_{1.5}$) and Example 31 ($Mn_{1.5}$ (S)), except that an excess of catechol, hydroquinone, ethanol, tert-butanol, 1,4-dioxane, tetrahydrofuran (THF), or isopropyl alcohol, as a scavenging agent, was added thereto to quench the ·OH and $NO_3·/SO_4·^-/H_2PO_4·/HPO_4·^-/PO_4^{2·-}$ formed during the reaction in different quenching rates, and the results are shown in FIGS. 27 to 29. In addition, radical quenching rate constants (secondary rate constants) of the scavenging agents are shown in Table 7.

TABLE 7

|  | $k_{·OH}$ ($M^{-1}s^{-1}$) | $k_{·OOH}$ ($M^{-1}s^{-1}$) | $k_{NO_3·}$ ($M^{-1}s^{-1}$) | $k_{SO_4·^-}$ ($M^{-1}s^{-1}$) | $k_{H2PO4·}$ ($M^{-1}s^{-1}$) |
| --- | --- | --- | --- | --- | --- |
| catechol ($C_6H_6O_2$) | $1.1 \times 10^{10}$ | $4.7 \times 10^4$ | — | — | — |
| hydroquinone ($C_6H_6O_2$) | $5.2 \times 10^9$ | $1.7 \times 10^7$ | — | — | — |
| ethanol ($C_2H_6O$) | $2.2 \times 10^9$ | — | $1.4 \times 10^6$ | $4.3 \times 10^7$ | $7.7 \times 10^7$ |
| tert-butanol ($C_4H_{10}O$) | $5.7 \times 10^8$ | — | $5.7 \times 10^4$ | $6.5 \times 10^5$ | $3.9 \times 10^6$ |

For amounts of the scavenging agents added to each reaction, refer to Chemical Reaction Scheme 32 that may occur during catalytic decomposition of $H_2O_2$ using surface active species of the $d^0$-orbital-based transition metal oxide and the amounts were calculated by adding bulk N/S/P content present in the catalyst to twice the amount of $H_2O_2$ generated by the catalysts of Examples 1 to 4, Example 26 ($Mn_{1.5}$) and Example 31 ($Mn_{1.5}$ (S)) in the presence of electricity.

$H_2O_2 \rightarrow (½)·OH + (½)·OOH$     Reaction Scheme 32:

It was confirmed that the $-r_{PHENOL,0}$ values of all catalysts of Experimental Example 3 performed after adding the scavenging agent thereto were smaller than the $-r_{PHENOL,0}$ values obtained in the absence of the scavenging agent. This indicates that decomposition of phenol is performed by ·OH or $NO_3·/SO_4·^-/H_2PO_4·/HPO_4·^-/PO_4^{2·-}$ generated in the electro-Fenton reaction when the catalysts according to Examples 1 to 4, Examples 8 and 9, Example 26 (Mn1.5) and Example 31 (Mn1.5 (S)) were used. Also, it was confirmed that the $-r_{PHENOL,0}$ values of the $NO_3^-/SO_4^{2-}/H_2PO_4^-/HPO_4^{2-}/PO_4^{3-}$-functionalized catalysts of Examples 2 to 4 were greater than the $-r_{PHENOL,0}$ value of the non-functionalized catalyst Example 1 in the presence of the scavenging agent. Based on the tendency and size of radical quenching rate constants (secondary rate constants) of each scavenging agent, the results of FIG. 27 indicate that the $NO_3^-/SO_4^{2-}/H_2PO_4^-/HPO_4^{2-}/PO_4^{3-}$-functionalized catalysts of Examples 2 to 4 use $NO_3·/SO_4·^-/H_2PO_4·/HPO_4·/PO_4^{2·}$ present on the surfaces to decompose the non-degradable organic material. In addition, the results of FIG. 27 indicate that the non-functionalized catalyst of Example 1 uses ·OH to decompose the non-degradable organic material.

Experimental Example 4: Phenol Decomposition Based on Heterogeneous Catalysis

Figure 30:
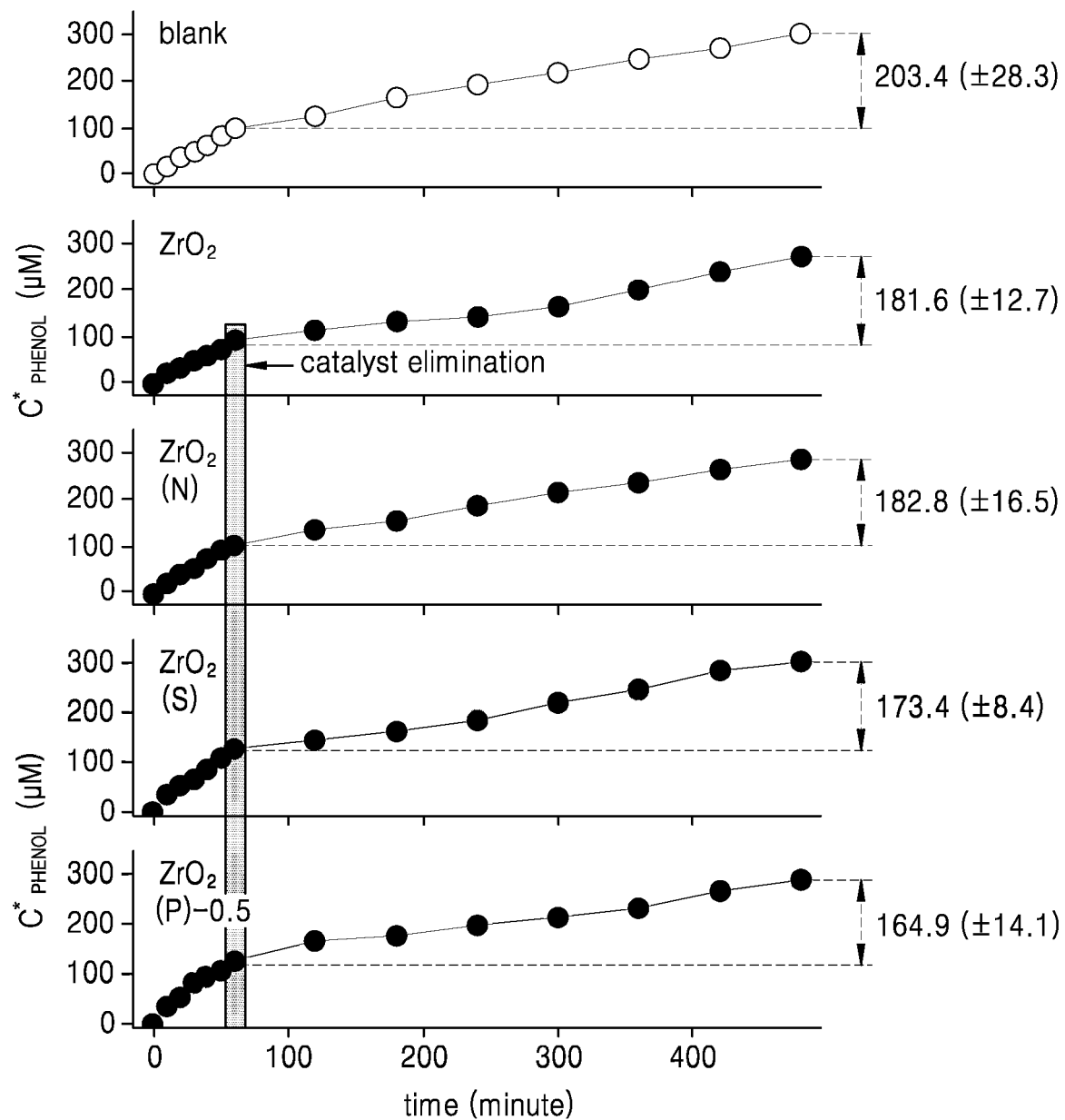
FIG. 30 is a graph illustrating conversion rates of decomposed phenol with respect to time when catalysts according to an embodiment of the present invention were used.

In order to verify that phenol decomposition of Example 1 is performed by ·OH generated by $H_2O_2$ decomposition occurring on the surface of the catalyst, Experimental Example 4 was performed under the same conditions as those of Experimental Example 2 above using the catalyst of Example 1. In addition, in order to verify that phenol decomposition of Examples 2 to 4, Example 8 (Mn), Example 9 (Mn(N)), and Example 31 ($Mn_{1.5}$ (S)) was performed by $NO_3^-/SO_4^-/H_2PO_4^-/HPO_4^-/PO_4^{2-}$ of the surface of the catalyst, Experimental Example 4 was performed under the same conditions as those of Experimental Example 2 above using the catalyst of Examples 2 to 4, Example 8 (Mn), Example 9 (Mn(N)), and Example 31 ($Mn_{1.5}$ (S)). In this regard, a test was performed in the same manner as in Experimental Example 2 for 1 hour, and then was continued after replacing the cathodes of Examples 1 to 4 with cathodes without the catalysts and filtering the aqueous reaction solutions. It is important that consumption of phenol observed after 1 hour is caused by anodic oxidation occurring in the anode even in the absence of the catalyst, $H_2O_2$ decomposition (·OH production; Example 1) by active species leached from the catalyst, or $NO_3^-/SO_4^-/H_2PO_4^-/HPO_4^-/PO_4^{2-}$ active species leached from the catalyst (Examples 2 to 4). Conversion amounts of phenol with time according to the method were monitored and shown in FIGS. 30 to 32. Referring to FIG. 30, the conversion amounts ($C^*_{PHENOL}$) of phenol of the cathodes according to Examples 1 to 4 after 1 hour were 181.6 (±12.7) μM, 182.8 (±16.5) μM, 173.4 (±8.4) μM, and 164.9 (±14.1) μM, respectively. These values are similar to a conversion amount (203.4 (±28.3) μM) of phenol caused by anodic oxidation observed in reaction performed using cathodes not coated with the catalysts of Examples 1 to 4. This indicates that the decomposition of phenol is performed by $H_2O_2$ activator based on heterogeneous catalysis (Example 1) or $NO_3^-/SO_4^-/H_2PO_4^-/HPO_4^-/PO_4^{2-}$ active species which are coated on but not leached from the catalyst.

Figure 31:
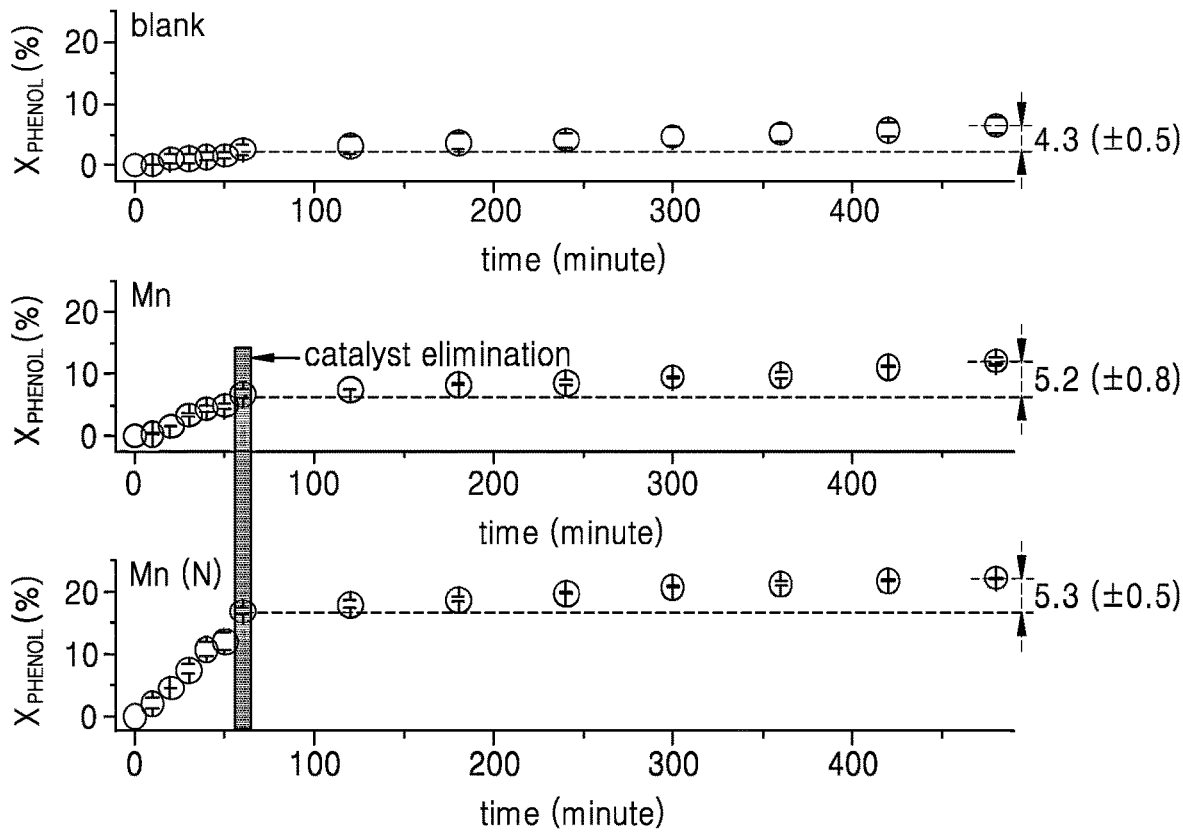
FIG. 31 is a graph illustrating conversion rates of decomposed phenol with respect to reaction time of transition metal oxide catalyst grains according to an embodiment of the present invention.
Figure 32A:
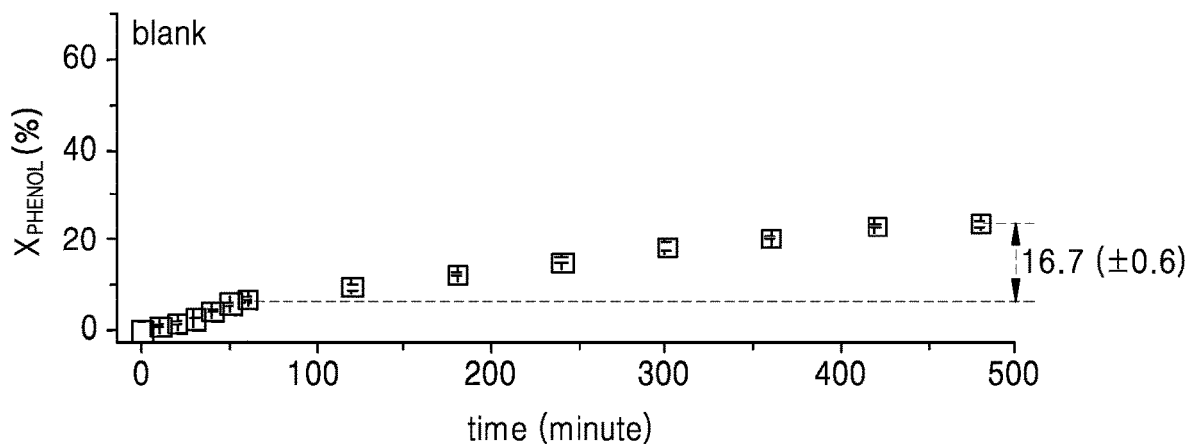
FIGS. 32A and 32B are graphs illustrating conversion rates of decomposed phenol with respect to time when catalysts according to an embodiment of the present invention were used.

Referring to FIG. 31, phenol conversion rates ($X_{PHENOL}$) of 5.2 (±0.8)% and 5.3 (±0.5)% were observed in the reaction solutions after 1 hour. These values are similar to a phenol conversion rate ($X_{PHENOL}$) of 4.3 (±0.5)% caused by decomposition of phenol by $H_2O_2$ observed in reaction without using the catalyst. This indicates that the phenol decomposition is performed based on catalytic scission (·OH production) of $H_2O_2$ by non-leached $Mn^{\delta+}$ species in the case of Example 8 and based on heterogeneous catalysis using non-leached $NO_3·$ active species in the case of Example 9.

Figure 32B:
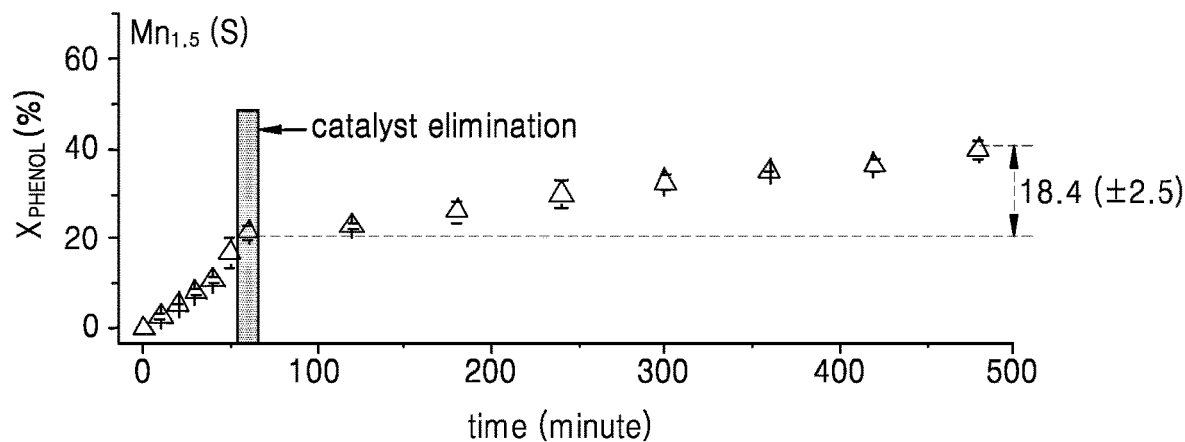

Referring to FIG. 32b, a phenol conversion rate ($X_{PHENOL}$) of 18.4 (±2.5)% was observed in the cathode of Example 31 after 1 hour. This value is similar to a phenol conversion rate ($X_{PHENOL}$) of 16.7 (±0.6)% shown in FIG. 32a caused by anodic oxidation observed in reaction using the catalyst of Example 31 not coated on the cathode. This indicates that phenol decomposition is performed based on heterogeneous catalysis using $SO_4^-$ active species coated on the electrode but not leached.

Figure 33:
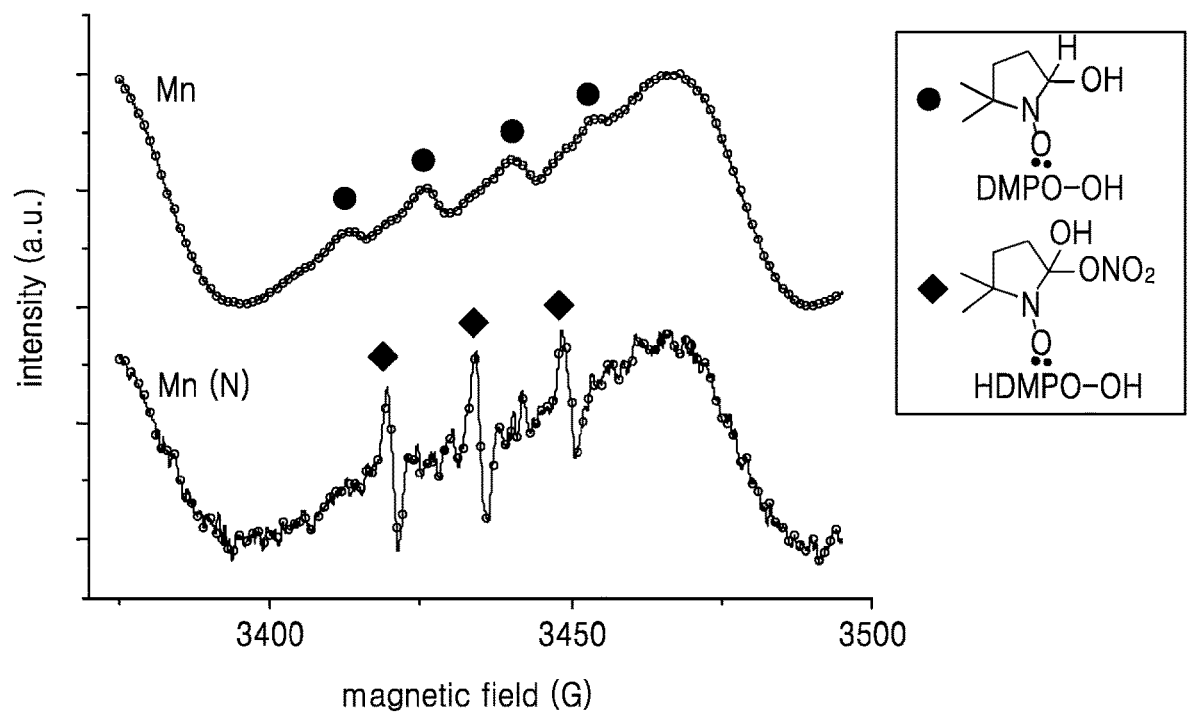
FIG. 33 is a graph illustrating electron paramagnetic resonance (EPR) spectroscopy analysis results of catalysts according to an embodiment of the present invention.

Experimental Example 5: Electron Paramagnetic Resonance (EPR) Spectroscopy Analysis To prove $H_2O_2$ scission (·OH production) occurring in the Mn catalyst of Example 8 and formation of $NO_3·$ active species on the surface of the Mn (N) catalyst of Example 9, EPR spectroscopy analysis was performed, and the results are shown in FIG. 33. A reaction test was performed using the catalysts of Examples 8 and 9 and hydrogen peroxide ($H_2O_2$) dissolved in an aqueous solution as an organic material. 0.02 g of the catalyst was used and 10 mL of an aqueous solution was used as a reaction solution. The reaction test was performed at 25° C. at a pH of 7 using 3 mmol of $H_2O_2$ and 30 mmol of 5,5-dimethyl-1-pyrroline N-oxide (DMPO) was used for formation of adducts of ·OH or $NO_3·$ surface species radicals. When the ·OH or $NO_3·$ surface species are present in the reaction solution, they react with DMPO to form DMPO—OH or HDMPO—OH radials, respectively. As shown in FIG. 23, it was confirmed that DMPO—OH or HDMPO—OH radicals were formed during the reaction in the cases of the Mn catalyst of Example 8 and the Mn (N) catalyst of Example 9. This directly indicates that ·OH⇒$NO_3·$ radical transfer occurs very rapidly on the surface of the Mn (N) catalyst of Example 9, and the $NO_3·$ surface species are present thereon.

Experimental Example 6: Catalyst Durability Test

Figure 34:
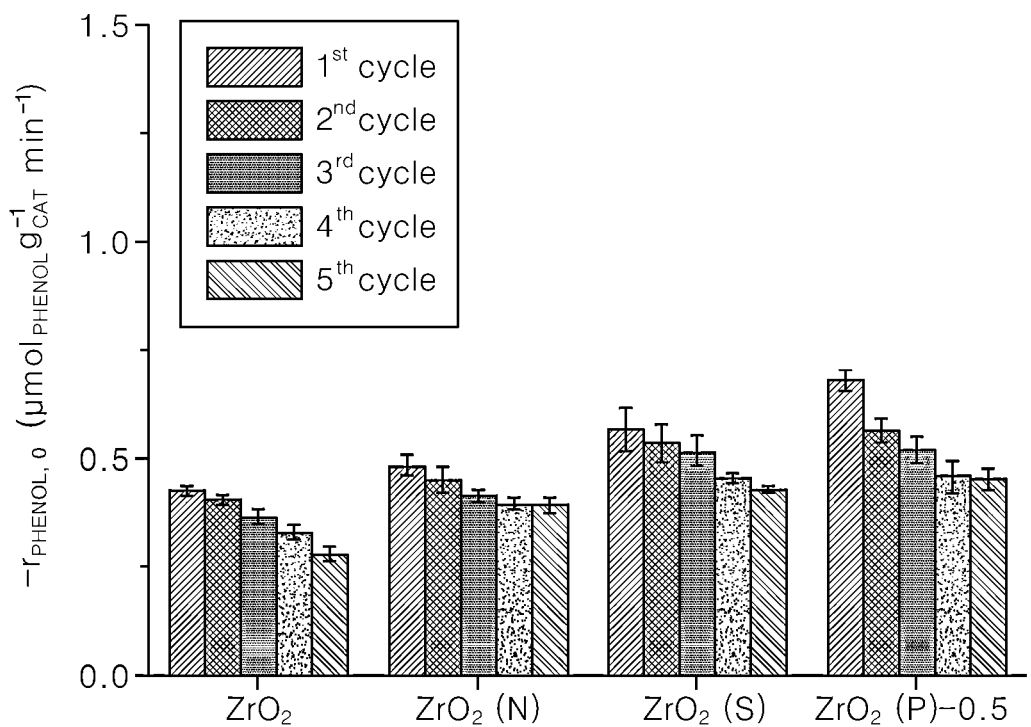
FIG. 34 is a graph illustrating phenol decomposition recycling test results by electro-Fenton reaction using catalysts according to an embodiment of the present invention.
Figure 35:
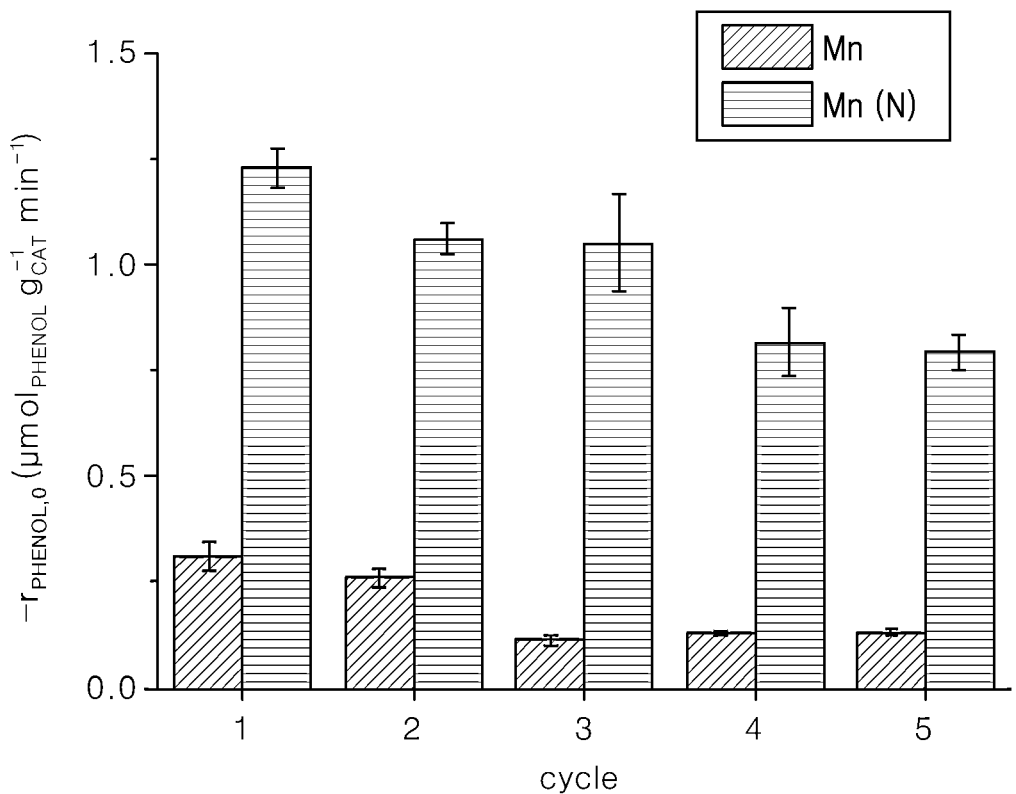
FIG. 35 is a graph illustrating phenol decomposition recycling test results using catalysts according to an embodiment of the present invention.
Figure 36:
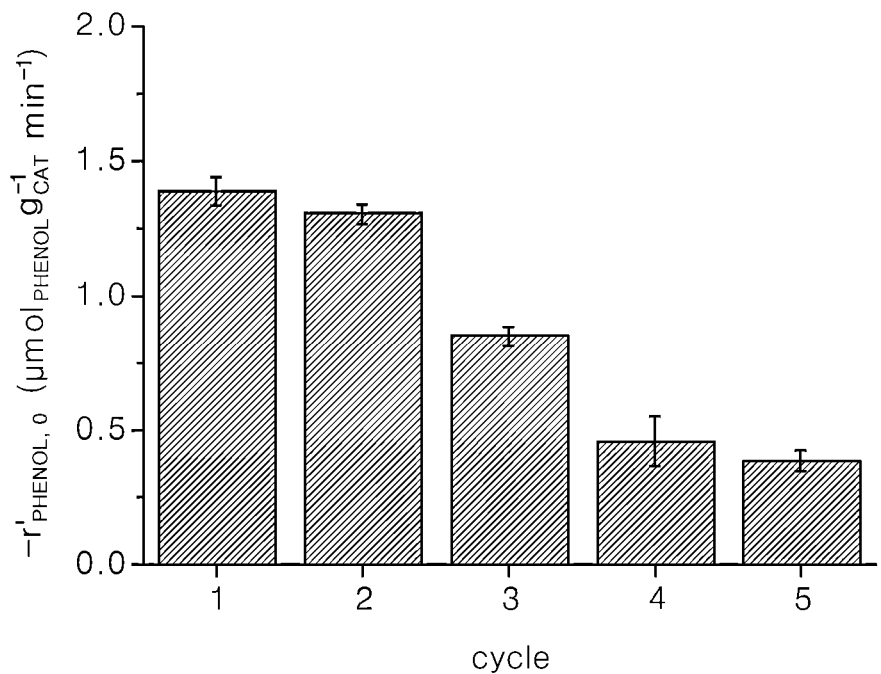
FIG. 36 is a graph illustrating phenol decomposition recycling test results by electro-Fenton reaction using catalysts according to an embodiment of the present invention.

To verify durability of the developed catalysts, Experimental Example 6 was performed under the same conditions as those of Experimental Example 2 using the catalysts of Examples 1 to 4, Examples 8 and 9, and Example 31 ($Mn_{1.5}$ (S)). The catalysts after each reaction cycle were washed/dried/accumulated and are used for a subsequent reaction cycle. Results of Experimental Example 6 are shown in FIGS. 34 to 36. A slope of a pseudo-$1^{st}$-order kinetic fitting graph ($-\ln(C_{PHENOL}/C_{PHENOL,0})$ VS. time) obtained based on a conversion rate of phenol in the test is equal to a phenol decomposition rate constant ($k_{APP}$, $min^{-1}$). An initial phenol decomposition rate ($-r_{PHENOL,0}$, $\mu mol_{PHENOL}$ $g_{CAT}^{-1}$ $min^{-1}$) was calculated by multiplying $k_{APP}$ of each catalyst by $N_{PHENOL,0}$ (0.1 mmol), and dividing the result value by the amount (0.2 g) of the catalyst and shown in FIGS. 34 to 36.

It was confirmed that $-r_{PHENOL,0}$ values gradually decreases as the number reaction cycles increases in the cases of the catalysts of Examples 1 to 4. However, it was confirmed that the tendency of the $-r_{PHENOL,0}$ values of the catalysts observed in Experimental Example 2 ($1^{st}$ cycle) ($ZrO_2 < ZrO_2$ (N) $< ZrO_2$ (S) $< ZrO_2$ (P)-0.5) was maintained in the $5^{th}$ cycle. This indicates that it is important to select type/stoichiometry/structure of the metal included in the $NO_3^-/SO_4^{2-}/H_2PO_4^-/HPO_4^{2-}/PO_4^{3-}$-functionalized $d^0$-orbital-based transition metal oxide and functionalization conditions thereof for continuous improvement of the ability to decompose non-degradable organic materials as shown in the results of Experimental Examples 1 and 2. Although the $-r_{PHENOL,0}$ values of the $NO_3^-$-functionalized Mn (N) catalyst continuously decreases from −1.2 $\mu mol_{PHENOL}$ $g_{CAT}^{-1}$ $min^{-1}$ to ~0.8 $\mu mol_{PHENOL}$ $g_{CAT}^{-1}$ $min^{-1}$ as the number of reaction cycles increases, considerably high $-r_{PHENOL,0}$ values were obtained during a recycle test compared to the non-functionalized Mn catalyst. This indicates that the $NO_3^-$-functionalized Mn (N) catalyst has excellent recyclability of performance of non-degradable organic material decomposition compared to the non-functionalized Mn catalyst.

In the case of the $Mn_{1.5}$ (S) catalyst, the $-r_{PHENOL,0}$ values gradually decrease from ~1.4 $\mu mol_{PHENOL}$ $g_{CAT}^{-1}$ $min^{-1}$ ($1^{st}$ cycle) to ~0.4 $\mu mol_{PHENOL}$ $g_{CAT}^{-1}$ $min^{-1}$ ($5^{th}$ cycle) as the number reaction cycles increases. However, it was confirmed that the $-r_{PHENOL,0}$ value of the $Mn_{1.5}$ (S) catalyst observed at the $5^{th}$ cycle is greater than or similar to the $-r_{PHENOL,0}$ values of the $Mn_3$ (S) catalyst of Example 29 (0.1 $\mu mol_{PHENOL}$ $g_{CAT}^{-1}$ $min^{-1}$) and the $Mn_0$ (S) catalyst of Example 33 (0.8 $\mu mol_{PHENOL}$ $g_{CAT}^{-1}$ $min^{-1}$) obtained at the $1^{st}$ cycle. This result indicates that it is important to select the type and stoichiometry Z of $M_A/M_B$ included in the $SO_4^{2-}$-functionalized $(M_A)_Z(M_B)_{3-Z}O_4$ for continuous improvement of the ability to decompose non-degradable organic materials, as shown in the results of Experimental Examples 24 and 25.

Experimental Example 7: Aniline Decomposition Test

Figure 37:
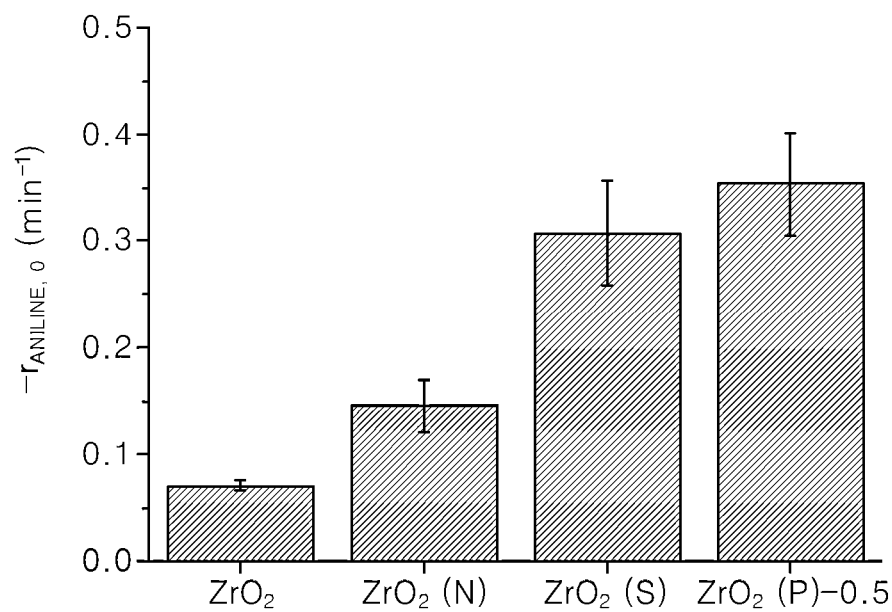
FIG. 37 is a graph illustrating aniline decomposition test results by electro-Fenton reaction using catalysts according to an embodiment of the present invention.
Figure 38A:
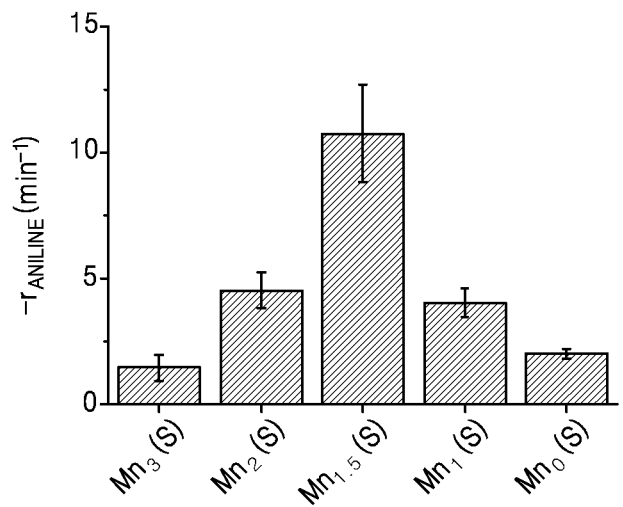
FIGS. 38A and 38B are graphs illustrating aniline decomposition test results by electro-Fenton reaction using catalysts according to an embodiment of the present invention.

For application of the developed catalysts, an electro-Fenton reaction test was performed using the catalysts according to Examples 1 to 4 and 29 to 33, a graphite electrode, aniline ($C_6H_5NH_2$) as an organic material, and a $Na_2SO_4$ aqueous electrolytic solution. When the catalysts were coated on the electrode, poly(vinylidene fluoride) (PVDF) was used as a binder. 0.2 g of the catalyst was used and 100 mL of an aqueous solution in which 0.1 mmol of aniline ($N_{ANILINE,0}$) and 0.2 mol of $Na_2SO_4$ were dissolved was used as a reaction solution. The electro-Fenton reaction test was performed at 25° C. at a pH of 7 with a power of 0.04 W. A slope of a pseudo-$1^{st}$-order kinetic fitting graph ($-\ln(C_{ANILINE}/C_{ANILINE,0})$ VS. time) obtained based on a conversion rate of aniline in the test is equal to an aniline decomposition rate constant ($k_{APP}$, $min^{-1}$). An initial aniline decomposition rate ($-r_{ANILINE,0}$, $min^{-1}$) was calculated by multiplying $k_{APP}$ of each catalyst by $N_{ANILINE,0}$, and dividing the result value by $N_{CO}$ value (number of moles of Lewis acid per gram of the above-described CO-accessible catalyst; shown in Table 2) contained in the amount (0.2 g) of the catalyst used and is shown in FIGS. 37 and 38. As predicted in the analysis of physical properties of the catalysts of Examples 1 to 4, it was confirmed that the $ZrO_2$ (N), $ZrO_2$ (S), and $ZrO_2$ (P)-0.5 catalysts including the $NO_3^-/SO_4^{2-}/H_2PO_4^-/HPO_4^{2-}/PO_4^{3-}$ functional groups on the surface had increased $-r_{ANILINE,0}$ values compared to the $ZrO_2$ catalyst not including the functional groups. In addition, as predicted in the analysis of physical properties of the catalysts of Examples 2 to 4, it was confirmed that the $ZrO_2$ (P)-0.5 catalyst including the $H_2PO_4^-/HPO_4^{2-}/PO_4^{3-}$ functional groups of Example 4 had an increased $-r_{ANILINE,0}$ value compared to the $NO_3^-/SO_4^{2-}$-functionalized $ZrO_2$ (N) catalyst (Example 2) and $ZrO_2$ (S) catalyst (Example 3). This result indicates that the $H_2PO_4^-/HPO_4^{2-}/PO_4^{3-}$ functional groups may more efficiently improve the ability to decompose non-degradable organic materials than the $NO_3^-/SO_4^{2-}$ functional groups. Also, it was confirmed the amount of Zr leached from the catalyst during the aniline decomposition reaction is negligible. This result indicates that it is important to select type/stoichiometry/structure of the metal included in the $NO_3^-/SO_4^{2-}/H_2PO_4^-/HPO_4^{2-}/PO_4^{3-}$-functionalized $d^0$-orbital-based transition metal oxide and functionalization conditions thereof to continuously improve the ability to decompose non-degradable organic materials.

Figure 38B:
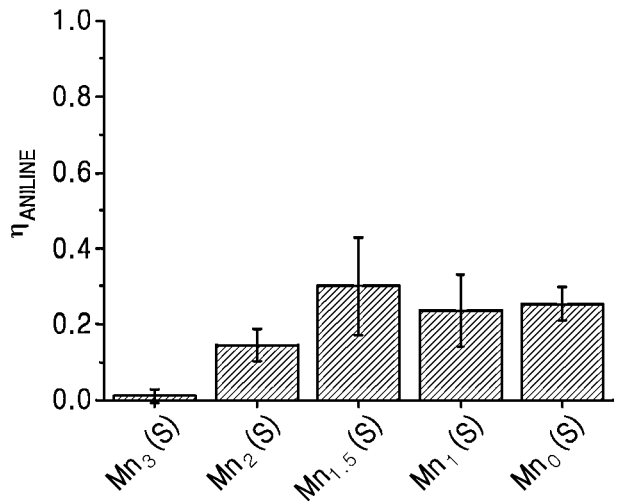

Also, in the electro-Fenton reaction test, a carbon conversion rate to an aniline conversion rate was quantified as $\eta_{ANILINE}$ and shown in FIG. 38b. As predicted in the analysis of physical properties of the catalysts of Examples 29 to 33, it was confirmed that the $Mn_{1.5}$ (S) catalyst of Example 31 had higher $-r_{ANILINE,0}$ and $\eta_{ANILINE}$ values than those of the other catalysts ($Mn_3$ (S), $Mn_2$ (S), $Mn_1$ (S) and $Mn_0$ (S)). The results of Experimental Example 7, like the results of Experimental Examples 1, 2, and 6, indicate that it is important to select the types and stoichiometry Z of $M_A/M_B$ included in the $SO_4^{2-}$-functionalized $(M_A)_Z(M_B)_{3-Z}O_4$ for continuous improvement of the ability to decompose non-degradable organic materials.

Experimental Example 8: Phenol Decomposition Test

Figure 39:
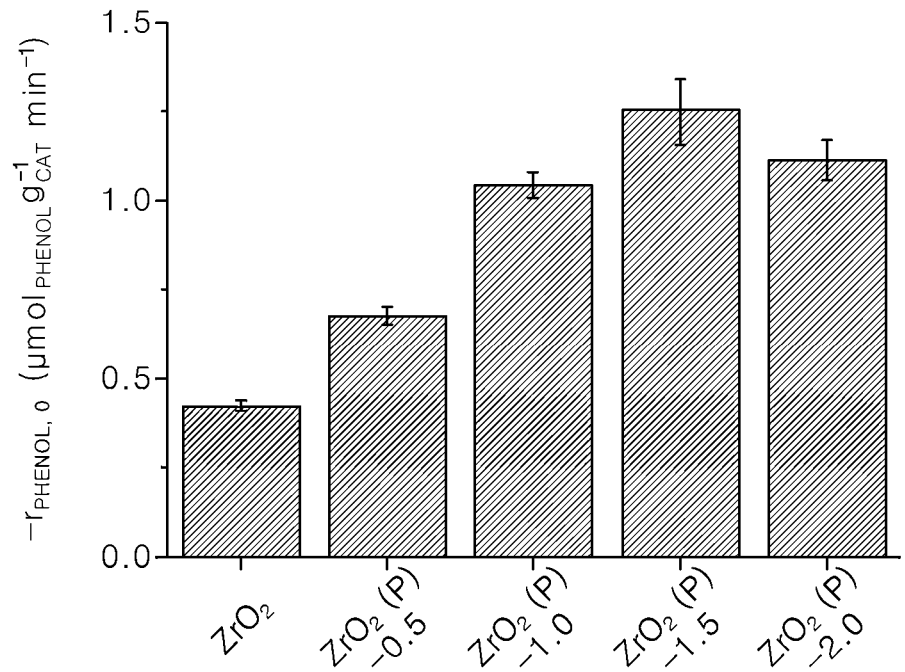
FIG. 39 is a graph illustrating phenol decomposition test results by electro-Fenton reaction using catalysts according to an embodiment of the present invention.

An electro-Fenton reaction test was performed using the catalyst according to Example 1 and the catalyst having different bulk P contents according to Examples 4 to 7, a graphite electrode, phenol ($C_6H_5OH$) as an organic material, and a $Na_2SO_4$ aqueous electrolytic solution. When the catalysts were coated on the electrode, poly(vinylidene fluoride) (PVDF) was used as a binder. 0.2 g of the catalyst was used and 100 mL of an aqueous solution in which 0.1 mmol of phenol ($N_{PHENOL,0}$) and 0.2 mol of $Na_2SO_4$ were dissolved was used as a reaction solution. The electro-Fenton reaction test was performed at 25° C. at a pH of 7 with a power of 0.04 W. A slope of a pseudo-$1^{st}$-order kinetic fitting graph ($-\ln(C_{PHENOL}/C_{PHENOL,0})$ VS. time) obtained based on a conversion rate of phenol in the test is equal to a phenol decomposition rate constant ($k_{APP}$, $min^{-1}$). An initial phenol decomposition rate ($-r_{PHENOL,0}$, $min^{-1}$) was calculated by multiplying $k_{APP}$ of each catalyst by $N_{PHENOL,0}$ (0.1 mmol), and dividing the result value by the amount (0.2 g) of the catalyst and shown in FIG. 39. It was confirmed that the $ZrO_2$ (P)-0.5, $ZrO_2$ (P)-1.0, $ZrO_2$ (P)-1.5, $ZrO_2$ (P)-2.0 catalysts including different amounts of the $H_2PO_4^-/HPO_4^{2-}/PO_4^{3-}$ functional groups on the surface had higher $-r_{PHENOL,0}$ values than the $ZrO_2$ catalyst not including a functional group. Also, the $ZrO_2$ (P)-1.5 catalyst of Example 6 had a higher $-r_{PHENOL,0}$ value than those of the $ZrO_2$ (P)-0.5, $ZrO_2$ (P)-1.0, and $ZrO_2$ (P)-2.0 catalysts. This results indicates that it is important to optimize the number/distribution of the $H_2PO_4^-/HPO_4^{2-}/PO_4^{3-}$ functional groups for continuous improvement of the ability to decompose non-degradable organic materials since the catalyst having the 1.5 wt % of bulk P content is the most preferable for improving the ability to decompose non-degradable organic materials, and a change in the bulk P content may cause a change in the number/distribution of the $H_2PO_4^-/HPO_4^{2-}/PO_4^{3-}$ functional groups.

Figure 41:
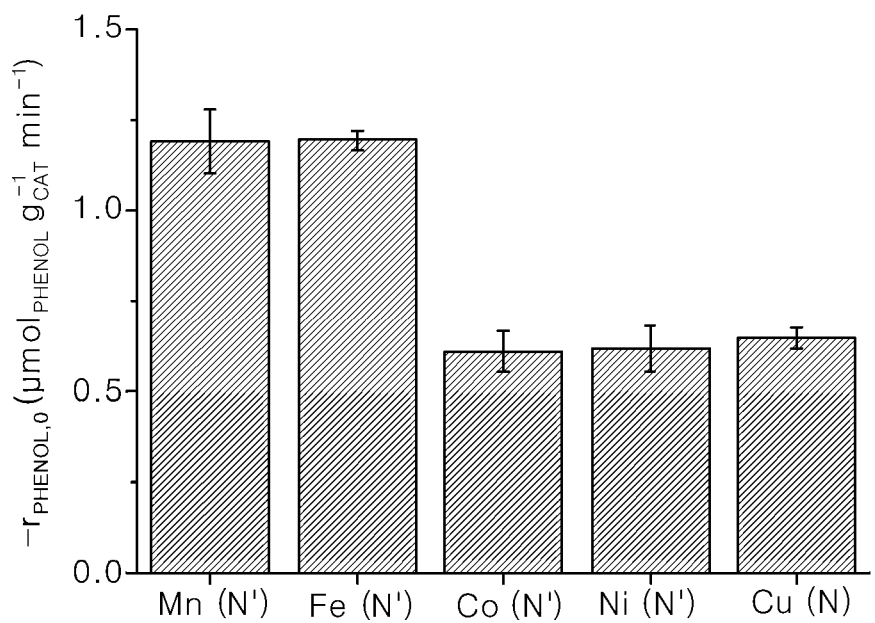
FIG. 41 is a graph illustrating phenol decomposition test results using catalysts including NO$_3^-$-functionalized transition metal oxide grains according to an embodiment of the present invention.

Experimental Example 9: Verification of Phenol Decomposition Adaptability of $NO_3^-$-Functionalized Transition Metal Oxides To verify non-degradable organic material decomposition adaptability of transition metal oxide catalysts including the $NO_3^-$ functional group, Experimental Example 7 was performed under the same conditions for the phenol decomposition test of Experimental Example 2 using oxides of Mn, Fe, Co, Ni, and Cu according to Examples 10 to 14 as catalysts, and the results are shown in FIG. 41. It was confirmed that the catalysts of Examples 10 to 14 showed a significant range of $-r_{PHENOL,0}$ values (0.7-1.2 $\mu mol_{PHENOL}$ $g_{CAT}^{-1}$ $min^{-1}$). This indicates that 1) the method of preparing a catalyst, and 2) the method of decomposing phenol using $NO_3\cdot$ surface species present on the surface of the catalyst suggested in the present invention, are also possible using various other metal oxide catalysts.

Experimental Example 10: Phenol Decomposition Test (1) Electro-Fenton Reaction

Figure 40:
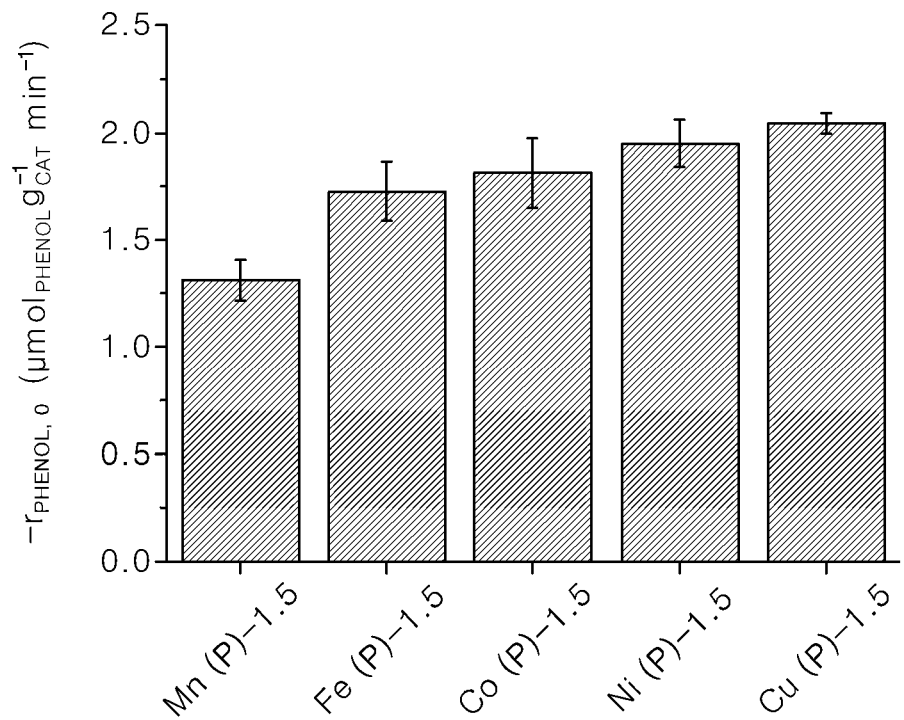
FIG. 40 is a graph illustrating phenol decomposition test results by electro-Fenton reaction using catalysts according to an embodiment of the present invention.

To prove decomposition adaptability of non-$d^0$-orbital-based transition metal oxide catalysts including $H_2PO_4^-/HPO_4^{2-}/PO_4^{3-}$ functional groups on non-degradable organic materials, Experimental Example 9 was performed under the same conditions as those of Experimental Example 2 using the Mn, Fe, Co, Ni, and Cu oxides of Examples 15 to 19 as catalysts, and the results are shown in FIG. 40. It was confirmed that the catalysts of Examples 15 to 19 had a significant range of $-r_{PHENOL,0}$ values (1.3 to 2.1 $\mu mol_{PHENOL}$ $g_{CAT}^{-1}$ $min^{-1}$). This indicates that the method of decomposing phenol using $H_2PO_4\cdot/HPO_4^-/PO_4^{2-}\cdot$ surface species present on the surfaces of the catalysts suggested in the present invention may also be possible using various non-$d^0$-orbital-based transition metal oxide catalysts.

Therefore, the catalyst for an electro-Fenton system according to an embodiment of the present invention may decompose non-degradable organic material based on heterogeneous catalysis by coating the $NO_3^-/SO_4^{2-}/H_2PO_4^-/HPO_4^{2-}/PO_4^{3-}$-functionalized $d^0$-orbital-based or non-$d^0$-orbital-based catalysts on the cathode such that the $NO_3 \cdot /SO_4 \cdot^-/H_2PO_4 \cdot /HPO_4 \cdot^-/PO_4^{2 \cdot -}$ functional groups formed as a result of radical transfer of $\cdot OH$ are distributed on the surfaces of the catalysts. In addition, the non-degradable organic material decomposition efficiency may be adjusted or increased according to the type/stoichiometry/structure of the metal included in the transition metal oxide or the number/distribution of the $NO_3 \cdot /SO_4 \cdot^-/H_2PO_4 \cdot /HPO_4 \cdot^-/PO_4^{2 \cdot -}$ functional groups, and leaching phenomenon of the surface-activating metal species ($H_2O_2$ activator) or the $NO_3^-/SO_4^{2-}/H_2PO_4^-/HPO_4^{2-}/PO_4^{3-}$-functional groups from the surfaces of the catalysts may be reduced during the decomposition. Therefore, the effects on improving performance and lifespan of the electro-Fenton system that decomposes organic materials may be obtained using the catalysts.

(2) Non-Electro-Fenton Reaction

Figure 44:
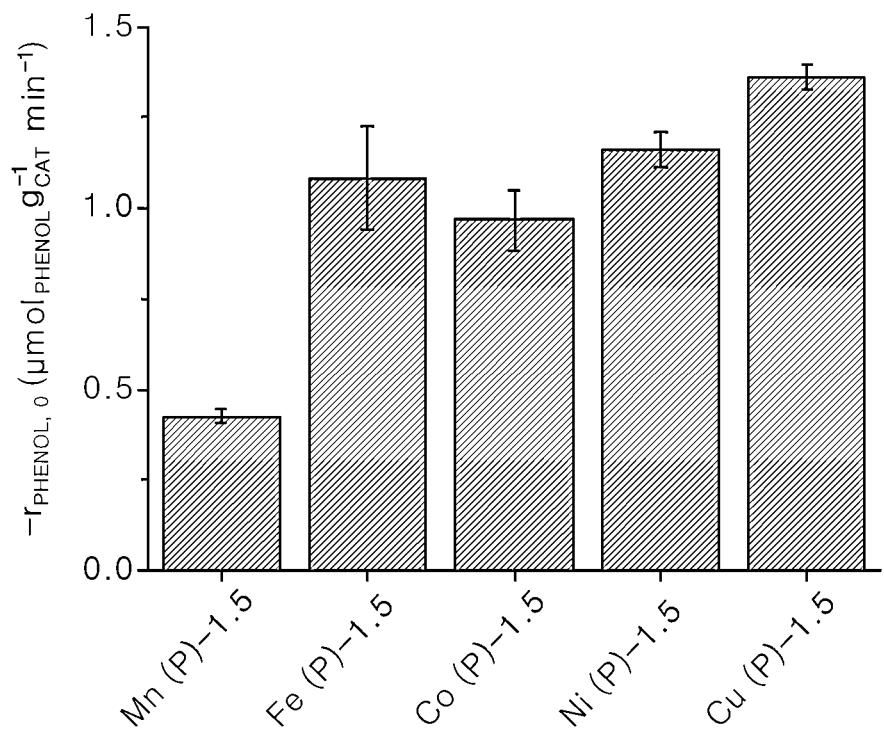
FIG. 44 is a graph illustrating phenol decomposition test results by non-electro-Fenton reaction using catalysts according to an embodiment of the present invention.

To prove decomposition adaptability of non-$d^0$-orbital-based transition metal oxide catalysts including $H_2PO_4^-/HPO_4^{2-}/PO_4^{3-}$ functional groups on non-degradable organic materials, a reaction test was performed using the Mn, Fe, Co, Ni, and Cu oxides of Examples 15 to 19 as catalysts, hydrogen peroxide ($H_2O_2$) as an organic material, and phenol ($C_6H_5OH$) as a non-degradable organic material. 0.2 g of the catalyst was used and 100 mL of an aqueous solution was used as a reaction solution, and the reaction test was performed at 25° C. at a pH of 7 using 30 mmol of $H_2O_2$ and 0.1 mmol of phenol. A slope of a pseudo-$1^{st}$-order kinetic fitting graph ($-\ln(C_{PHENOL}/C_{PHENOL,0})$ VS. time) obtained based on a conversion rate of phenol in the test is equal to a phenol decomposition rate constant ($k_{APP}$, min$^{-1}$). An initial phenol decomposition rate ($-r_{PHENOL,0}$) was calculated by multiplying $k_{APP}$ of each catalyst by $N_{PHENOL,0}$ (0.1 mmol), and dividing the result value by the amount (0.2 g) of the catalyst and shown in FIG. 44.

It was confirmed that the catalysts of Examples 15 to 19 had a significant range of $-r_{PHENOL,0}$ values (0.4 to 1.4 $\mu mol_{PHENOL} g_{CAT}^{-1} min^{-1}$). This indicates that the $H_2PO_4 \cdot /HPO_4 \cdot^-/PO_4^{2 \cdot -}$ surface species present on the surfaces of the catalysts suggested in the present invention are also produced under the non-electro Fenton conditions (using $H_2O_2$), and the method of decomposing phenol by the $H_2PO_4 \cdot /HPO_4 \cdot^-/PO_4^{2 \cdot -}$ surface species under non-electro Fenton conditions (using $H_2O_2$) may be possible using various non-$d^0$-orbital-based transition metal oxide catalysts.

Experimental Example 11: Phenol Decomposition Test

Figure 45:
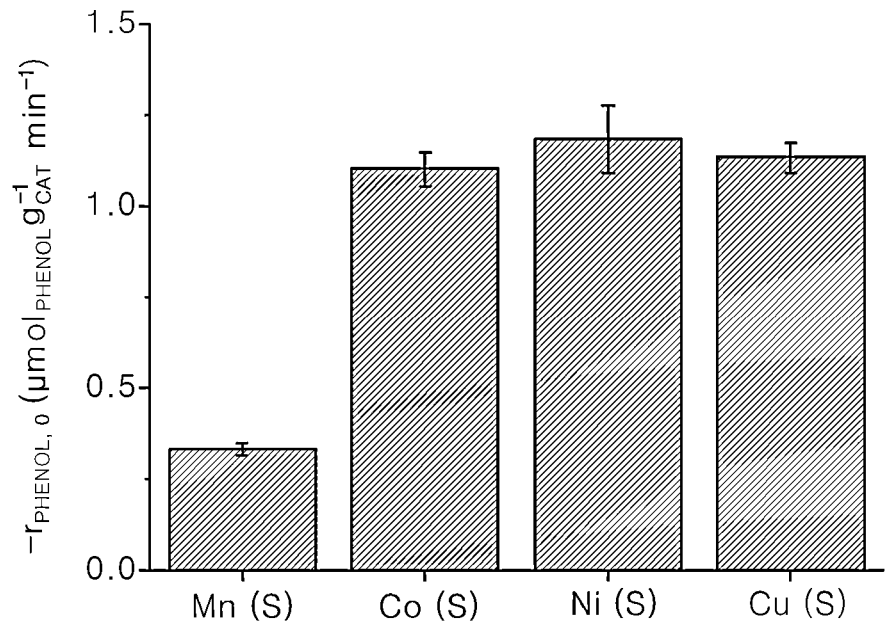
FIG. 45 is a graph phenol decomposition test results by non-electro-Fenton reaction using catalysts according to an embodiment of the present invention.

To prove decomposition adaptability of non-$d^0$-orbital-based transition metal oxide catalysts including $SO_4^{2-}$ functional group on non-degradable organic materials under the non-electro Fenton conditions (using $H_2O_2$), a reaction test was performed using the Mn, Co, Ni, and Cu oxides of Examples 20 to 23 as catalysts, hydrogen peroxide ($H_2O_2$) as an organic material, and phenol ($C_6H_5OH$) as a non-degradable organic material. 0.2 g of the catalyst was used and 100 mL of an aqueous solution was used as a reaction solution, and the reaction test was performed at 25° C. at a pH of 7 using 30 mmol of $H_2O_2$ and 0.1 mmol of phenol. A slope of a pseudo-$1^{st}$-order kinetic fitting graph ($-\ln(C_{PHENOL}/C_{PHENOL,0})$ VS. time) obtained based on a conversion rate of phenol in the test is equal to a phenol decomposition rate constant ($k_{APP}$, min$^{-1}$). An initial phenol decomposition rate ($-r_{PHENOL,0}$) was calculated by multiplying $k_{APP}$ of each catalyst by $N_{PHENOL,0}$ (0.1 mmol), and dividing the result value by the amount (0.2 g) of the catalyst and shown in FIG. 45.

It was confirmed that the catalysts of Examples 20 to 23 had a significant range of $-r_{PHENOL,0}$ values (0.3-1.2 $\mu mol_{PHENOL} g_{CAT}^{-1} min^{-1}$). This indicates that the $SO_4 \cdot^-$ surface species present on the surfaces of the non-$d^0$-orbital-based transition metal catalysts suggested in the present invention are also produced under the non-electro Fenton conditions (using $H_2O_2$), and the method of decomposing phenol by the $SO_4 \cdot^-$ surface species under non-electro Fenton conditions (using $H_2O_2$) may be possible using various non-$d^0$-orbital-based transition metal oxide catalysts.

Figure 46:
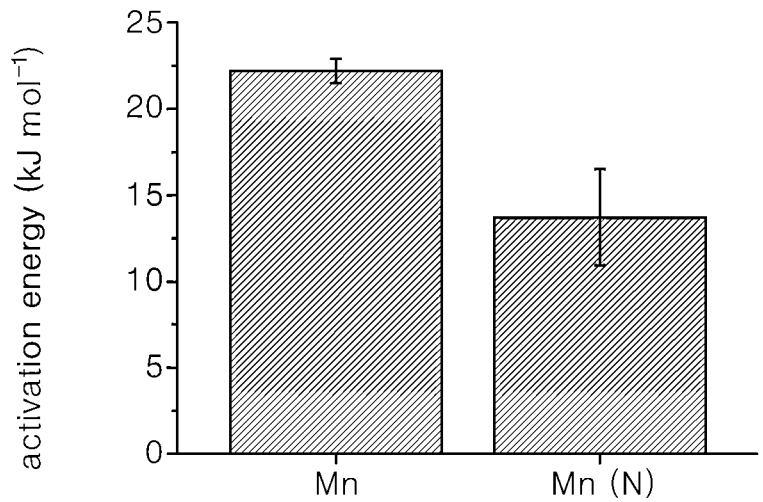
FIG. 46 is a graph illustrating activation energy of a phenol decomposition test using transition metal oxide grains according to an embodiment of the present invention.

Experimental Example 12: Calculation of Activation Energy of Phenol ($C_6H_5OH$) Decomposition Test A reaction test was performed under the same conditions as those of the phenol decomposition test of Experimental Example 8 using the catalysts of Examples 8 and 9, except that reaction temperatures varied to 25° C., 35° C., 45° C., and 55° C. A slope of a pseudo-$1^{st}$-order kinetic fitting graph ($-\ln(C_{PHENOL}/C_{PHENOL,0})$ VS. time) obtained based on a conversion rate of phenol obtained by correcting measurement values (phenol decomposition by $H_2O_2$ and phenol adsorption by catalyst) in the test is equal to a phenol decomposition rate constant ($k_{APP}$, min$^{-1}$). The obtained decomposition rate constants were Arrhenius-plotted (ln ($k_{APP}$) versus 1/T; T:reaction temperature), and activation energy of phenol decomposition was calculated using the obtained slope and shown in FIG. 46. It is confirmed that the Mn (N) catalyst of Example 9 has a smaller activation energy than that of the Mn catalyst of Example 1. This indicates that the $NO_3^-$-functionalized Mn (N) catalyst has improved ability to decompose non-degradable organic materials per unit hour compared with the non-functionalized Mn catalyst.

According to an embodiment of the present invention as described above, the $NO_3^-$, $SO_4^{2-}$, $H_2PO_4^-$, $HPO_4^{2-}$, or $PO_4^{3-}$ functional group on the surface of the catalyst reacts with $\cdot OH$ and is converted into the $NO_3 \cdot$, $SO_4 \cdot^-$, $H_2PO_4 \cdot$, $HPO_4 \cdot^-$, or $PO_4^{2 \cdot -}$ functional group (surface species) which (1) has a longer lifespan than $\cdot OH$ and a similar oxidizing power thereto, and (2) operates in a wider pH range, resulting in an increase in non-degradable organic material decomposition rates.

In addition, according to an embodiment of the present invention, leaching of grains occurring during decomposition of non-degradable organic materials may be reduced, catalyst performance may be maintained despite repeated use thereof, and lifespan of the catalyst may be increases. However, the scope of the present invention is not limited by these effects.

While one or more embodiments of the present invention have been described with reference to the drawings, it will be understood by those of ordinary skill in the art that various changes in form and details may be made therein without departing from the spirit and scope of the present invention as defined by the following claims.

What is claimed is:

1. A catalyst for a Fenton system, the catalyst comprising one or more species of $d^0$-orbital-based or non-$d^0$-orbital-based transition metal oxide catalyst grains including a $NO_3^-$, $H_2PO_4^-$, $HPO_4^{2-}$, or $PO_4^{3-}$ functional group on the surface thereof.

2. The catalyst of claim 1, wherein the catalyst grains have a porous structure, and optionally, wherein the catalyst grains have a diameter of 0.1 nm to 500 μm.

3. The catalyst of claim 1, wherein a metal of the transition metal oxide catalyst grains comprises at least one selected from a 3d-block metal (Sc, Ti, V, Cr, Mn, Fe, Co, Ni, Cu, or Zn), a 4d-block metal (Y, Zr, Nb, Mo, Tc, Ru, Rh, Pd, Ag, or Cd), a 5d-block metal (La, Hf, Ta, W, Re, Os, Ir, Pt, Au, or Hg), and a 6d-block metal (Ac, Rf, Db, Sg, Bh, Hs, Mt, Ds, Rg, Cn) in the periodic table, or any combination thereof.

4. The catalyst of claim 1, wherein the catalyst is supported by a carrier and coated on a substrate, and a binder is interposed between the carrier and the substrate to increase coating adhesion strength.

5. The catalyst of claim 4, wherein the carrier is carbon (C), $Al_2O_3$, MgO, $ZrO_2$, $CeO_2$, $TiO_2$, or $SiO_2$.

6. The catalyst of claim 4, wherein the catalyst is included in an amount of 0.01 to 50 parts by weight based on 100 parts by weight of the carrier.

7. The catalyst of claim 4, wherein the binder is a polymer that is insoluble in an aqueous solution or an inorganic binder.

8. The catalyst of claim 4, wherein an electro-Fenton reaction occurs in an aqueous electrolytic solution.

9. The catalyst of claim 8, wherein the aqueous electrolytic solution has a pH of 3 to 10, and electro-Fenton reaction occurs by inputting a power.

10. The catalyst of claim 8, wherein the electro-Fenton reaction comprises:
   (1) production of ·OH species by heterogeneous decomposition of $H_2O_2$;
   (2) conversion of the $NO_3^-$ functional group into $NO_3$· species by the ·OH species, or conversion of the $H_2PO_4^-/HPO_4^{2-}/PO_4^{3-}$ functional groups into $H_2PO_4\cdot/HPO_4\cdot^-/PO_4^{2\cdot-}$ species by the ·OH species; and
   (3) decomposition of a non-degradable organic material by the $NO_3\cdot$, $H_2PO_4\cdot$, $HPO_4\cdot^-$, or $PO_4^{2\cdot-}$ species.

11. A method of preparing a catalyst for a Fenton system, the method comprising:
   preparing a $d^0$-orbital-based or non-$d^0$-orbital-based transition metal oxide; and
   preparing a transition metal oxide catalyst comprising a $NO_3^-$, $H_2PO_4^-$, $HPO_4^{2-}$, or $PO_4^{3-}$ functional group on the surface of the catalyst via nitrification, sulfation, or phosphorylation of the transition metal oxide.

12. The method of claim 11, wherein the nitrification is performed with a reaction gas comprising NO and $O_2$, the sulfation is performed with a reaction gas comprising $SO_2$ and $O_2$, and the phosphorylation is performed with a reaction solution comprising a phosphorylating precursor.

13. The catalyst of claim 4, wherein hydrogen peroxide is supplied from a hydrogen peroxide supply unit, and a non-electro-Fenton reaction occurs in an aqueous electrolytic solution.

14. The catalyst of claim 13, wherein the aqueous electrolytic solution has a pH of 5 to 10, and
   the non-electro-Fenton reaction occurs by supplying hydrogen peroxide using a hydrogen peroxide supply unit at a rate of $10^{-5}$ mol/L to $10^5$ mol/L.

15. The catalyst of claim 13, wherein the non-electro-Fenton reaction comprises:
   (1) production of ·OH species by heterogeneous decomposition of $H_2O_2$;
   (2) conversion of the $NO_3^-$ functional group into $NO_3$· species by the ·OH species, or conversion of the $H_2PO_4^-/HPO_4^{2-}/PO_4^{3-}$ functional groups into $H_2PO_4\cdot/HPO_4\cdot^-/PO_4^{2\cdot-}$ species by the ·OH species; and
   (3) decomposition of a non-degradable organic material by the $NO_3\cdot$, $H_2PO_4\cdot$, $HPO_4\cdot^-$, or $PO_4^{2\cdot-}$ species.

* * * * *